United States Patent
Liffring et al.

(10) Patent No.: US 12,036,953 B2
(45) Date of Patent: Jul. 16, 2024

(54) VEHICLE EXTERNAL CARGO STOWAGE AND RETRIEVAL APPARATUS AND RELATED CONTROL SYSTEM

(71) Applicant: Liffstre Products LLC, Kirkland, WA (US)

(72) Inventors: Mark Eugene Liffring, Seattle, WA (US); Martin Richard Streich, Kirkland, WA (US)

(73) Assignee: Liffstre Products LLC, Kirkland, WA (US)

(*) Notice: Subject to any disclaimer, the term of this patent is extended or adjusted under 35 U.S.C. 154(b) by 0 days.

(21) Appl. No.: 18/373,923

(22) Filed: Sep. 27, 2023

(65) Prior Publication Data

US 2024/0101038 A1    Mar. 28, 2024

Related U.S. Application Data

(60) Provisional application No. 63/410,610, filed on Sep. 27, 2022.

(51) Int. Cl.
*B60R 9/042*    (2006.01)
(52) U.S. Cl.
CPC .................. *B60R 9/042* (2013.01)
(58) Field of Classification Search
CPC .................................................. B60R 9/042
USPC ......................................... 224/310, 321, 311
See application file for complete search history.

(56) References Cited

U.S. PATENT DOCUMENTS

| | | | | |
|---|---|---|---|---|
| 2,247,128 A | * | 6/1941 | Levey | B60P 3/1025 |
| | | | | 414/532 |
| 2,654,515 A | * | 10/1953 | Svoboda | B60P 3/1025 |
| | | | | 224/310 |
| 3,480,166 A | * | 11/1969 | Abbott | B60R 9/042 |
| | | | | 414/538 |
| 4,058,243 A | * | 11/1977 | Tappan | B60P 3/1025 |
| | | | | 224/310 |
| 4,063,659 A | * | 12/1977 | Welch | B60P 3/1025 |
| | | | | 224/310 |
| 4,081,095 A | * | 3/1978 | Wilburn | B60R 9/042 |
| | | | | 414/522 |
| 4,269,339 A | * | 5/1981 | Bott | B60Q 1/2661 |
| | | | | 224/325 |
| 4,446,998 A | * | 5/1984 | Taig | B60R 9/042 |
| | | | | 224/310 |

(Continued)

OTHER PUBLICATIONS

JP S6318352 U; Publication Date: Feb. 6, 1988 (Year: 1988).*

*Primary Examiner* — Nathan J Newhouse
*Assistant Examiner* — Lester L Vanterpool
(74) *Attorney, Agent, or Firm* — Lowe Graham Jones PLLC

(57) ABSTRACT

Apparatus and method to access external vehicle cargo carriers and cargo are disclosed for moving cargo from a vehicle's roof to the vehicle's hood and returning the cargo to the roof for storage. A particular embodiment consists of using existing vehicle external roof-rack mounts and cargo carriers to allow mobile crossbars to deliver the cargo carrier and the cargo to a position at the front of the vehicle. A self-contained control system provides locomotive force to deploy and retrieve the cargo carrier and cargo. A human interface is used to control the apparatus and includes manual checks to ensure safe use. The apparatus can be used without a control system and operated manually.

20 Claims, 35 Drawing Sheets

(56) References Cited

U.S. PATENT DOCUMENTS

| | | | | |
|---|---|---|---|---|
| 4,705,315 A * | 11/1987 | Cherry | ............... | B60R 11/06 |
| | | | | 312/334.33 |
| 4,950,123 A * | 8/1990 | Brockhaus | ............... | B60P 1/00 |
| | | | | 224/403 |
| 5,154,563 A * | 10/1992 | Phillips | ............... | B60R 9/0426 |
| | | | | 224/326 |
| 5,556,249 A * | 9/1996 | Heine | ............... | B60P 1/6454 |
| | | | | 414/500 |
| 5,846,045 A * | 12/1998 | Johnson | ............... | B60P 1/6454 |
| | | | | 280/414.1 |
| 5,904,463 A * | 5/1999 | Christensen | ............... | B60R 9/00 |
| | | | | 224/310 |
| 6,029,873 A * | 2/2000 | Won | ............... | B60R 9/04 |
| | | | | 224/326 |
| 6,308,874 B1 * | 10/2001 | Kim | ............... | B60R 9/042 |
| | | | | 224/310 |
| 6,338,427 B1 * | 1/2002 | Aftanas | ............... | B60R 9/045 |
| | | | | 224/310 |
| 6,761,296 B2 * | 7/2004 | Ford | ............... | B60R 9/055 |
| | | | | 224/310 |
| 6,772,928 B2 * | 8/2004 | Ford | ............... | B60R 3/005 |
| | | | | 224/310 |
| 7,011,239 B2 * | 3/2006 | Williams | ............... | B60R 9/042 |
| | | | | 224/310 |
| 7,033,128 B2 * | 4/2006 | Poindexter | ............... | B60P 1/4414 |
| | | | | 414/544 |
| 8,640,933 B1 * | 2/2014 | McCray | ............... | B60R 9/042 |
| | | | | 224/325 |
| 10,059,273 B1 * | 8/2018 | Mercurio | ............... | B60R 9/045 |
| 10,286,853 B1 * | 5/2019 | Carbone | ............... | B60P 1/003 |
| 10,800,339 B2 * | 10/2020 | Anderson | ............... | B60R 9/058 |
| 11,414,020 B2 * | 8/2022 | Daniels | ............... | B60R 9/048 |
| 11,560,183 B2 * | 1/2023 | Agarwal | ............... | B60P 1/003 |
| 2002/0014504 A1 * | 2/2002 | Hetu | ............... | B60R 9/042 |
| | | | | 224/310 |
| 2004/0028510 A1 * | 2/2004 | Jones | ............... | B60R 9/042 |
| | | | | 414/462 |
| 2006/0065685 A1 * | 3/2006 | Fitzsimmons | ............... | B60R 9/042 |
| | | | | 224/310 |
| 2013/0062378 A1 * | 3/2013 | Hobbs | ............... | B60R 9/06 |
| | | | | 224/310 |
| 2021/0261065 A9 * | 8/2021 | Malgeri | ............... | B60R 9/052 |

\* cited by examiner

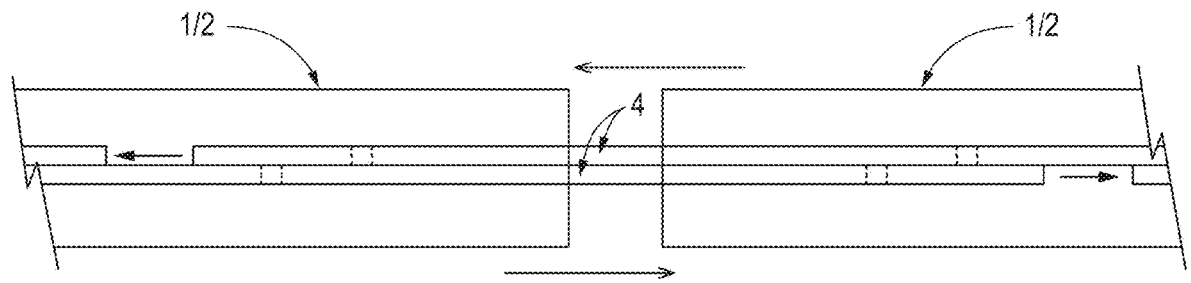
FIG. 12A
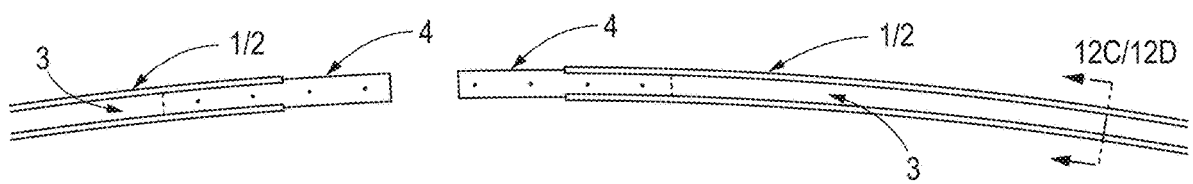
FIG. 12B
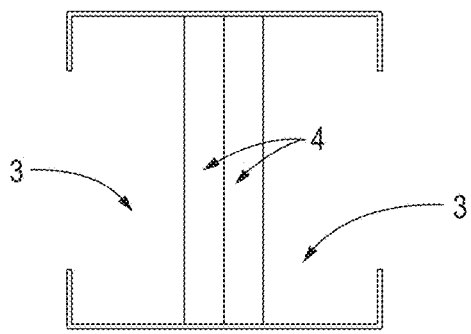 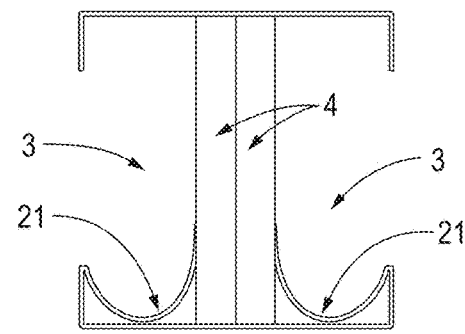
FIG. 12C          FIG. 12D

| Power UP 92 | Unlocked Low Tension 93 | Unlocked Tension 94 | Locked Tension 95 | Locked Low Tension 96 | Power Off 97 |
|---|---|---|---|---|---|
| 1) Indicate:<br>• Power ON<br>2) Initiate power-on latch<br>3) Start power-off timer<br>4) Apply Power to:<br>• Switched DC outlet<br>• Power to sensors & control logic<br>• Apply Main DC for Motor Controller and receiver<br>5) Activate continuous monitors:<br>• Low Voltage<br>• Torque Overload<br>• Tension detector<br>• Proximity detectors | 1) Indicate:<br>• Power ON<br>• Unlocked<br>2) Allow ONLY retract commands<br>3) Deployment Clutch activated manually or Deployment Clutch READY for manual activation | 1) Indicate:<br>• Power ON<br>• Unlocked<br>2) Allow BOTH commands:<br>• Extend<br>• Retract | 1) Indicate:<br>• Power ON<br>• Locked<br>2) Allow ONLY Extend commands<br>3) If Deployment Clutch was previously released manually: Reset Deployment Clutch (automatically) | 1) Indicate:<br>• Power ON<br>• Locked Stationary mode ONLY<br>2)<br>3) SYSTEM IS FAULTED<br>4) SYSTEM SAFETY-LOCKED | 1) Indicate:<br>• Power OFF<br>2) Self-Latch OFF<br>3) Cancel timer<br>4) Power OFF:<br>• Switched DC outlet<br>• Sensors and control logic<br>• Main DC for motor controller and receiver<br>5) Deactivate monitors:<br>• Low Voltage,<br>• Retract Overload monitor<br>• Tension detector<br>• Proximity detectors |

FIG. 29

| Stationary Mode 100 | Extend Mode 99 | Retract Mode 101 | Remote OFF 98 |
|---|---|---|---|
| Remote<br>1) Indicate Remote ON<br>2) Indicate no commands being issued<br><br>Control System<br>1) No action/standby | Remote<br>1) Indicate Remote ON<br>2) Indicate Extend Commands being issued<br><br>Control System<br>1) Remove safety latches<br>2) If enabled via control system logic:<br>• Activate motor,<br>• Indicate Motor active | Remote<br>1) Indicate Remote ON<br>2) Indicate Retract Commands being issued<br><br>Control System<br>1) If enabled via control system logic:<br>• Activate motor,<br>• Indicate motor active<br>2) If Deployment Clutch was previosly released, Reset Deployment Clutch (automatically) | Remote<br>1) Indicate Remote OFF<br><br>Control System<br>1) No action - standby |

FIG. 31

VEHICLE EXTERNAL CARGO STOWAGE AND RETRIEVAL APPARATUS AND RELATED CONTROL SYSTEM

PRIORITY CLAIM

This application claims the benefit of U.S. Provisional Application No. 63/410,610 filed on Sep. 27, 2022, the subject matter of which is incorporated herein by reference in its entirety.

FIELD OF THE INVENTION

The present disclosure is generally related to vehicles and associated vehicle externally mounted cargo carriers and cargo.

BACKGROUND OF THE INVENTION

A person's physical characteristics including size, height, mobility, and strength are significant issues that can challenge or prevent many individuals from using vehicle external cargo carriers. A person may be able to enter, exit, and drive a vehicle, but that person may not be able to easily and safely access the vehicle's roof-rack mounted cargo carrier and cargo.

Once mounted onto the vehicle's roof-rack crossbars, access to the cargo carrier's locks and compartments to store or remove the cargo is at best difficult, and typically requires blocking one or more of the vehicle's occupant's doors, and can even require standing on the door frame or seat of the vehicle with the door open or by using an additional step or ladder. This is problematic as the individual is loading or removing cargo, but must also balance themselves and the cargo to prevent falling, slipping, or other injuries.

Installing roof-rack assemblies for vehicle external cargo carriers and cargo can be a significant challenge to any vehicle owner. Both original equipment manufacturer (OEM) and custom roof-rack assemblies or add-on or replacement crossbars are needed to mount most external cargo carriers. The process may often require professional installation using two or more people to install and align accessory cargo carrier attachments. Existing practice typically involves using the vehicle's OEM custom crossbars or using add-on third party crossbars to mount generic cargo storage units, typically using square, rounded or elliptical crossbars. Even quick-mount, quick-dismount units must be first connected to the vehicle's roof-rack crossbars. Then the external cargo carriers, adapters, mounting brackets, locks, and latches can be added to the roof-rack crossbars. Connecting these accessories to the top of the vehicle's roof-rack can be difficult. For these reasons, changing one roof-rack cargo carrier to a different cargo carrier is prohibitive and undesirable. Examples include changing from a self-contained carrier for snow skis and equipment to a multi-bicycle carrier.

Some existing practices include moving the cargo by using custom cargo carrier latches to angle the cargo, or using slides to improve accessibility. They are typically one-off solutions for a particular cargo item (e.g., snow skis or bicycle frame). They still require installation and are typically not compatible with other cargo carriers. They are typically limited in the weight they can support and typically will interfere with door or hatch access to the interior of the vehicle during access or storage of external cargo. Other solutions use mounted racks to the rear of the vehicle that typically impede or block access to the vehicle's rear interior cargo space or trunk. These cargo carriers and rack systems can also obscure or block the driver's vision when looking through the rear window and while driving (e.g., using the internal rear view mirrors) or backing up. One example includes the driver turning his head towards the center of the vehicle attempting to look rear. The rear mounted cargo carriers can also obscure the vehicle's reflective license plate, the taillights that include turn indication, back-up (reverse gear) illumination and indication, any active braking, and even emergency flashers.

Other aids that exist use a step that attaches to a vehicle's open door latch to provide a step up and allow a user to reach higher into the cargo carrier, but this is a hazard, and increases risk of injury due to the added height from the ground, especially if the user should lose his grip or footing, especially during snow or muddy conditions.

These static or limited manual moving cargo carriers typically often only help in one operation (e.g., retrieval, but not stowage of the external cargo), or they do not allow easy access to the vehicle's rear compartments (i.e., hatchback, or trunk) and limit access or require a vehicle's door to remain open or remain closed during stowage and retrieval operations when accessing the cargo.

Most access to existing vehicle external cargo is entirely controlled and operated manually, and this can lead to the user not always getting the cargo properly secured for storage and transport, and leading to safety issues, vehicle damage, loss of cargo, or all three.

Additionally, accessory aids can take up internal vehicle space, can be lost, misplaced, or damaged, or can cause unintended damage to the vehicle if doors are closed and the aids are not removed.

References to related existing external cargo carriers and related assist aides include the following: Door step, rightlinegear.com; Rhino Rack, rhinorack.com; Step-stool or short ladder, homedepot.com or lowes.com; Thule, thule-.com; and Yakima, yakima.com.

SUMMARY OF THE INVENTION

Embodiments disclosed herein include systems and methods of providing mobile cargo while mounted to the vehicle and its associated control and protections. In a particular embodiment, instead of relying on mechanical or human power, ladders, extensions, etc., a self-contained control system and apparatus are presented. Common methods are utilized to attach the control system and apparatus to the vehicle and then connect the cargo carrier to the apparatus. This provides easy cargo access by controlling a wireless remote control to stow, deploy and retrieve the cargo carrier and cargo. The control system also provides local control buttons for input; however, as presented herein, a remote control is used in the description as the method of choice.

Embodiments disclosed include the control system and apparatus as being an addition to a vehicle's roof-rack. This embodiment then provides a minimum of two mobile arcs for moving and support during retrieval and stowage and two mobile crossbars for connecting external vehicle cargo carriers. Additional nested mobile arcs can be included in the apparatus. Additional mobile arcs can reduce the overall length of the retracted apparatus, increase the span of the deployed apparatus, and reduce or distribute loading and increase stability.

Another embodiment incorporates the design into the vehicle and even contains the control system components much like an OEM sun-roof is included in the vehicle design (e.g., mechanical, electrical, dashboard control). (See FIG. 24)

Other embodiments include rear-vehicle deployment for convenience. This includes utility vehicle lumber roof-racks or direct mount into a pickup-bed or panel van.

Other embodiments include eliminating the use of mobile crossbars and integrating these features directly into the cargo carrier design and thus reducing overall parts count, weight and cost.

Multiple cargo carriers can be used and exchanged easily using the mobile crossbars to allow quick change out between uses (e.g., bike racks versus cargo container or ski racks, etc.).

Other embodiments include added extensions. (See FIG. 22)

By using vehicle-independent power sources (e.g., a fuel cell system, a battery, a recuperative actuator, a super capacitor, etc.) that can provide power independent of the vehicle's power system, the power and energy demand for control, deployment and retraction of the cargo carrier and cargo is removed from the vehicle's systems. Therefore, the vehicle's battery cannot be drained from repeated use for the deployment and retraction when the vehicle is not running. In one embodiment, connections allow either utility power (e.g., household 12V battery charger) or existing vehicle power sources (e.g., trailer lighting adapter connection, standard 12V outlet power, or a commercial 12V solar panel) to provide recharging of the self-contained energy source.

Additionally, by using the vehicle's trailer lighting adapter input power for battery charging during vehicle operation, the apparatus and control system can be designed to use the vehicle's trailer indicators to display the parking lights, brake lights, left-turn, right-turn, indications and courtesy lighting similar to a camper or trailer used in existing practices.

The alternate power from the self-contained electrical power system can also be used as an auxiliary power source for lighting, electric pumps and air compressors, and charging adaptor ports, or other power uses.

A control system provides for energy management, charging, display, and control of all powered operations based on sensor inputs.

The control system also provides many layers for safety checks and provides the logic for electro-mechanical interlocks and display. A wireless remote is used to control the deployment and retraction of the cargo carrier and cargo.

Embodiments of the vehicle cargo carrier and cargo stow and retrieval apparatus and methods of providing control may be used on aircraft, spacecraft, surface ships, submarines, trains, buses, trucks, cars, and other applications. For ease of description, certain systems and methods of providing and controlling vehicle power are described in the exemplary context of an automobile. The following descriptions, however, should not be taken as limiting the use of the following apparatus and methods to automobiles alone.

BRIEF DESCRIPTION OF THE DRAWINGS

Preferred and alternative examples of the present invention are described in detail below with reference to the following drawings.

FIG. 8A is the top view and FIG. 8B is a side view of the internal components of the deployment clutch.

FIG. 10A is a side view of the rolling pads in a stowed position when the apparatus is fully retracted. FIG. 10B shows the rolling pad(s) after automatically released during deployment. FIG. 10C shows the rolling pad(s) when deployed and locked when on a supporting surface.

FIG. 11A shows a fixed arc and a mobile arc with a wheel in a captive track. FIG. 11B shows the fixed arc, the mobile arc, and a mobile crossbars with wheels in the captive tracks.

FIGS. 12A, 12B, 12C, 12D show an embodiment that allows the arcs to be modular in length. FIG. 12A shows a top view and FIG. 12B shows a side view. FIG. 12C and FIG. 12D show a cross section of a dual track I-beam arc without and with a wheel guide.

FIG. 29 lists the specific actions taken or available when in any of the six states supported in an embodiment of the present invention.

FIG. 31 lists the specific actions taken by a remote interface based on the state entered as supported in an embodiment of the present invention.

DETAILED DESCRIPTION OF THE PREFERRED EMBODIMENT

The apparatus and control system of the present invention allow most any type of existing commercial roof-rack mounted cargo carrier or cargo attachments to move from the top of the vehicle to the vehicle's hood, and then return to the top of the vehicle. This provides a unique, simpler, safer, and more convenient way to access external cargo carriers and cargo and is shown for reference in different stages of deployment and retraction.

Figure 1:
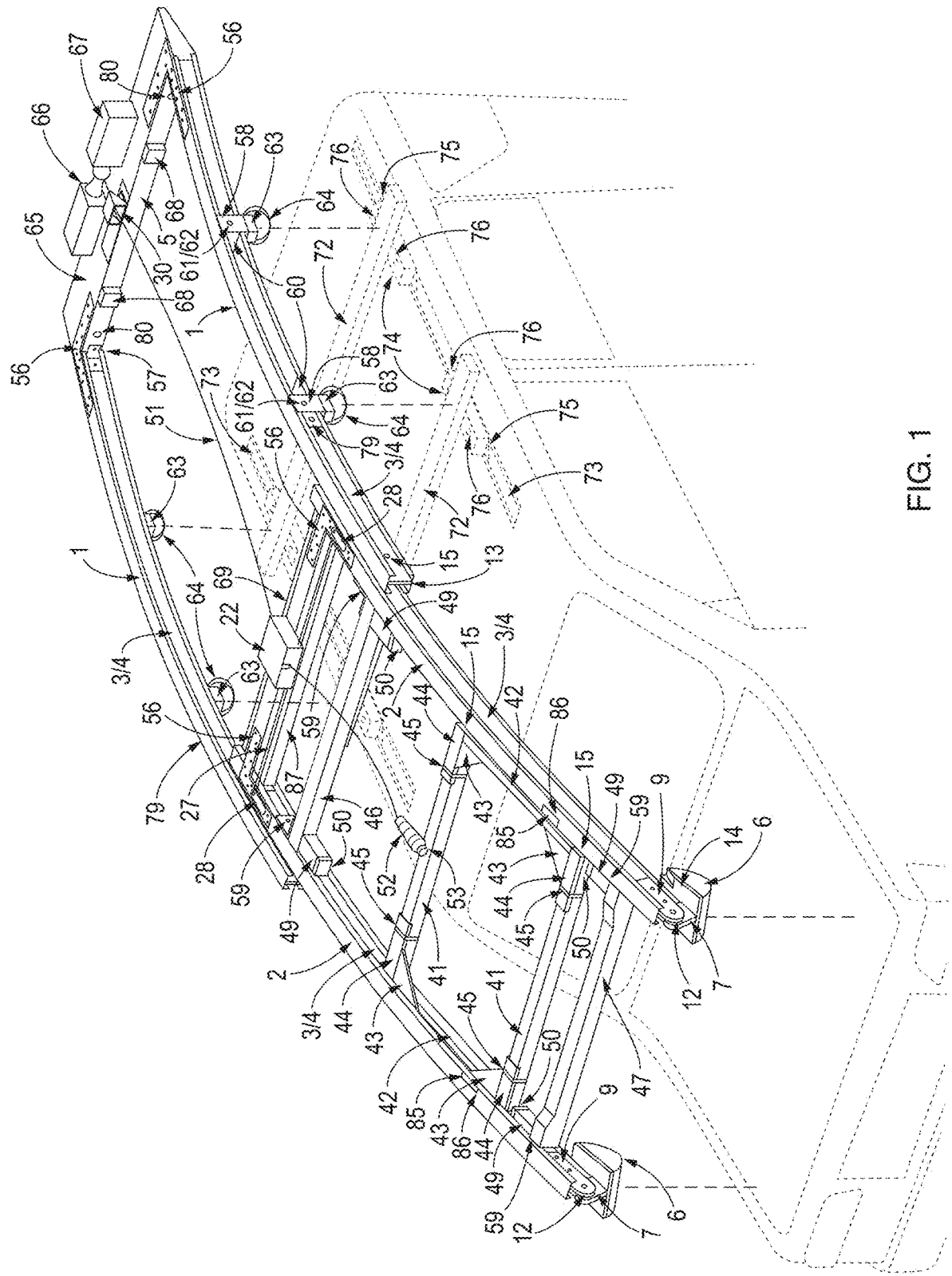
FIG. 1 is a three-dimensional view of a fully extended, deployed embodiment of the present invention as it would be on the vehicle roof and over the hood.

FIG. 1 is a three-dimensional view of a fully extended, deployed embodiment of the present invention as it would be on the vehicle roof and over the hood illustrating a pair of fixed arcs 1 attached to a vehicle, a pair of mobile arcs 2 movably connected to the fixed arcs 1, a set of mobile crossbars 41 attached to a mobile crossbar carriage 42, preferably using a set of wheels 15 on each side and are incorporated in with the captive tracks of the mobile arcs 2. As used herein, wheels are used to describe any low-friction, movable device or system that allows fixed or mobile structures to easily move with respect to each other, or their equivalents. This consists of the mobile crossbar carriage 42, including a group of squaring brackets 43, a set of crossbar frame clamps 44, and a set of holding clamps 45. Also illustrated in this figure are a series of captive tracks 3, a set of interlocking web members 4, a torque resistant front stop bar 47, and a torque resistant rear stop bar 46, both secured by a set of adjustable mounting brackets 59, including a set of spacing and stopping blocks 49, with a pad 50, for a cushioned soft stop of the mobile crossbar carriage 42 as it deploys.

At the front of the mobile arcs 2 are a pair of rolling pads 6 that gently roll on the vehicle hood and include a stabilizer 7, a mounting plate 9, a hinge pin 12, and a steel plate 14, which connects to a magnet 13 attached to the bottom of the fixed arc 1 used to retract and stow the pair of rolling pads 6 when not in use.

A rear torque bar with axle sleeves 87 receives the wheels 15, and incorporated into the mobile arcs 2 is a deployment clutch 22 with a rod 27 and a set of handles 28 for control, and a control line 51, a control line spring 52, and a spring holding pin 53 attached to the rear crossbar 41 of the mobile crossbar carriage 42. A tension detector 30, an electric motor with spool and locking clutch 66, and a battery 67 are preferably secured to a mounting surface control panel 65.

To secure the apparatus to the vehicle, a set of fixed arc adjustable mounting brackets 58, including a bolt 61 and a nut 62, secure the adjustable mounting brackets 58 to the fixed arcs 1, preferably with use of an arc wedge anchor 60. Included with the fixed arc adjustable mounting brackets 58 is a set of adjustable height stand-offs 63 and a set of adjustable hold-down clamps 64 that secure the fixed arcs 1 to a set of existing vehicle roof-rack crossbars 72, shown with dashed lines, or it can be attached to a vehicle rooftop track 73 by means of a mounting block 74 with a vehicle wedge anchor 75, preferably secured by a bolt 76.

A set of corner supports 57 and a set of squaring brackets 56 may be used to provide additional rigidity of the structure(s). Installed on the back of the mobile arcs 2 is a latch bar 69, which interacts with a set of safety latches 68 installed on a rear transom 5, that may optionally include a set of proximity sensors 80. A set of one or more power ON pushbuttons 79 is attached to the fixed arcs 1, and a wheel transfer lever 85 and a lever hinge spring 86 are incorporated into the mobile arcs 2 for easy installation and removal or interchanging of the mobile crossbar carriage 42, and thus the cargo. Similarly this is also incorporated for use with the fixed arcs 1 for assembly purposes of the mobile arcs 2 and a set of all the mobile components 78, where the wheels 15 of the mobile arcs 2 are received into the captive tracks 3 of the fixed arcs 1.

Figure 2:
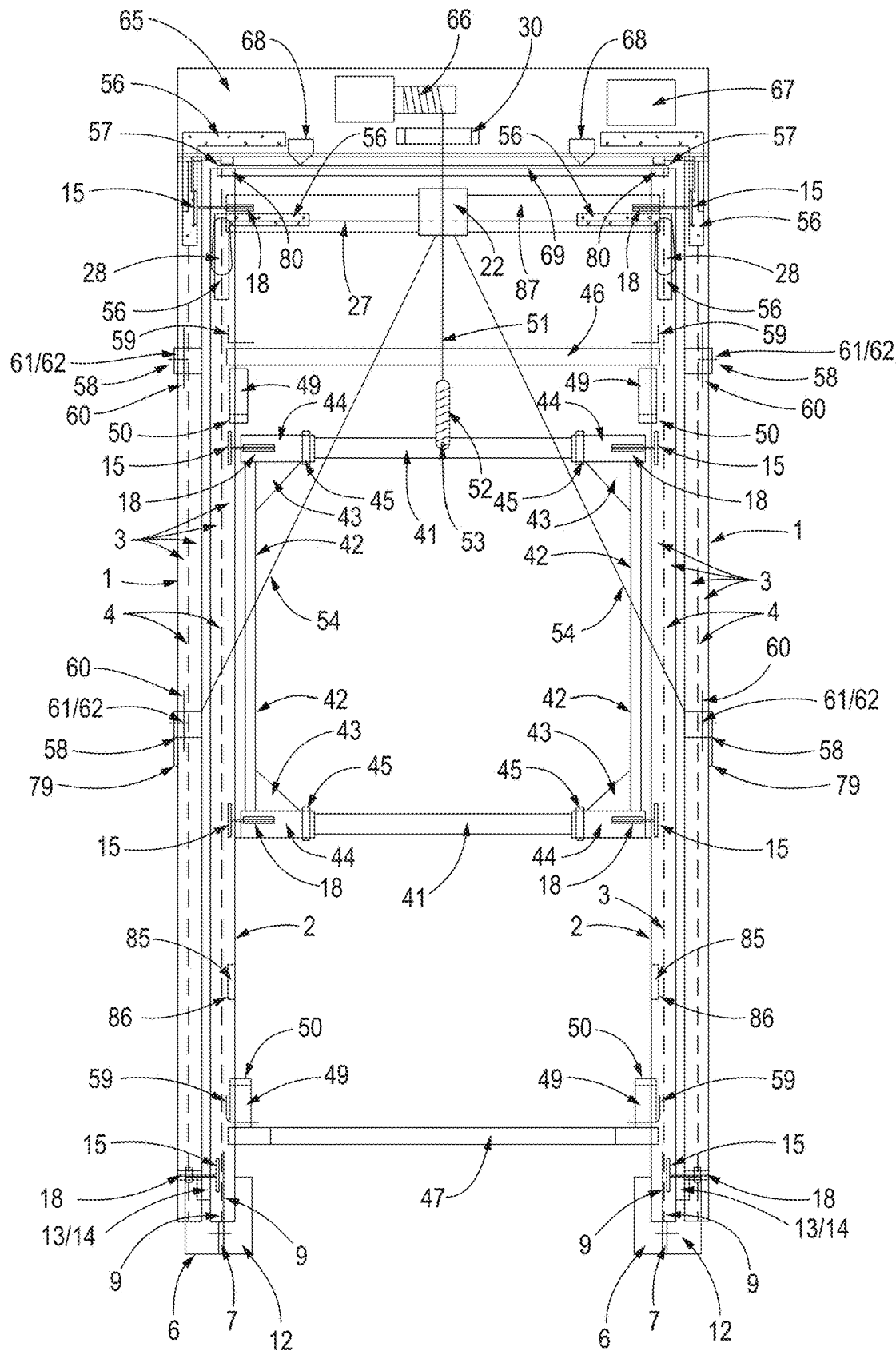
FIG. 2 is a top view of the apparatus retracted as it would be on the vehicle's roof during storage and vehicle transit.

FIG. 2 is a top view of an embodiment of the apparatus retracted as it would be on the vehicle's roof during storage and vehicle transit. Illustrated are the fixed arcs 1 and the mobile arcs 2, including the mobile crossbars 41 and the mobile crossbar carriage 42, with the wheels 15, a wheel axle 16 and an axle sleeve 18. This embodiment includes the mobile crossbar carriage 42, including the squaring brackets 43, the crossbar frame clamps 44, and the holding clamps 45. It also shows the set of wheels 15, including the wheel axle 16 and the axle sleeve 18, rigidly mounted to the front of the fixed arcs 1, that are received by the mobile arcs 2 in the captive tracks 3, and the wheels 15, including the wheel axle 16 and the axle sleeve 18, rigidly mounted to the rear of the mobile arcs 2, that are received by the fixed arcs 1 in the captive tracks 3. Also illustrated in this figure are the interlocking web members 4, the torque resistant front stop bar 47, and the torque resistant rear stop bar 46, both secured by the adjustable mounting clamps 59, including the set of spacing and stopping blocks 49, with the pad 50. At the front of the mobile arcs 2 are the rolling pads 6 with the stabilizers 7, the mounting plate 9, the hinge pin 12, and the steel plate 14, with the magnet 13, attached to the bottom of the fixed arc 1.

On the rear torque bar with axle sleeves 87 and incorporated into the mobile arcs 2 is the deployment clutch 22 with the rod 27 and the handles 28, the control line 51, the spring 52, the spring holding pin 53, the tension detector 30, the electric motor with spool and locking clutch 66, and the battery 67, secured to the mounting surface control panel 65.

The fixed arc 1 preferably attaches using the adjustable mounting brackets 58, the bolts 61, the nuts 62 and the arc wedge anchor 60.

The corner supports 57, and the squaring brackets 56, add additional rigidity to the structure(s). This figure also includes the safety latches 68, the latch bar 69, and the proximity sensors 80 attached to the transom 5. The power ON pushbutton(s) 79 is attached to the fixed arcs 1, and the wheel transfer lever 85 and the lever hinge spring 86 are incorporated into the mobile arcs 2. Also included in this figure is a shock cord system 54 that provides a force forward for initial deployment.

Figure 3:
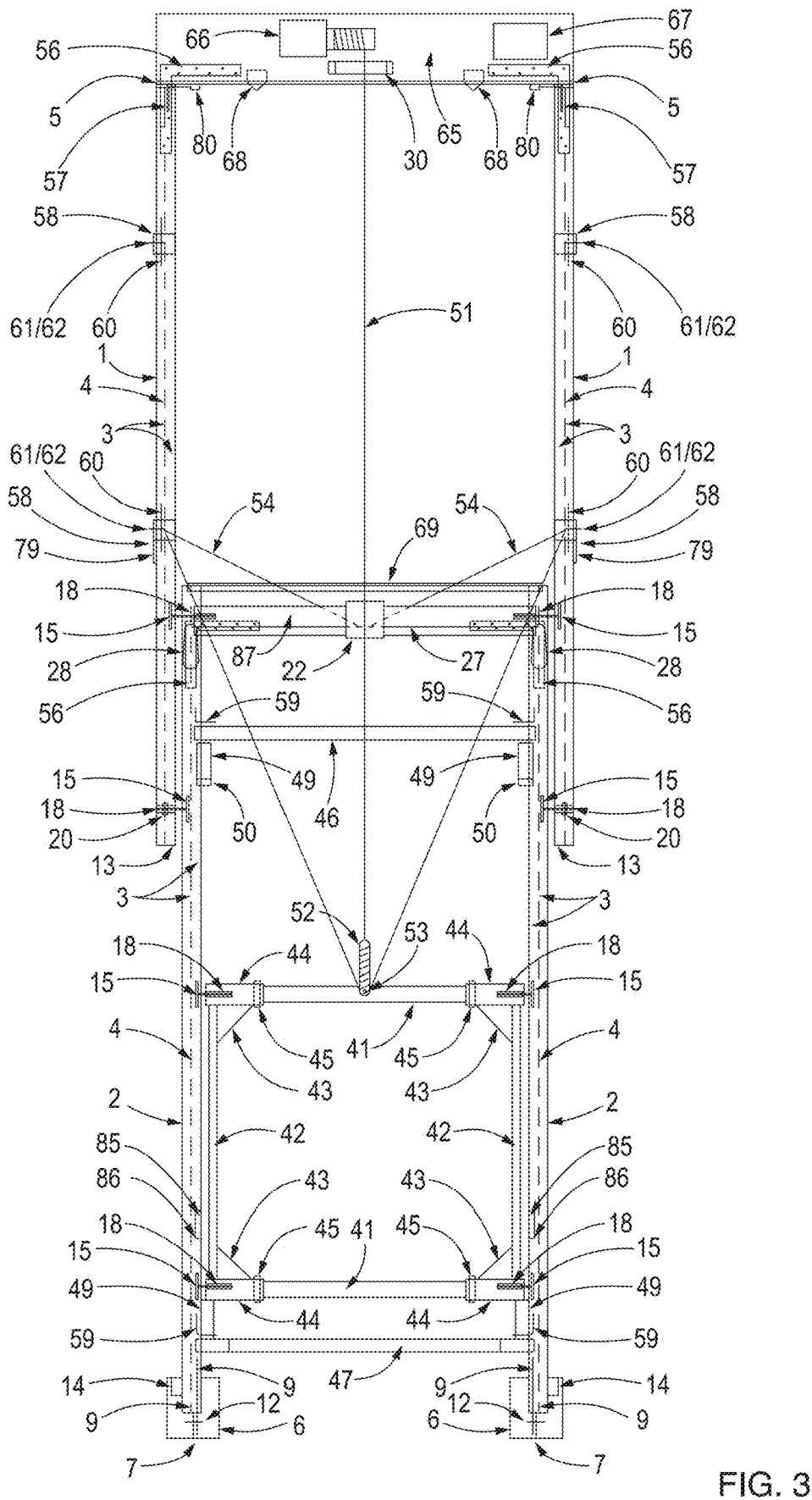
FIG. 3 is a top view of the fully extended, fully deployed apparatus as it would be on the vehicle's roof and over the hood.

FIG. 3 is a top view of the fully extended, fully deployed apparatus as it would be on the vehicle's roof and over the hood. Illustrated are the fixed arcs 1 and the mobile arcs 2, including the mobile crossbars 41, and the mobile crossbar carriage 42, with the wheels 15, the wheel axle 16, and the axle sleeve 18. The carriage consists of the mobile crossbar carriage 42, including the squaring brackets 43, the crossbar frame clamps 44, and the holding clamps 45. It also shows the set of wheels 15, including the wheel axle 16 and the axle sleeve 18, rigidly mounted to the front of the fixed arcs 1, that are received by the mobile arcs 2 in the captive tracks 3, and the wheels 15, including the wheel axle 16 and the axle sleeve 18, rigidly mounted to the rear of the mobile arcs 2, to be received by the fixed arcs 1 in the captive tracks 3.

Also illustrated in this figure are the interlocking web members 4, the torque resistant front stop bar 47 and the torque resistant rear stop bar 46, both secured by the mounting clamps 59, including the set of spacing and stopping blocks 49, with the pad 50.

At the front of the mobile arcs 2 are the rolling pads 6 with the stabilizers 7, the mounting plate 9, the hinge pin 12, and the steel plate 14 with the magnet 13 attached to the bottom of the fixed arcs 1.

On the rear torque bar with axle sleeves 87, incorporated into the mobile arcs 2, is the deployment clutch 22 with the rod 27 and the handles 28, the control line 51, the spring 52, the spring holding pin 53, the tension detector 30, the electric motor with spool and locking clutch 66, and the battery 67, preferably secured to the mounting surface control panel 65.

The fixed arc 1 is preferably secured using the adjustable mounting brackets 58, with the bolts 61, and the nuts 62, and the arc wedge anchors 60.

The corner supports 57 and the squaring brackets 56 add to additional rigidity of the structure(s). This figure also includes the latch bar 69, along with the safety latches 68 and proximity sensors 80 attached to the transom 5. The power ON pushbutton(s) 79 attached to the fixed arcs 1, which preferably include the wheel transfer lever 85 and the lever hinge spring 86, are incorporated into the mobile arcs 2 for easy installation and removal or interchanging of the mobile crossbar carriage 42, and thus the cargo. Also included in this figure is the shock cord system 54, that stores the energy for deployment as the apparatus is retracted to its stowed position.

Figure 4:
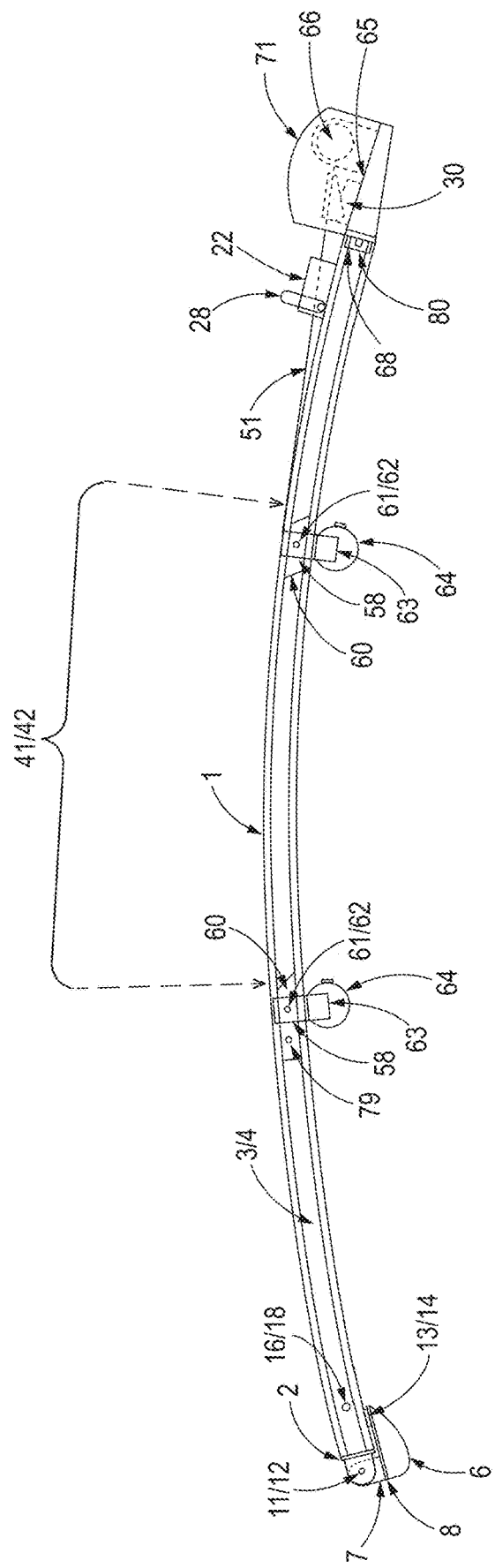
FIG. 4 is a side view of the apparatus retracted as it would be on the vehicle's roof.

FIG. 4 is a side view of the apparatus retracted as it would be on the vehicle's roof showing profile of the fixed arcs 1, including the general shape, the built-in captive tracks 3, the inner-locking webs 4, the fixed arc adjustable mounting bracket 58, the wedge anchor 60, the bolted connections 61/62, the adjustable height stand-offs 63, and the adjustable hold-down clamps 64. The figure further shows the rolling pad 6 and its components including a mounting platform 8, the stabilizer 7, the hinge pin sleeve 11, the hinge pin 12, the steel plate 14, and the magnet 13, installed to the bottom of the fixed arcs 1. Also shown is the wheel axle 16 and the axle sleeve 18, mounted to the front of the fixed arc 1, with the wheel 15 (not visible), received in the captive track of the mobile arc 2, behind fixed arc 1. In the mid-section behind the fixed arc 1 is the mobile arc 2 that contains the mobile crossbar carriage 42 and the mobile crossbars 41 (not visible), with stowed location as indicated.

At the rear of the fixed arc 1 is the location of the safety latches 68 and the proximity sensors 80, with the control line 51, visibly going through the deployment clutch 22, showing the handle 28, vertical. Also shown is the control panel 65, with the tension detector 30, the electric motor with spool and locking clutch 66, and a protective control system cover 71.

Figure 5:
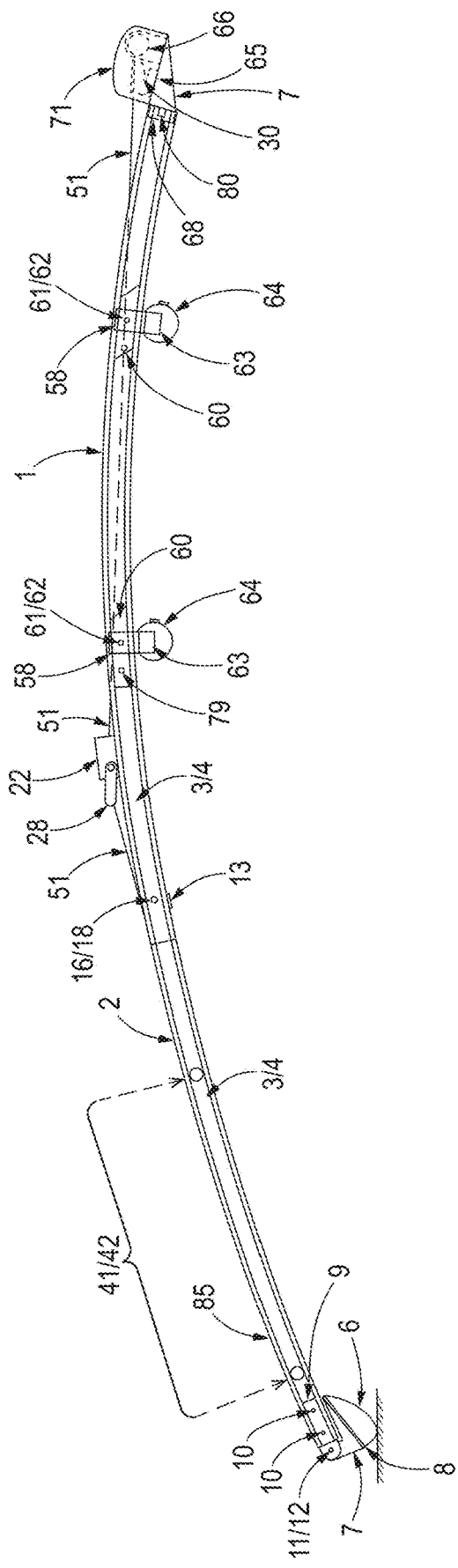
FIG. 5 is a side view of the apparatus extended and fully deployed as it would be on the vehicle's roof and hood.

FIG. 5 is a side view of the apparatus extended and fully deployed as it would be on the vehicle's roof and hood showing profile of the fixed arc 1, and the mobile arc 2, including to the general shape, the built-in captive tracks 3 including the inner-locking web 4, the fixed arc adjustable mounting bracket 58, the adjustable hold-down clamps 64 including the adjustable height stand-off 63, and the arc wedge anchor 60 with the associated nuts 62 and bolts 61 used to secure the fixed arc 1 to the vehicle.

The rolling pad 6, shown rolled back and in a locked position, has a mounting surface platform 8 to attach cushioned pad to and to provide structural support for a vertical stabilizer 7 that has the sleeve 11 and the hinge pin 12 allowing a pivot point from a structural mounting plate 9, which is secured to the web 4 with a set of mounting bolts 10. Also shown is the magnet 13 that secures the rolling pad 6, to the bottom of the fixed arc 1 when the apparatus is retracted and in a stowed position. The handle 28 is shown in a forward horizontal position indicating the deployment clutch 22 has released the control line 51, allowing the final deployment of the mobile crossbar carriage 42 and the mobile crossbars 41. The control panel 65 also shows the cover 71 that protects the tension detector 30, the electric motor with spool and locking clutch 66, and all other internal control components. Also shown are the safety latches 68, the proximity sensors 80, the power ON pushbutton(s) 79, the wheel axle 16 and the axle sleeve 18, attached to the web 4, of the fixed arc 1, with a wheel 15 received in the captive track 3, in the mobile arc 2.

Figure 6A:
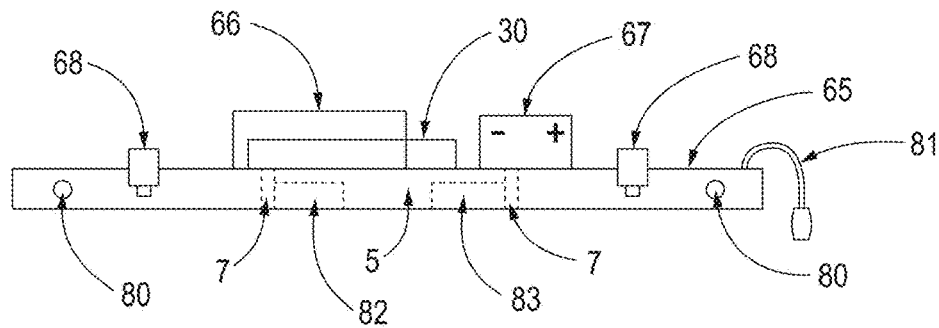
FIGS. 6A, 6B, 6C illustrate the major control system components used to control the mechanics of the apparatus for automated operation. Shown is a front view FIG. 6A, a rear view FIG. 6B, and a top view FIG. 6C.
Figure 6B:
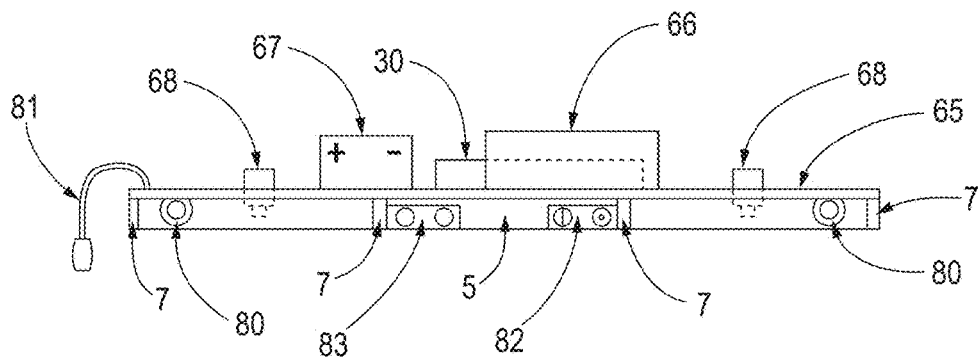
Figure 6C:
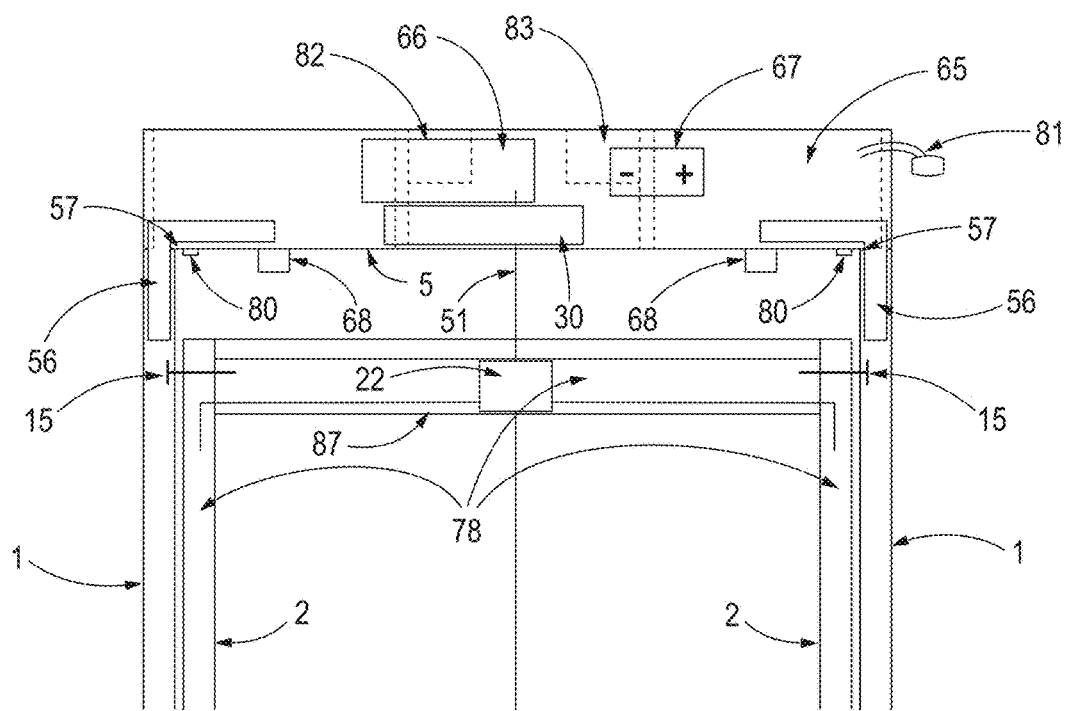

FIGS. 6A, 6B, 6C illustrate the major control system components used to control the mechanics of the apparatus for automated operation. Shown is a front view FIG. 6A, a rear view FIG. 6B, and a top view FIG. 6C of the control panel 65. Shown in the top view FIG. 6C, are the fixed arcs 1, connected to the control panel 65 by means of the squaring bracket 56, and the corner supports 57. Also shown is a partial view of the set of the mobile component(s) 78, of the apparatus partially deployed and consists of the mobile arcs 2, the rear torque bar with axle sleeves 87, the wheels 15, and are shown extending in the captive tracks of the fixed arcs 1, and the deployment clutch 22, with the control line 51 passing through. The control line 51, also passes through the tension detector 30, and is attached to the electric motor with spool and locking clutch 66. Also shown is an optional trailer lighting adapter cable 81, a control system "OFF" or "LOCK-OUT" 82, an accessory panel 83, the battery 67, the proximity sensors 80, the safety latches 68, the platform stabilizers 7, and the transom 5. These items are identified also in FIGS. 6A and 6B.

Figure 7A:
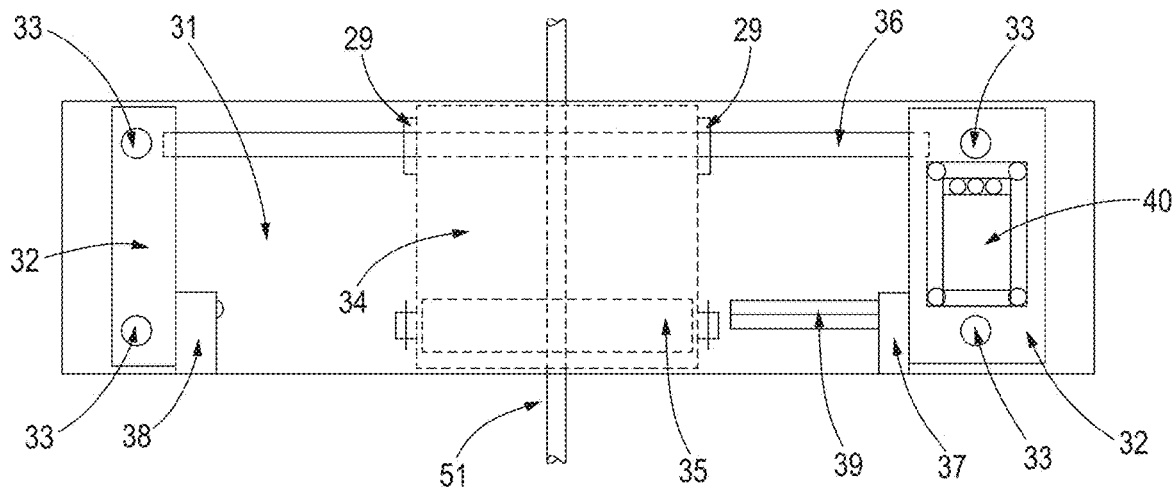
FIGS. 7A, 7B, 7C illustrate a tension detector that monitors tension in the control line(s) of an embodiment of the preferred invention. Shown is a top view FIG. 7A, a rear view FIG. 7B, and two side action views FIG. 7C.
Figure 7B:
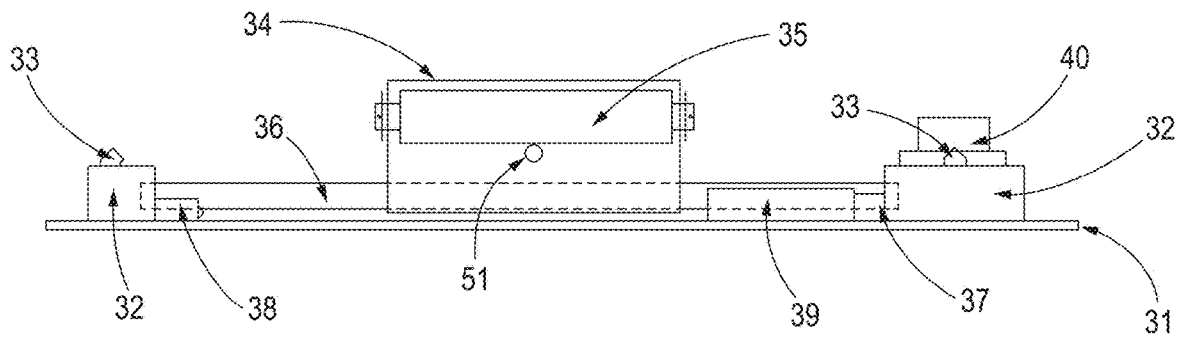
Figure 7C:
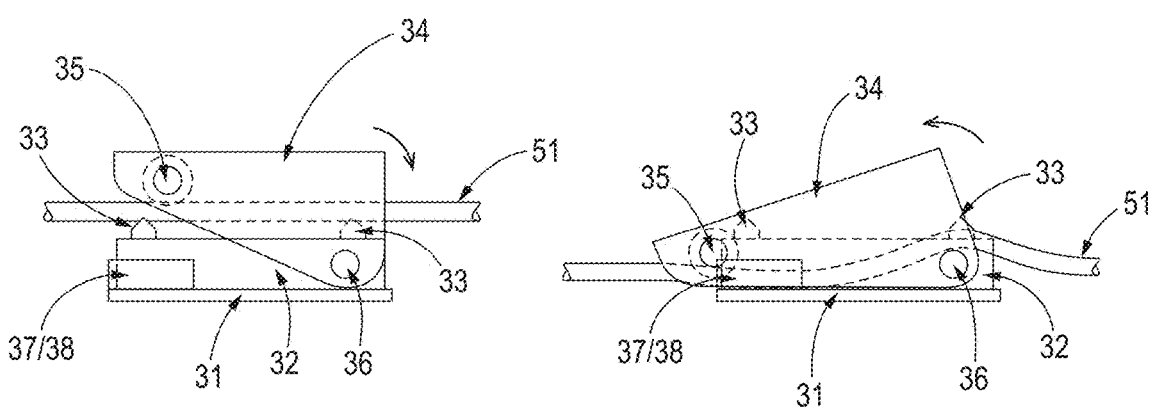

FIGS. 7A, 7B, 7C illustrate the tension detector 30 that monitors tension in the control line 51. A lever arm 34, having a mass positioned by a set of rubber washers 29 on a lever arm rod 36, including a rolling counter weight 35, is used to minimize friction on the control line 51, and is routed through the lever arm 34 and under the rolling counter weight 35. This allows the electric motor with spool and locking clutch 66 to retract and extend the control line 51 by rotating the spool, which allows the control line 51 tension to be monitored. When there is low tension on the control line 51 (FIG. 7C), the rolling counter weight 35, along with the lever arm 34 that has side panels, rotates and lays on a mounting plate 31. This may be a flat surface where an infrared emitter 37 and an infrared receiver 38 are located to a mounting block 32 using a set of screws 33 on each side of the lever arm 34. (See FIGS. 7A and 7B) The infrared receiver 38 is located at one end of a directional filter 39. Under low tension the lever arm 34 rests on the mounting plate 31 and prevents any infrared light from the emitter 37 from reaching the receiver 38. This photo-electric receiver sends a signal using a relay 40 to indicate low tension. The control system uses this signal to prevent the electric motor with spool and locking clutch 66 (not shown) from deploying.

Figure 8A:
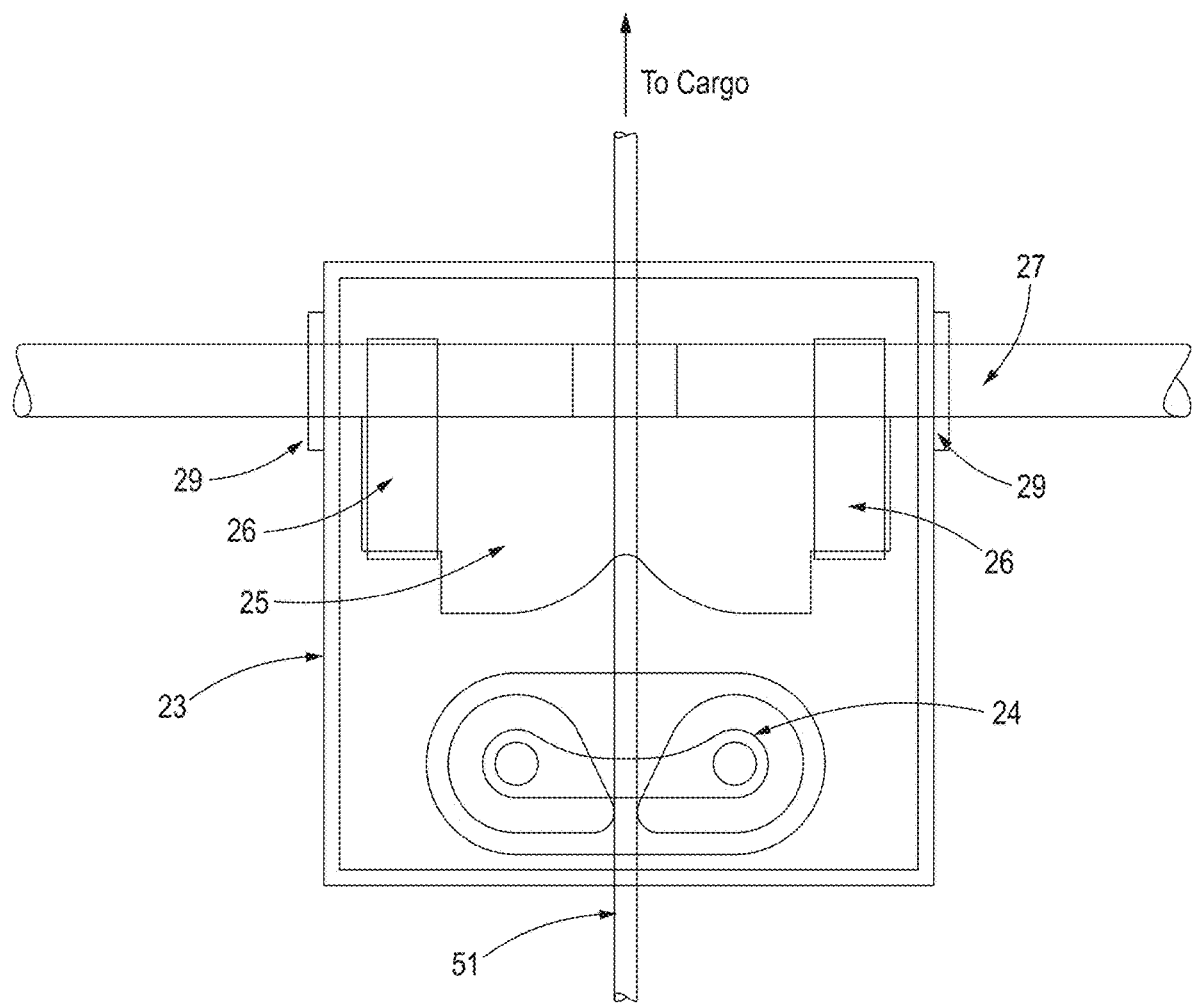
FIGS. 8A, 8B show internal parts and connections within an embodiment of a deployment clutch used to control the relationship of mobile components.
Figure 8B:
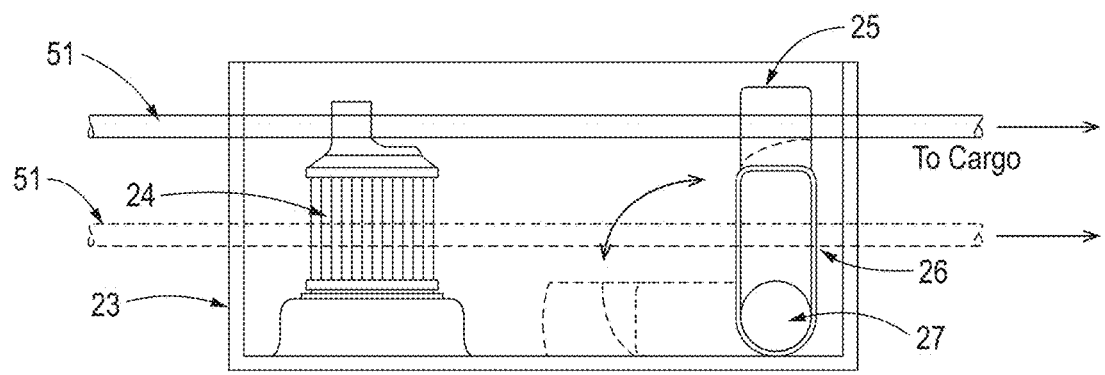

FIGS. 8A, 8B show internal parts and connections within the deployment clutch 22 used to control the relationship of the mobile components 78. The deployment clutch 22 is preferably automatically reset any time the apparatus is retracted. It can be re-released to deploy as needed. FIG. 8A is the top view and FIG. 8B is a side view of the internal components of the deployment clutch 22. The mechanics use a simple rotating butterfly 25 that can be activated by rotating the handle 28, connected to the rod 27, that uses a clamp 26 attached to the rotating butterfly 25, and uses a captive cam cleat 24. When the rotating butterfly 25 is in a vertical position it lifts and releases the control line 51 from the captive cam cleat 24 and allows the cargo carrier and cargo to deploy. The rotating butterfly 25 automatically flips down to a horizontal position when retracted. (See FIG. 8B) This places the self-feeding control line 51 through the captive cam cleat 24, allowing the line to slide through the captive cam cleat 24. A custom enclosure 23 with the rubber washers 29 is used to protect the moving components of the deployment clutch 22.

Figure 9:
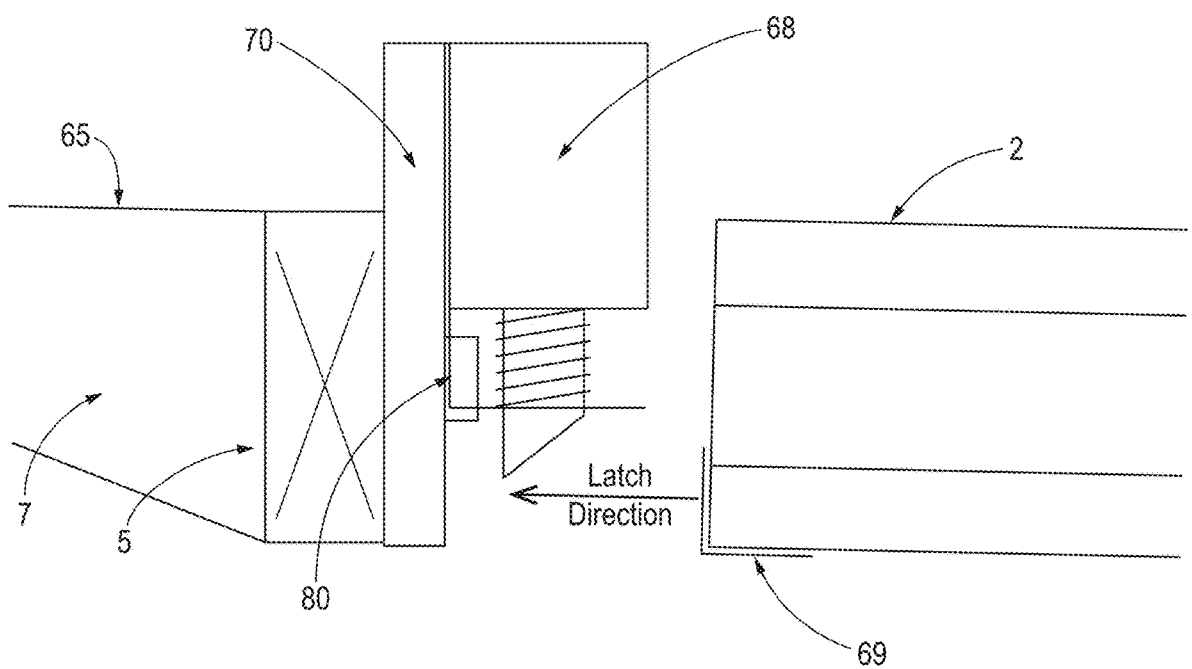
FIG. 9 illustrates a spring-loaded safety latch on a fixed control panel.

FIG. 9 illustrates the spring-loaded safety latches 68, secured to a mounting plate 70 and attached to the transom 5 of the fixed control panel 65. A latching plate 69 is connected to the rear of the mobile arcs 2. The proximity detectors 80 are used by the control system to indicate that the system is stowed and the electric motor with spool and locking clutch 66 is stopped. The latching plate 69 will not allow the mobile arc system to deploy without first energizing the spring loaded safety latches 68. This allows passive latching via the spring loaded safety latches 68, but requires power to allow release. In the event of the control line 51 failure or the electric motor with spool and locking clutch 66 failure, the mobile arcs 2 are retained and cannot deploy. All the mobile components 78 are preferably secured to the fixed arcs 1 and the vehicle.

Figure 10A:
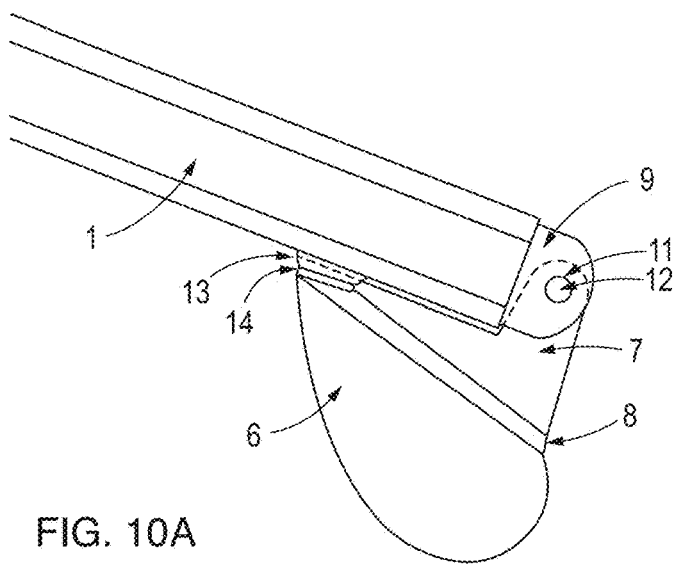
FIGS. 10A, 10B, 10C show a rolling pad(s) used in an embodiment of the present invention.
Figure 10B:
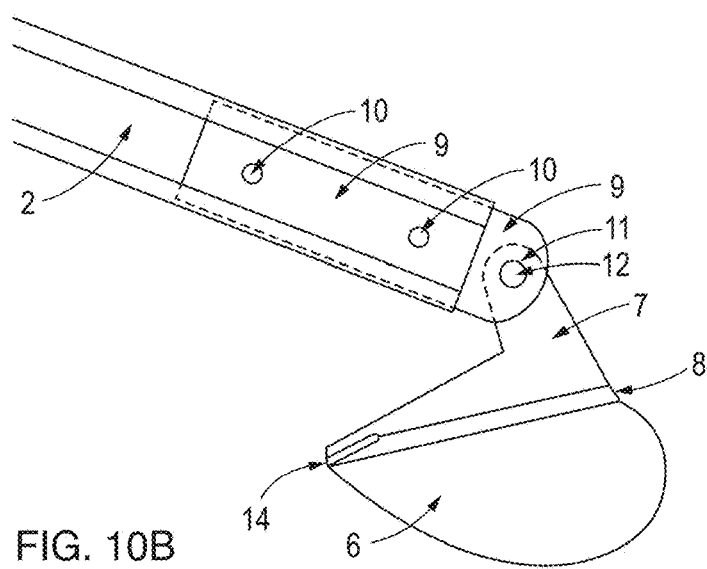
Figure 10C:
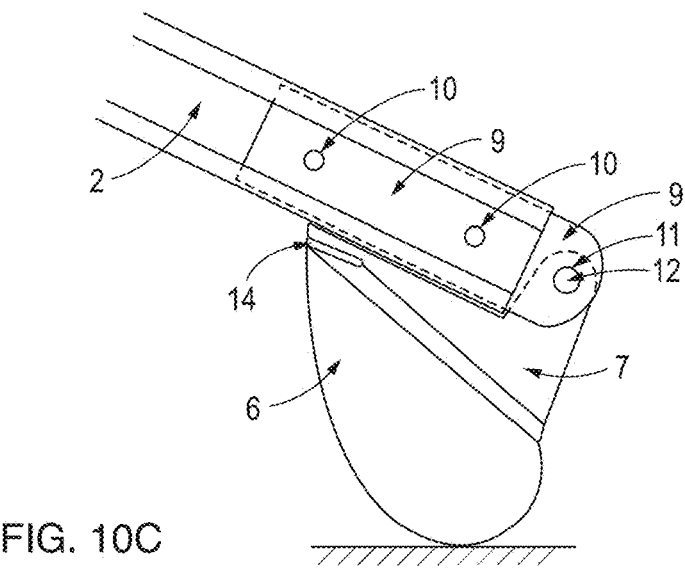

FIGS. 10A, 10B, 10C show the rolling pad 6 mounted to a platform 8 and connected to the stabilizer 7, which connects to a structural mounting plate 9 held by a set of holding bolts 10. A hinge pin 12 is inserted into an anti-friction sleeve 11. FIG. 10A is a side view of the rolling pads 6 in a stowed position when the apparatus is fully retracted and retained by the magnet 13, attached to the fixed arc 1 and the steel plate 14. The figure details the rigid connection between the mobile arcs 2 and the rotating rolling pad 6 pivoting at the point shown. FIG. 10B shows the rolling pad 6 after it is automatically released during deployment of the mobile arcs 2. The rolling pad 6 is in its released position ready for a soft, rolling connection with the vehicle's hood on deployment. Similarly, the pad rolls in the opposite direction for retraction and minimizes any sliding action on the vehicle's hood. FIG. 10C shows the rolling pad 6 when it is deployed and locked when on the supporting surface.

Figure 11A:
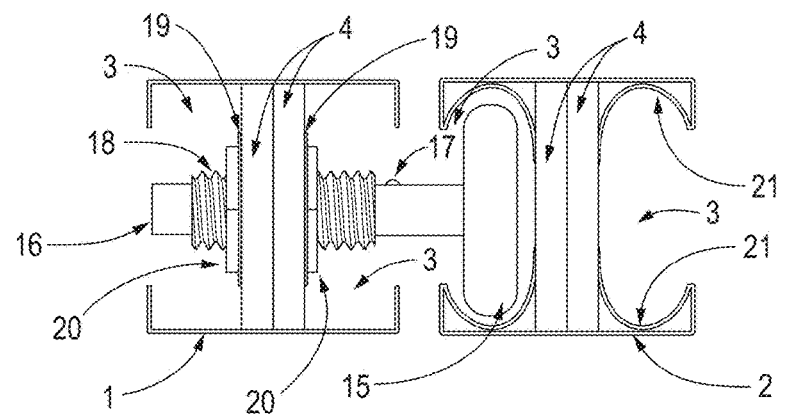
FIGS. 11A, 11B show cross sections of an I-beam design of an embodiment of the present invention.
Figure 11B:
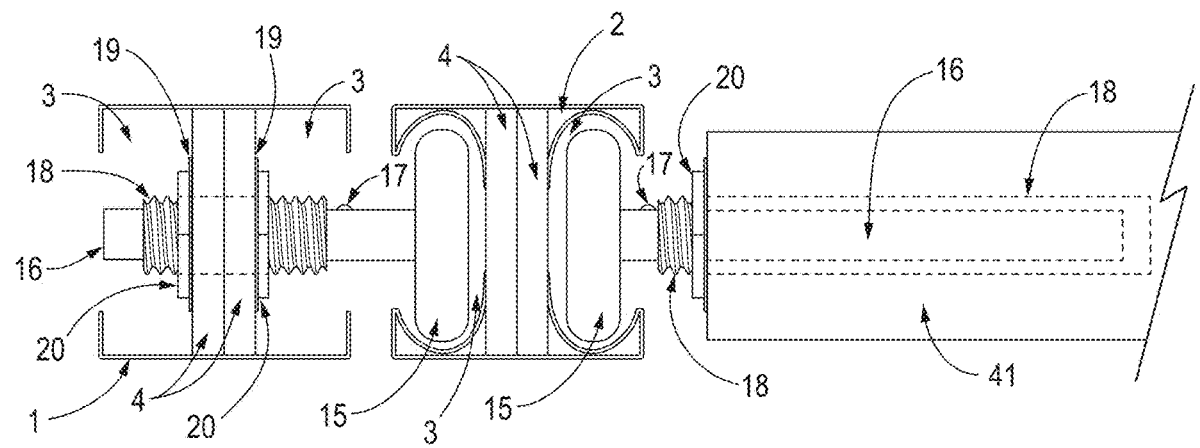

FIGS. 11A, 11B show cross sections of the I-beam design for the arcs 1 and 2, each with the dual captive tracks 3. Illustrated in FIG. 11A is the fixed arc 1 with the axle sleeve 18 attached to the I-beam arc web 4 using a nut 20 and a lock-washer 19 at a calibrated depth to receive the wheel axle 16, used to support and extend the wheel 15 to the mobile arcs 2. With the fixed arc 1 stationary, the mobile arc 2 is free to move. FIG. 11B shows the fixed arc 1 with the axle sleeve 18 securely attached at a calibrated depth to receive the wheel axle 16, which extends the wheel 15 to the mobile arc 2, and it includes the mobile crossbars 41 and the mobile crossbar carriage 42 within the mobile components 78. When assembled, the entire apparatus is preferably inner-locked and nested within itself and is completely captive. A wheel guide 21 positions the wheel 15 in a desired location of the track to minimize friction and guide the wheel 15 during deployment and retraction. Each wheel axle 16 provides a nubbin 17 to help maintain proper separation of the mobile components 78 and the fixed arcs 1.

FIGS. 12A, 12B, 12C, 12D show an embodiment that allows the arcs 1 and 2 to be modular in length. The top view is FIG. 12A and the side view is FIG. 12B. They illustrate a method to allow the arc design to incorporate modular sections to simplify manufacturing and shipping and allow custom length requirements. With the two-piece web 4, as shown, the adjoining web pieces can be designed to inner-lock (FIGS. 12A and 12B) for custom length requirements, and maintain a rigid structural connection without added materials. As an example, using arc sections manufactured at 3-foot and 4-foot lengths, or a wide variety of custom arc lengths at 6-foot, 7-foot and 8-foot, can be used for a custom fit to a vehicle. This can also be valuable for packaging, shipping and storage, and can minimize warehouse or retail shelf space. FIGS. 12C and 12D show a cross section of a dual track I-beam arc without and with the wheel guide 21. The self-guides provide additional alignment.

Figure 13A:
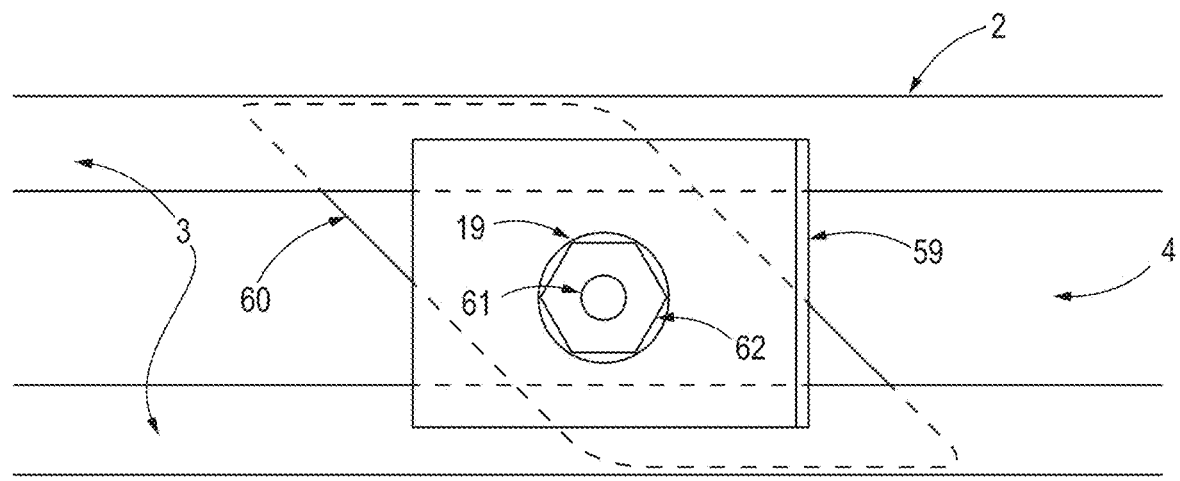
FIGS. 13A, 13B show a side view (FIG. 13A) and a top view (FIG. 13B) of a mobile arc.
Figure 13B:
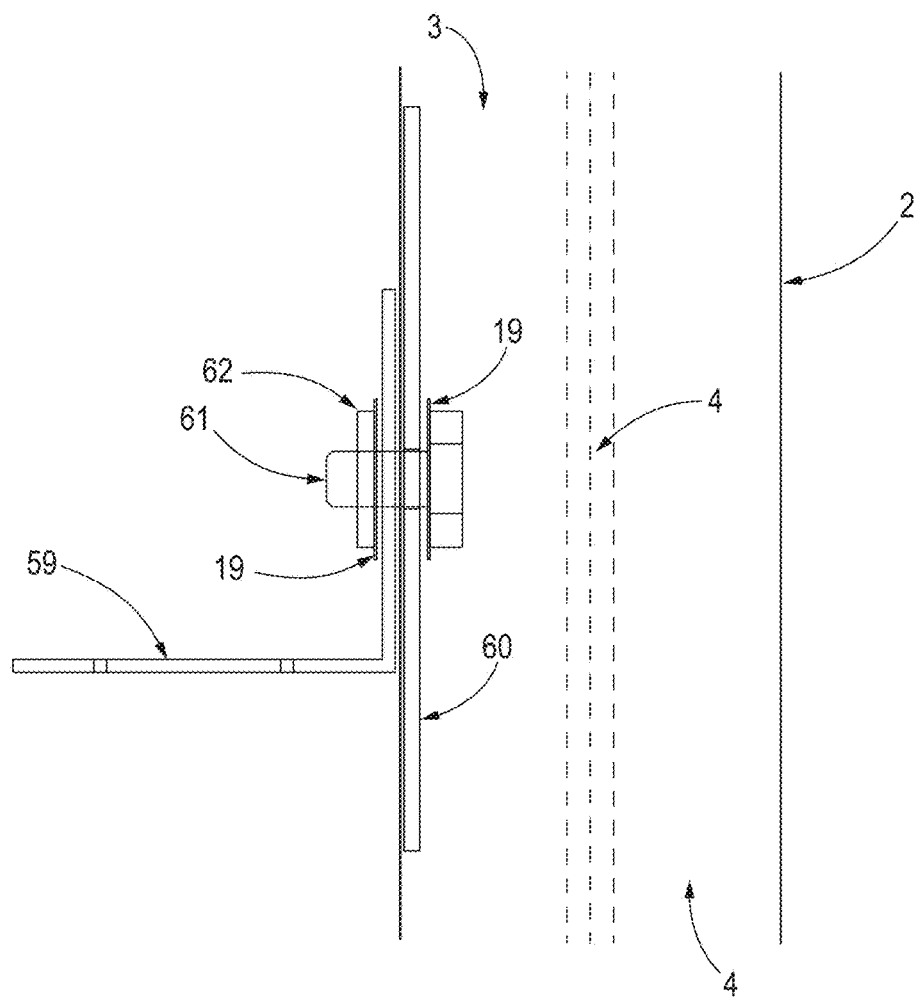

FIGS. 13A, 13B contain both a side view and a top view of the mobile arc 2 in an I-beam configuration. It illustrates how the apparatus utilizes the captive tracks 3, and allows captive locking through compression for an adjustable crossbar mounting bracket 59 and the arc wedge anchor 60 using the bolt 61, the nut 62, and the lock-washer 19. The captive track 3 provides a rigid yet adjustable mounting method for mounting the front torque resistant stop bar 47 and the rear stop bar 46. This technique also is utilized for the tracks of the fixed arcs 1.

Figure 14A:
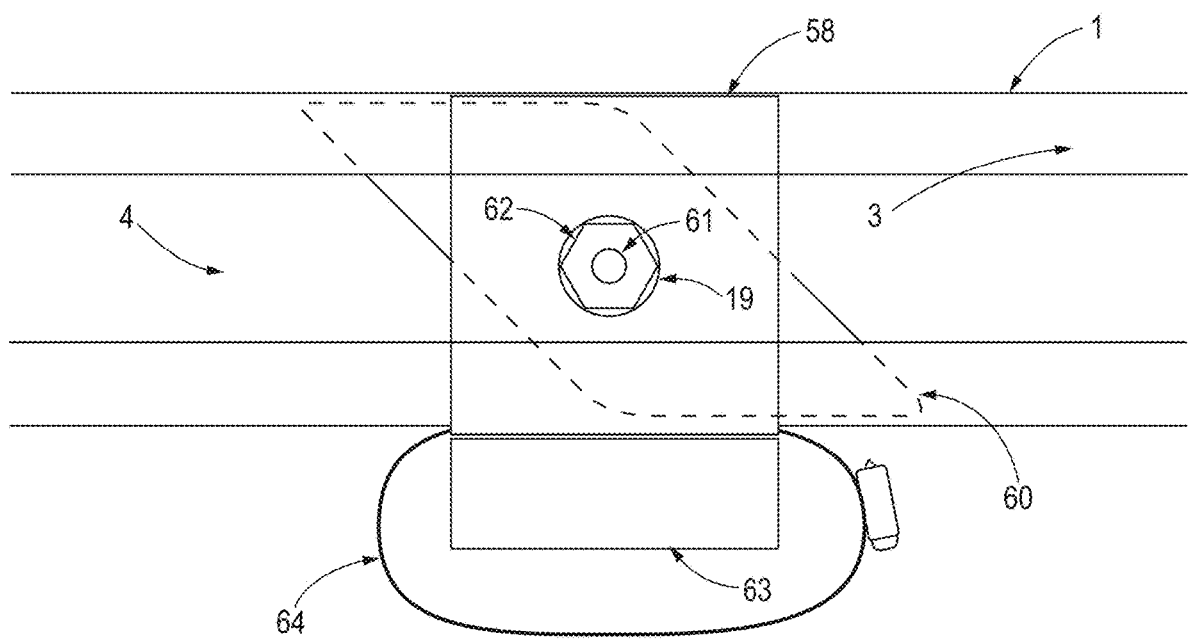
FIGS. 14A, 14B show a side view (FIG. 14A) and cross section view (FIG. 14B) of a fixed arc adjustable mounting bracket.
Figure 14B:
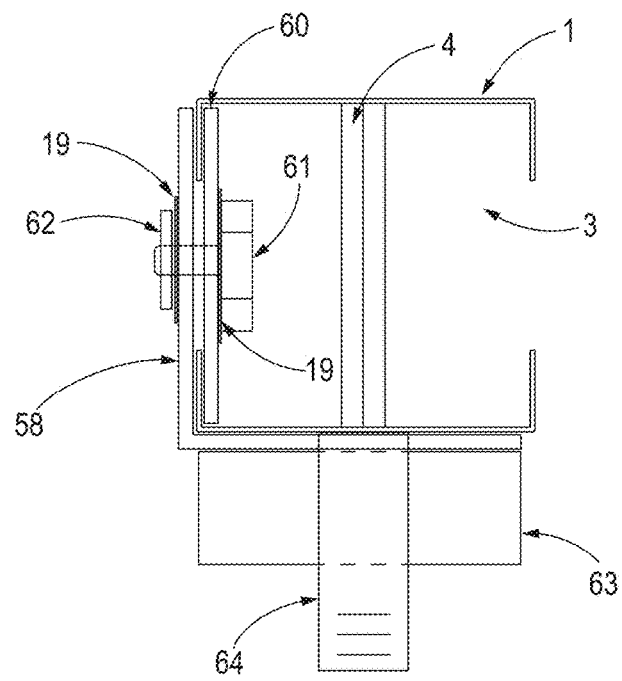

FIGS. 14A, 14B contain a side view and cross section view of the I-beam fixed arc 1. It illustrates that one of the captive tracks 3 is used as track for the wheel 15, and the opposite side of the I-beam is used to connect the fixed arc adjustable mounting bracket 58 and the adjustable hold-down clamps 64 using the arc wedge anchors 60. The captive track 3 provides a rigid yet adjustable mounting method for mounting this apparatus to the existing vehicle roof-rack crossbars 72 or the built in track 73 of the vehicle. This eliminates the need for pre-drilled holes for mounting and allows dynamic yet precise mounting locations. Using the adjustable height standoff 63, the location of the mobile arcs 2 can be adjusted by several inches when deployed on the hood. The adjustable hold-down clamps 64 provide a standard method to attach to the existing vehicle roof-rack crossbars 72.

Figure 15:
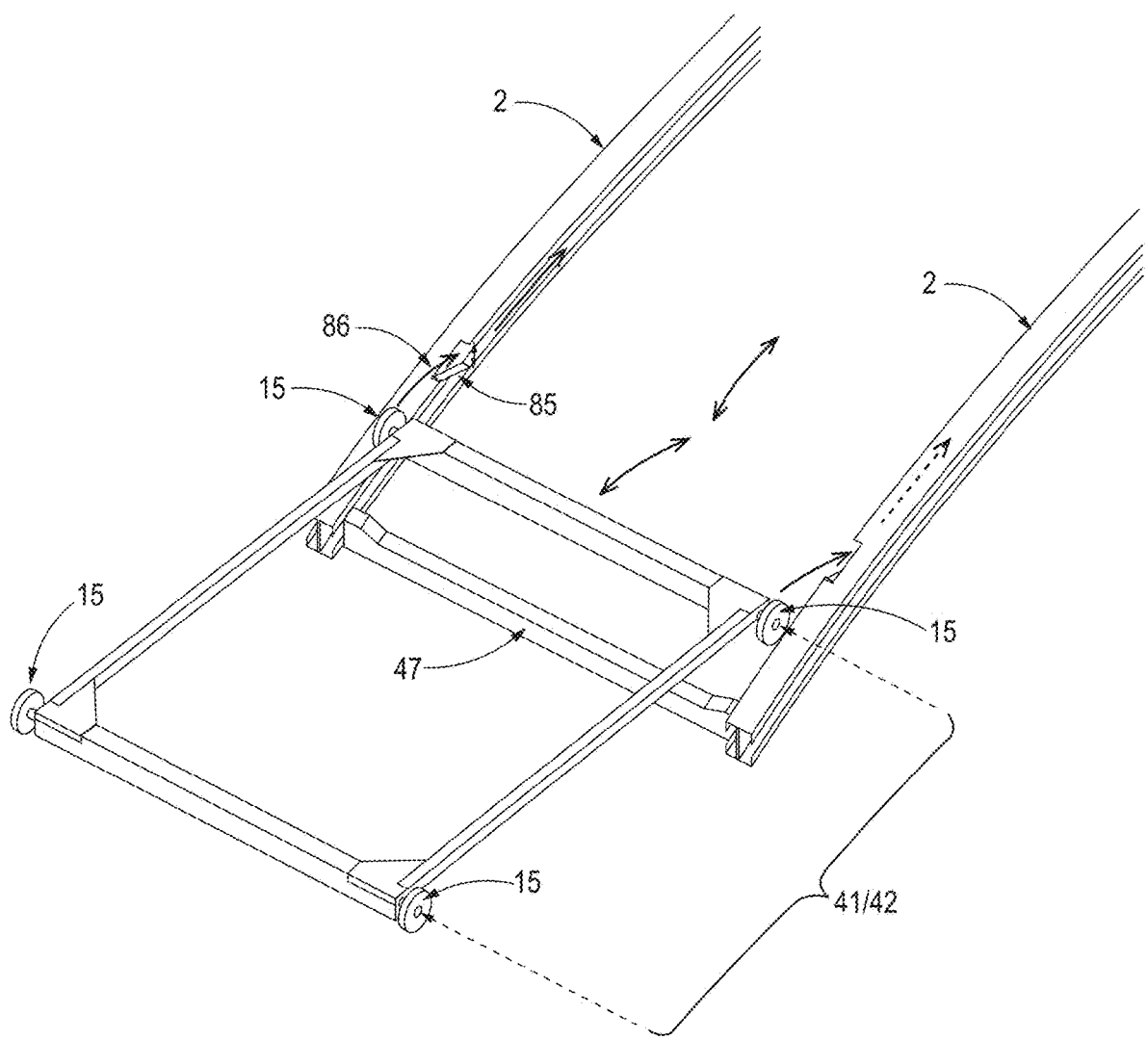
FIG. 15 is an illustration of a spring loaded hinge embodiment of the present invention.

FIG. 15 is an illustration of the spring loaded hinge 86 and the drop-down track 85 that allows simple transfer or removal of the mobile crossbars 41, the mobile crossbar carriage 42 and wheels 15 from the mobile arcs 2. This method can also be used to install and remove the mobile components 78 from the fixed arcs 1.

Figure 16:
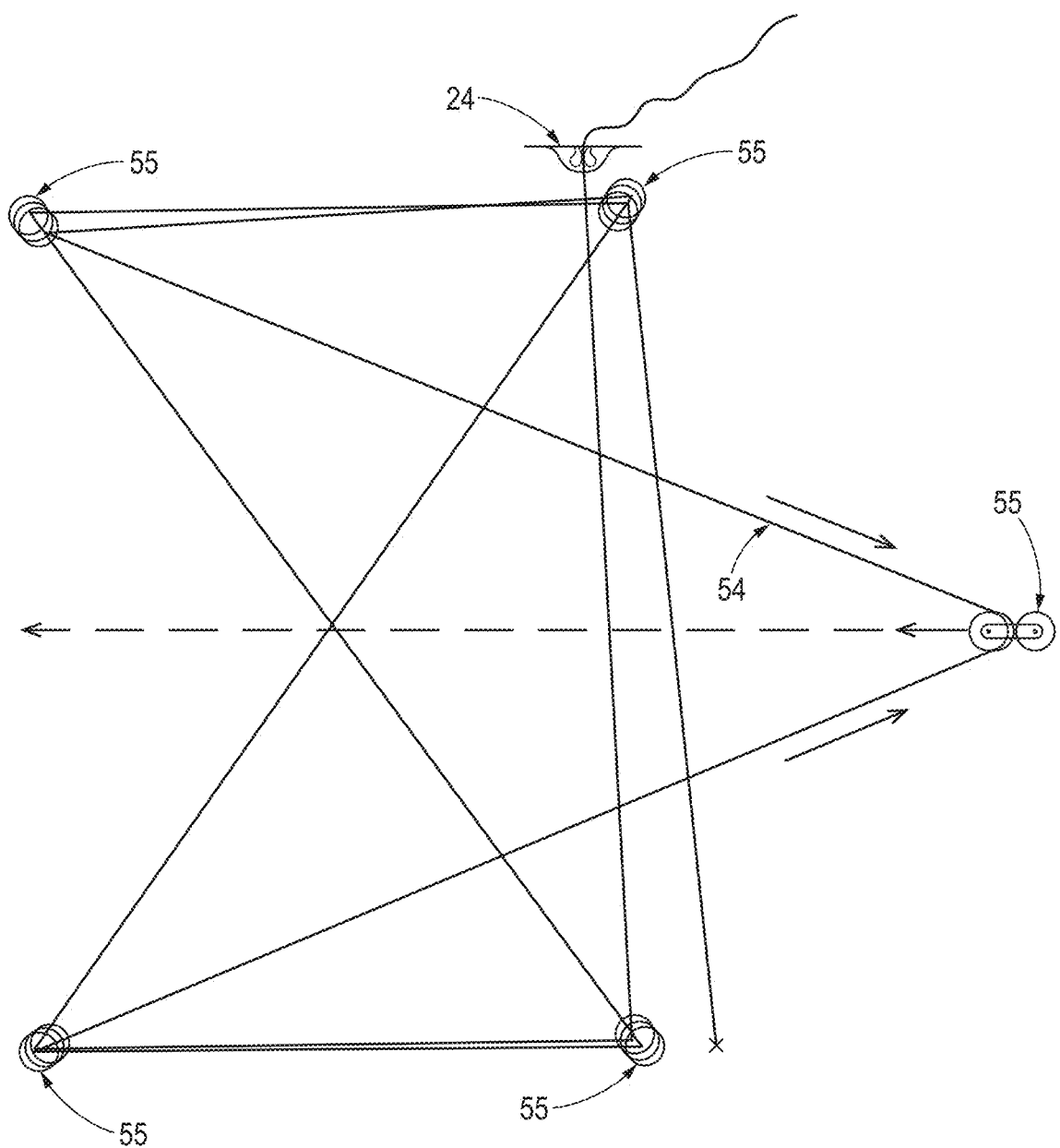
FIG. 16 illustrates a mid-section, under-carriage embodiment showing five double pulleys.

FIG. 16 illustrates a mid-section, under-carriage embodiment showing five double pulleys 55. The four double pulleys 55 are attached to fixed points and the remaining pulley 55 is attached to the rear torque bar with axel sleeves 87, and the shock cord system 54 provides stored mechanical energy, namely, a forward force. The stored energy assists during initial deployment of the mobile arcs 2, the mobile crossbars 41, and the mobile crossbar carriage 42 before natural gravity forces dominate. The shock cord system 54 stores mechanical energy during final retraction and is ready for applying the required force during the next deployment. The shock cord system 54 is pre-loaded and typically does not need any adjustments for a given vehicle once set.

Figure 17:
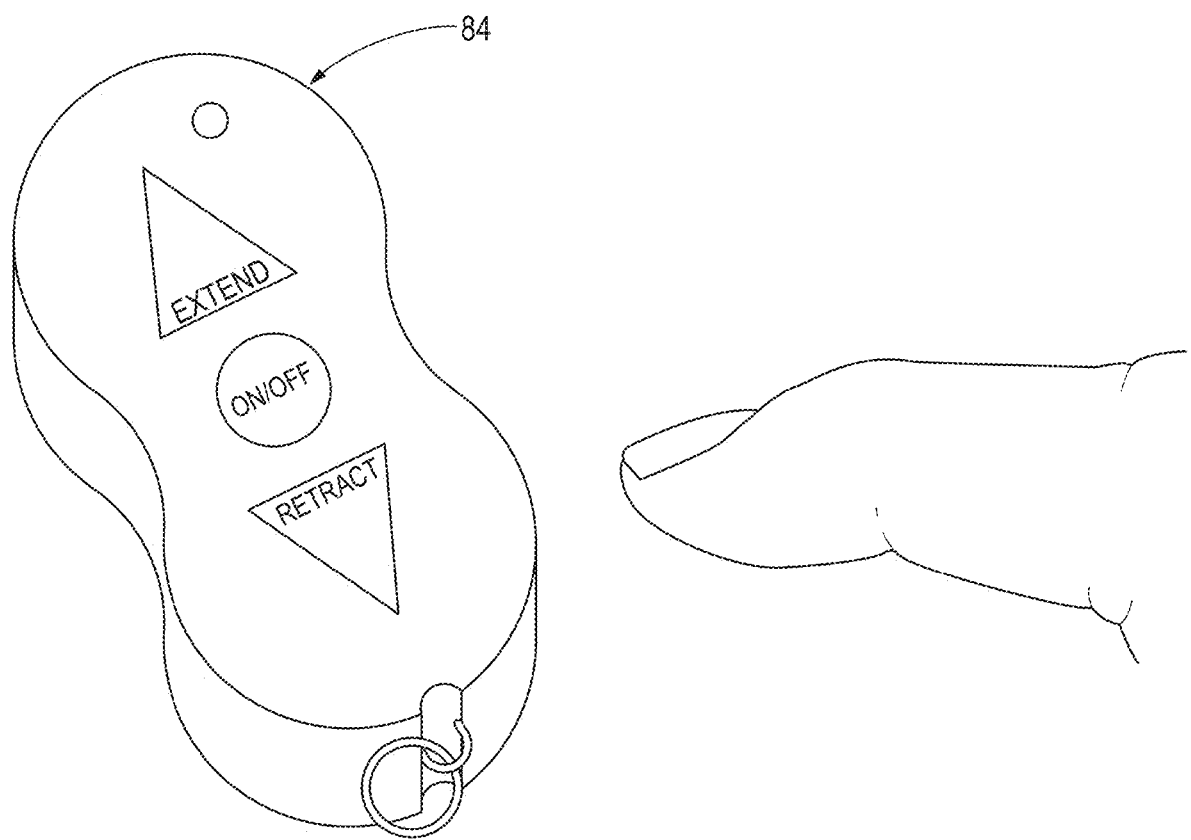
FIG. 17 shows an exemplary remote control unit that may optionally be used with the present invention to control deployment and retraction of the cargo carrier and cargo.

FIG. 17 shows an example remote control unit 84, and is used to control deployment and retraction of a cargo carrier 123 and cargo.

Figure 18:
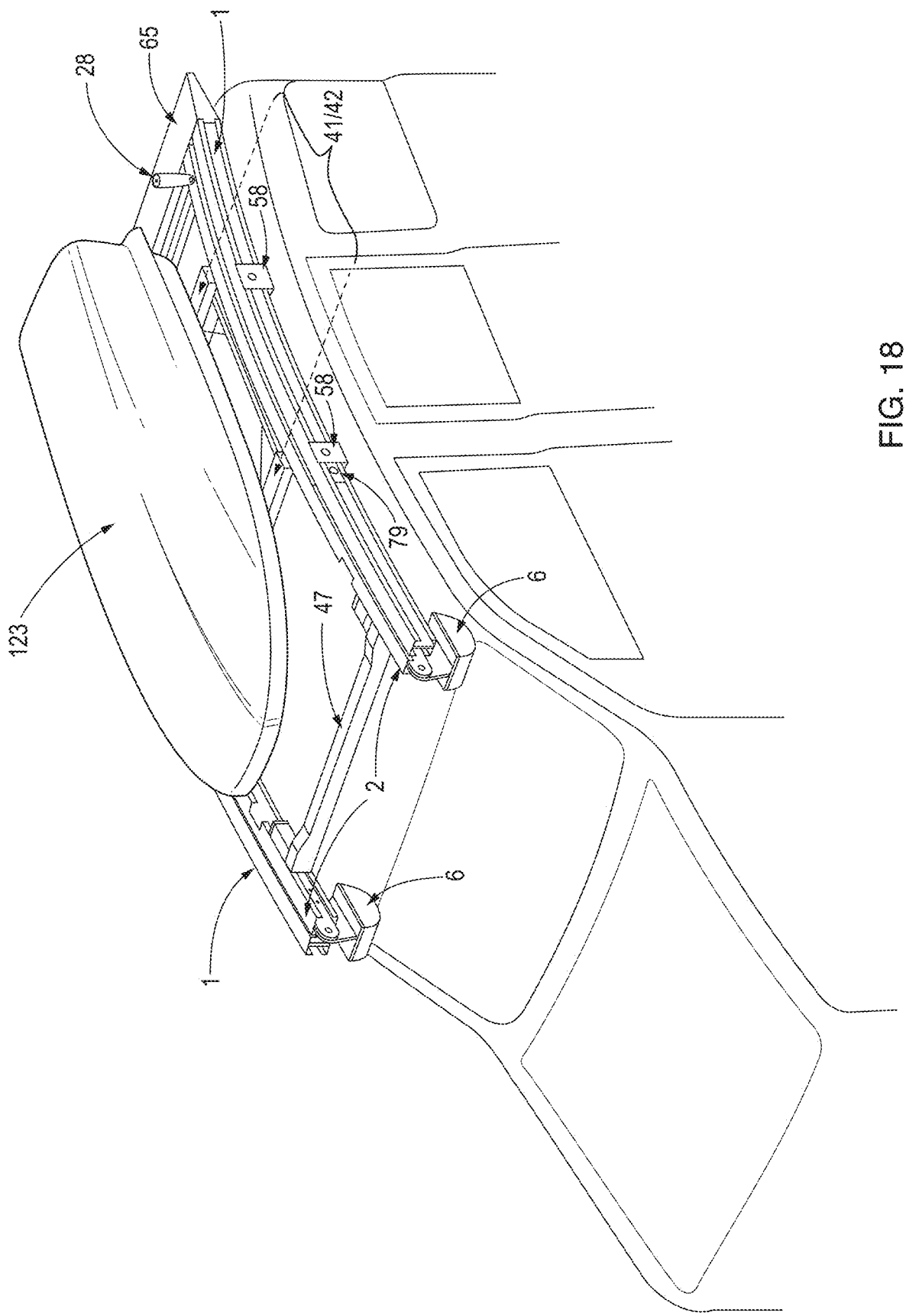
FIG. 18 illustrates an embodiment of the present invention fully retracted on a typical vehicle rooftop.

FIG. 18 illustrates an embodiment of the present invention fully retracted on a typical vehicle rooftop. The fixed arcs 1 are attached to the fixed arc adjustable mounting bracket 58 for mounting to the vehicle. In this example, the mobile arcs 2 are locked in their retracted position and the handles 28 of the deployment clutch 22 (not visible) are shown vertical, indicating that the control line 51 (not visible) is locked and securing the mobile arcs 2, the mobile crossbars 41, the mobile crossbar carriage 42, and the cargo carrier 123 in their stowed and fully retracted position. The front torque-resistant stop bar 47 is visible along with the control panel 65. The rolling pads 6 are retracted in their stowed position and the power ON pushbutton(s) 79 have not been engaged.

Figure 19:
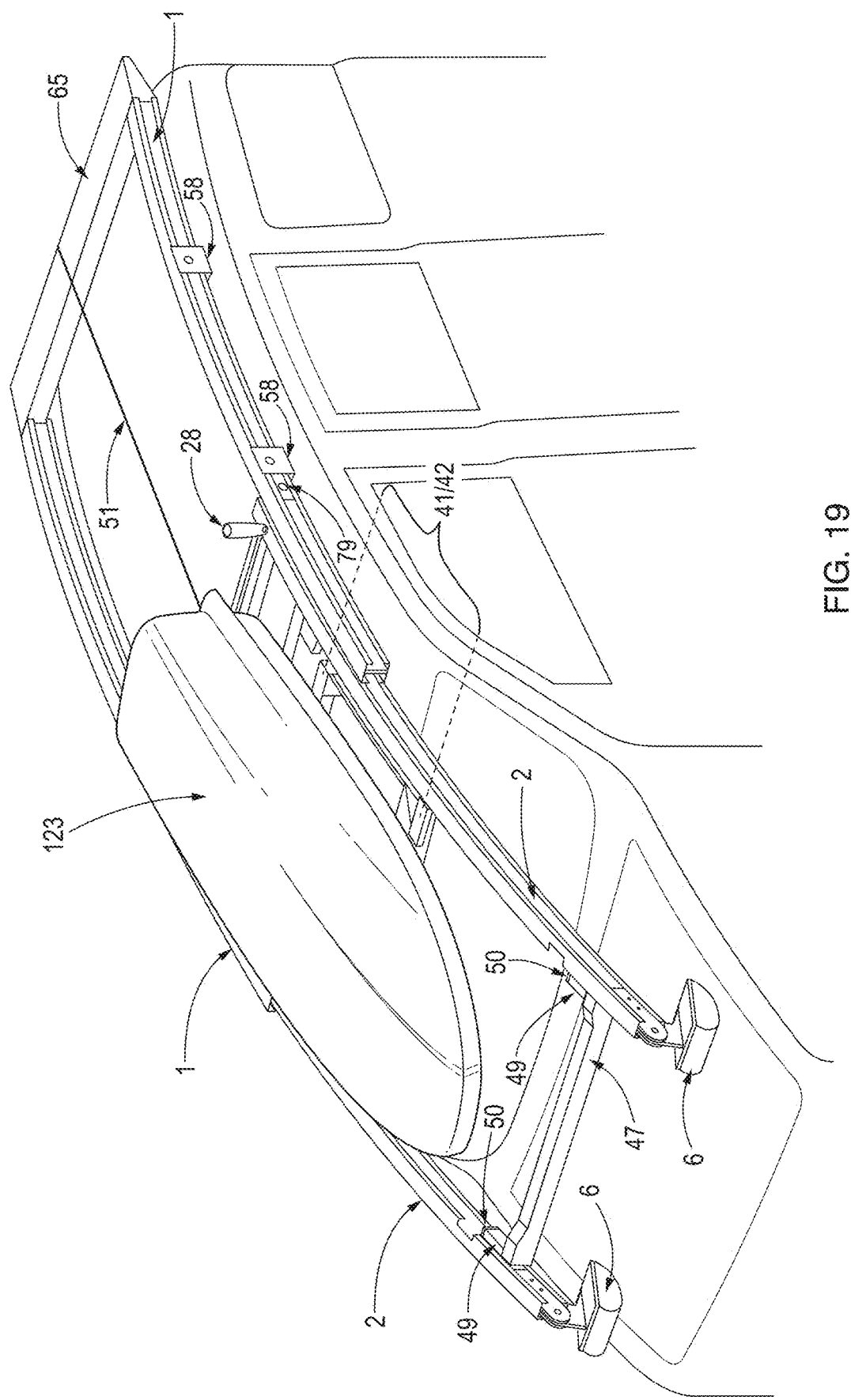
FIG. 19 illustrates the embodiment of FIG. 18, wherein the mobile arcs are deployed over the vehicle hood just prior to making contact.

FIG. 19 illustrates the embodiment of FIG. 18, wherein the mobile arcs 2 are deployed over the vehicle hood just prior to making contact. The fixed arcs 1 are attached to the vehicle with the fixed arc adjustable mounting bracket 58. The power ON pushbutton(s) 79 are used to activate the control system. The remote control unit 84 (see FIG. 17) has been activated and the "extend" button has been pushed releasing the safety latches 68 (see FIG. 9), and the electric motor with spool and locking clutch 66 (see FIGS. 6A, 6B, 6C), releases the control line 51 for a controlled deployment of the mobile arcs 2, the mobile crossbars 41, the mobile crossbar carriage 42, and the cargo carrier 123. The handles 28 are still in their vertical position indicating the deployment clutch 22 (not visible) is still securing the mobile crossbars 41, the mobile crossbar carriage 42, and the cargo carrier 123 in their stowed position in respect to the mobile arcs 2. The control panel 65 and the front torque-resistant stop bar 47 are visible, along with the stop blocks 49 and pads 50. The rolling landing pads 6 have automatically released from their stowed position hanging more vertical and are ready for a soft, scratch resistant connection with the vehicle hood.

Figure 20:
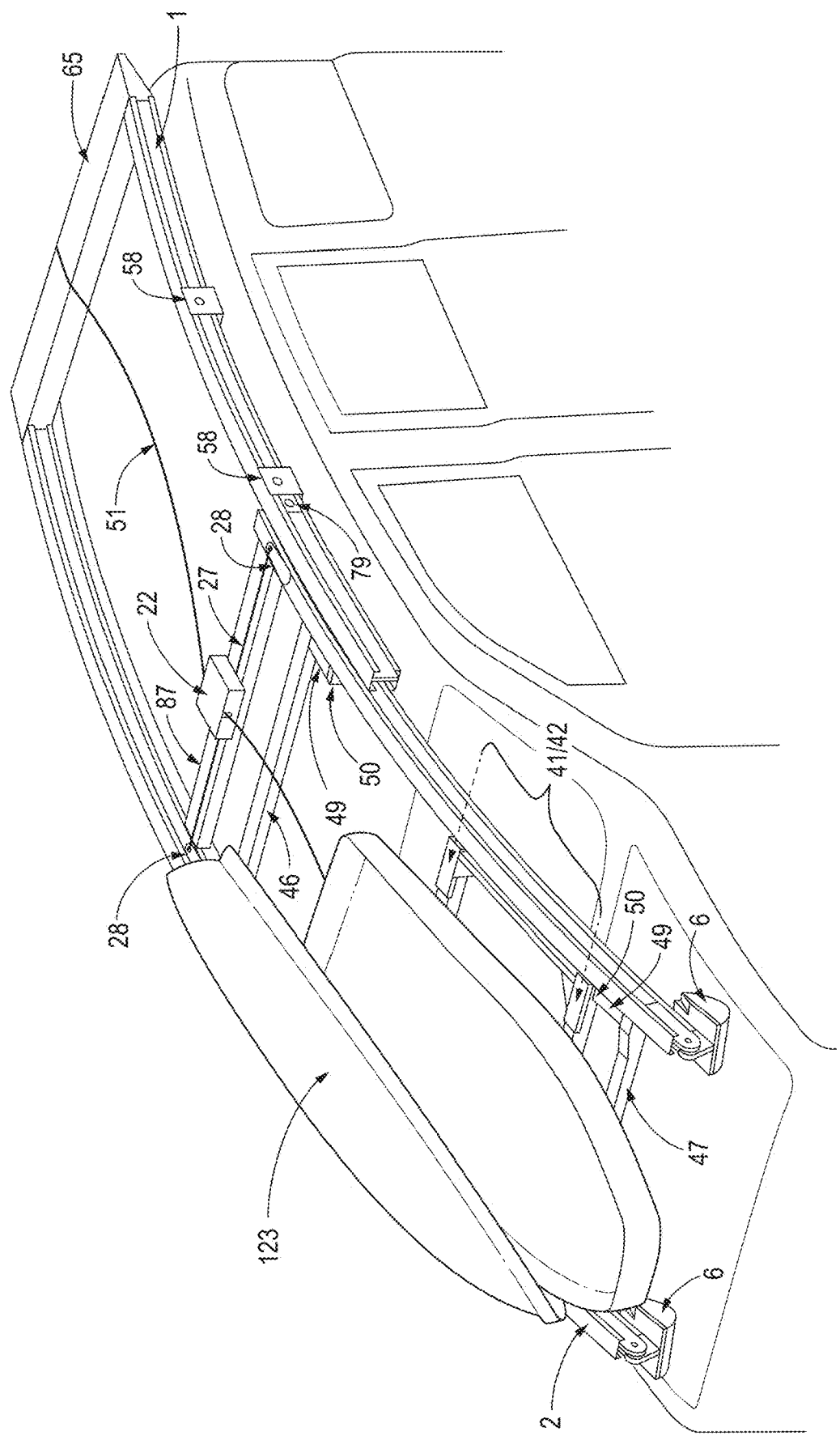
FIG. 20 illustrates the embodiment of FIG. 18 fully deployed over the vehicle hood.

FIG. 20 illustrates the embodiment of FIG. 18, continuing the operational example further shown with reference to FIG. 19, where the mobile arcs 2 and the cargo carrier 123 have fully deployed onto the vehicle hood. The fixed arcs 1 attached to the vehicle with the fixed arc mounting brackets 58, as shown in this illustration, have transitioned from a four-point contact embodiment to a six-point contact embodiment, with the rolling pads 6 now in contact with the hood, folded under and locked tight against the mobile arcs 2 securing the system. The handles 28 connected to the rod 27 are rotated horizontal indicating that the deployment clutch 22 (see FIGS. 8A, 8B) has released the control line 51 for final deployment of the mobile crossbars 41, the mobile crossbar carriage 42 and the cargo carrier 123 to the front torque-resistant stop bar 47 of the mobile arcs 2 allowing a soft stopping motion resting on the stop blocks 49 with pads 50. The control panel 65 is shown along with the rear adjustable stop bar 46, the stop blocks 49, the pads 50, along with the rear torque bar with axle sleeves 87. The tension detector 30 (see FIGS. 6A, 6B, 6C, 7A, 7B, 7C), stops the electric motor with spool and locking clutch 66 (see FIGS. 6A, 6B, 6C) and the control line 51 is slack. For retraction, the steps described above happen in reverse.

Figure 21:
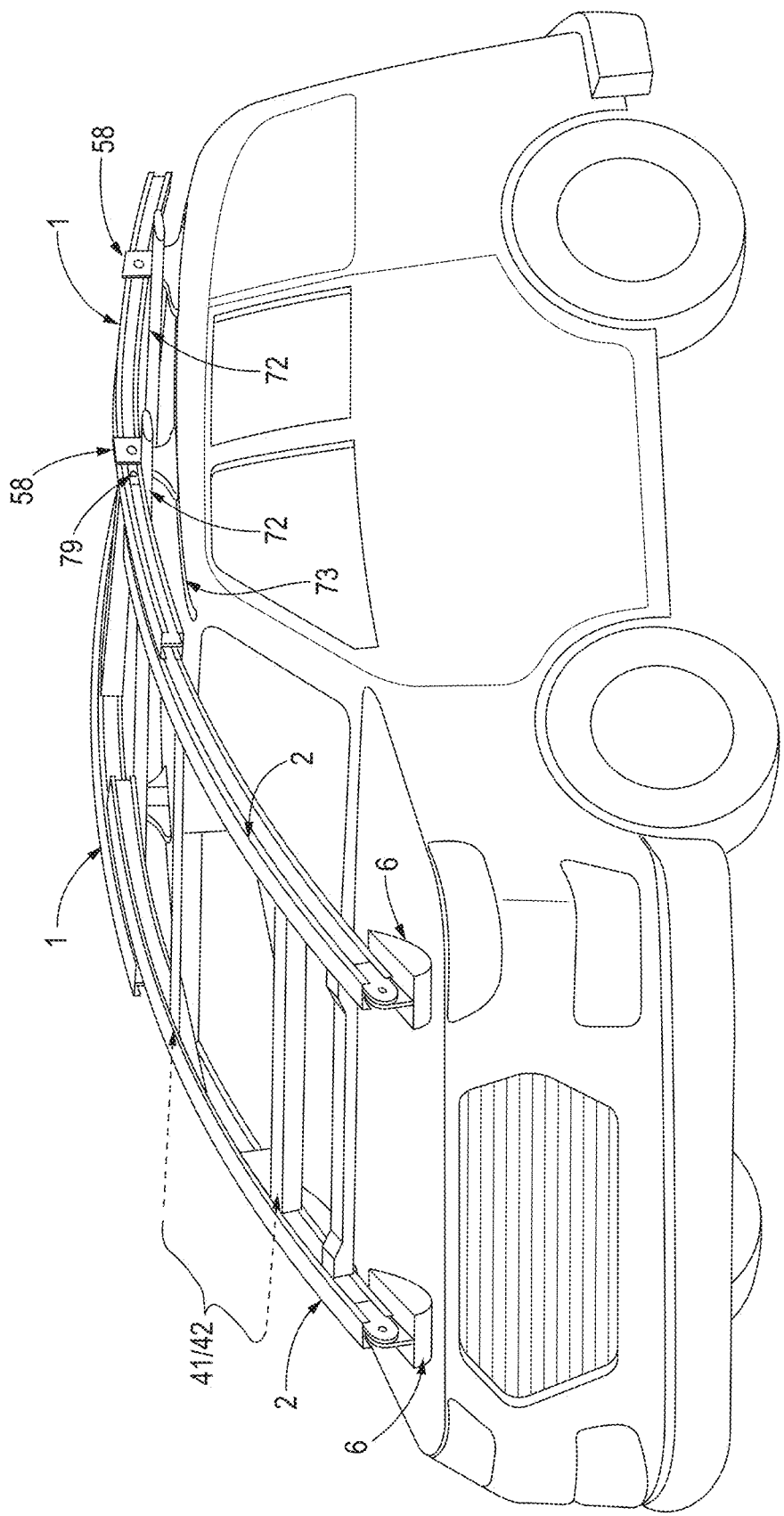
FIG. 21 illustrates the mounting of fixed arcs on existing vehicle roof-rack crossbars.

FIG. 21 illustrates the mounting of the fixed arcs 1 onto the existing vehicle built-in track 73 and roof-rack crossbars 72 using the adjustable mounting brackets 58 and the mounting clamps 64 (see FIGS. 14A, 14B), as one of three alternative installation methods. This figure shows a fully deployed apparatus with the rolling landing pads 6 on the hood of the vehicle with the mobile arcs 2 and the mobile crossbar carriage 42, along with the mobile crossbars 41, fully deployed.

Figure 22:
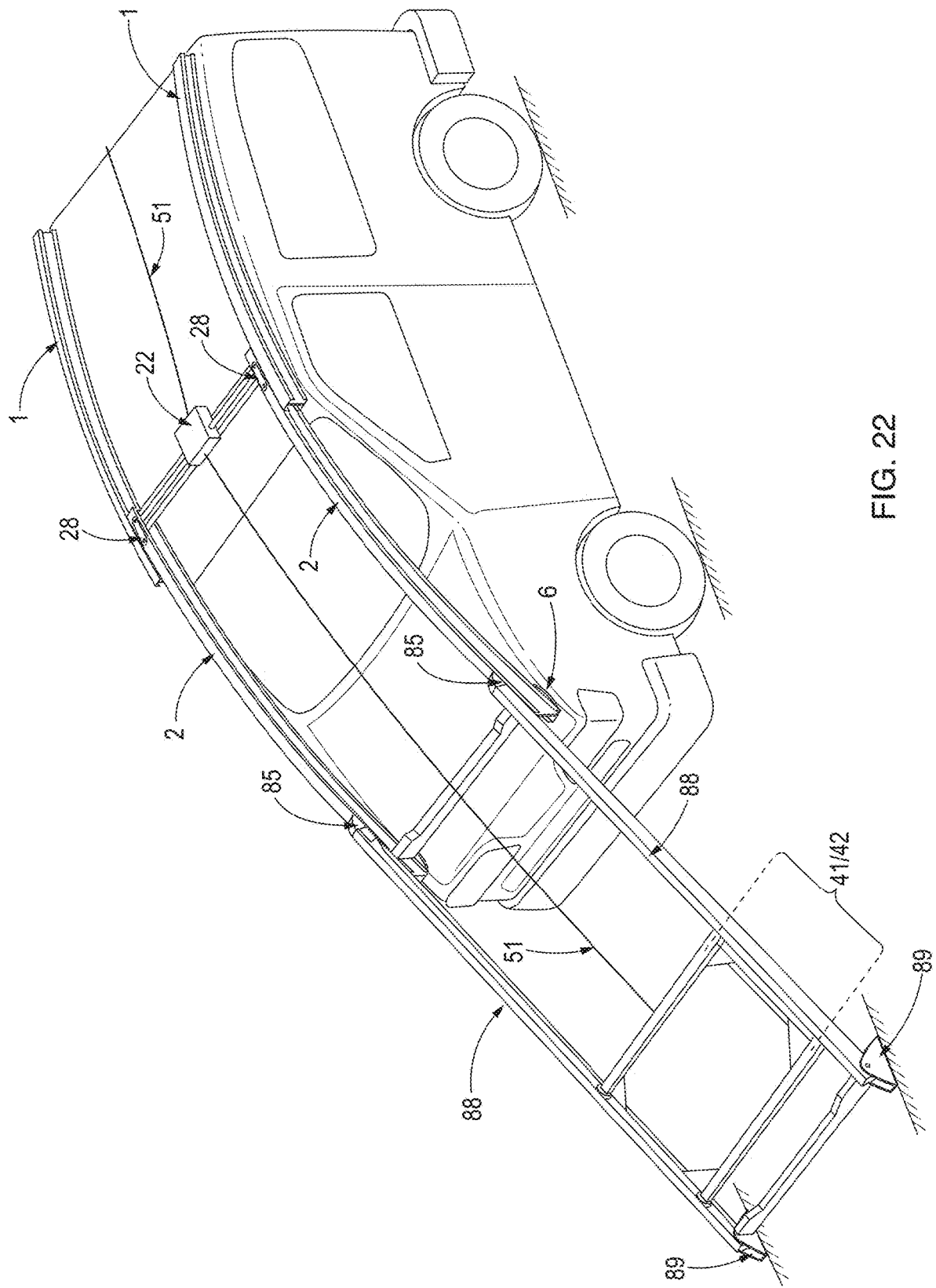
FIG. 22 illustrates an add-on optional embodiment for further extension of the mobile crossbar carriage to the ground.

FIG. 22 illustrates an add-on optional embodiment for further extension of the mobile crossbar carriage 42 and the mobile crossbars 41 to the ground by using a set of add-on extension rails 88 with a set of extension rail landing pads 89. This figure shows the mobile arcs 2 fully extended from the fixed arcs 1. The deployment clutch 22 and handles 28 are horizontal, indicating the deployment clutch 22 has released the control line 51 for additional length deployment of the mobile crossbar carriage 42. The add-on extension rails 88 preferably clip on the mobile arcs 2 with a receiver that lowers the wheel transfer lever 85 such that the mobile crossbar carriage 42 and wheels 15 transfer from the mobile arcs 2 to the add-on extension rails 88, which have built-in captive tracks. (See FIG. 15)

Figure 23:
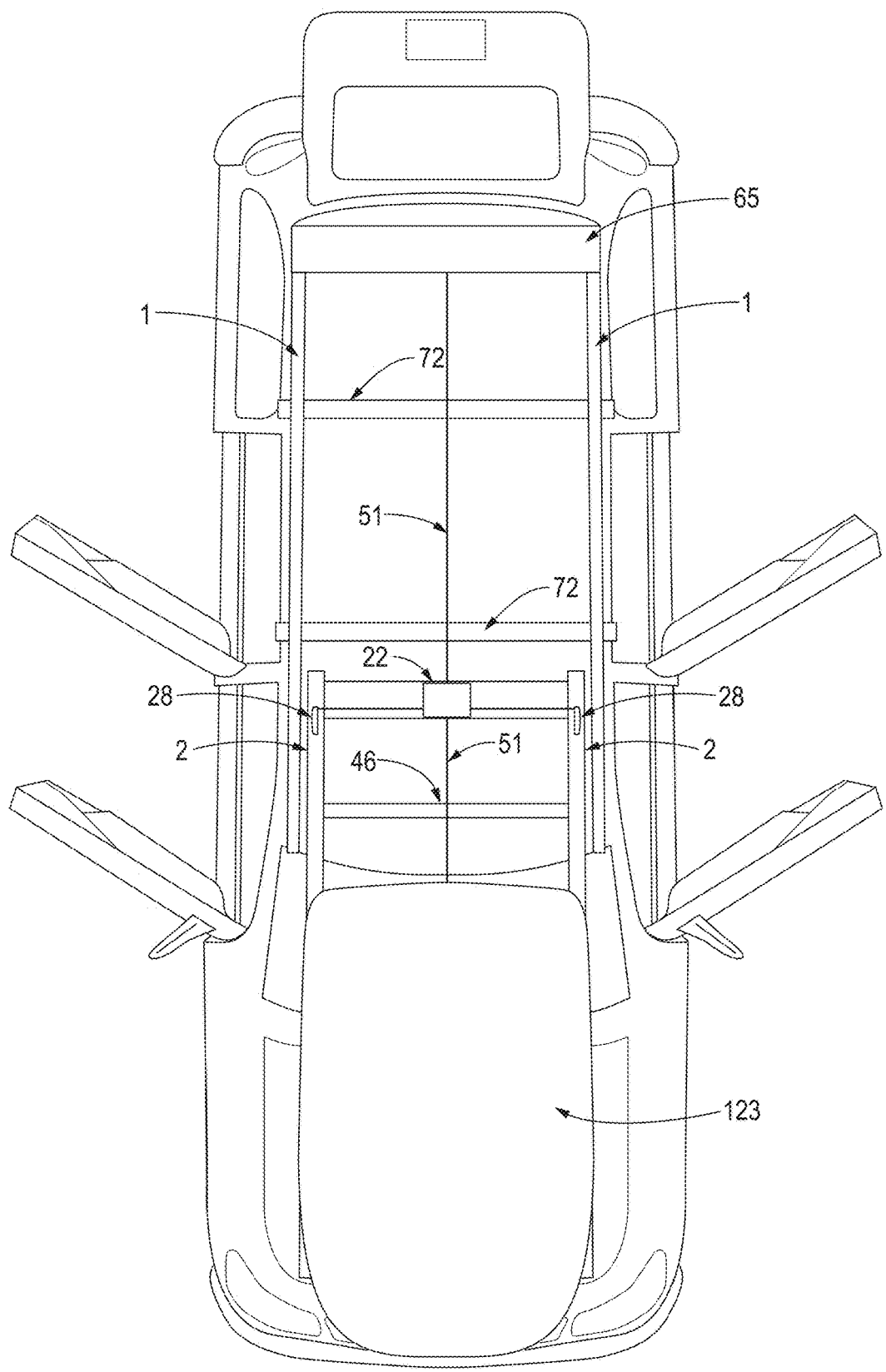
FIG. 23 shows a top-view illustration of the apparatus and cargo fully deployed over the hood.

FIG. 23 shows a top-view illustration of the apparatus and cargo fully deployed over the hood demonstrating that all the vehicle passenger doors along with the rear hatchback for internal cargo are not obstructed when accessing the cargo on the hood of the vehicle. This is a unique feature as compared with other state-of-the-art fixed and deployable designs. The illustration shows the fixed arcs 1 attaching to the existing vehicle roof-rack crossbars 72. With the cargo carrier 123 deployed, the mobile arcs 2 are shown along with the deployment clutch 22, the handles 28, the control line 51, and the adjustable stop bar 46. The cargo carrier 123 is shown over the hood and ready for easy access.

Figure 24:
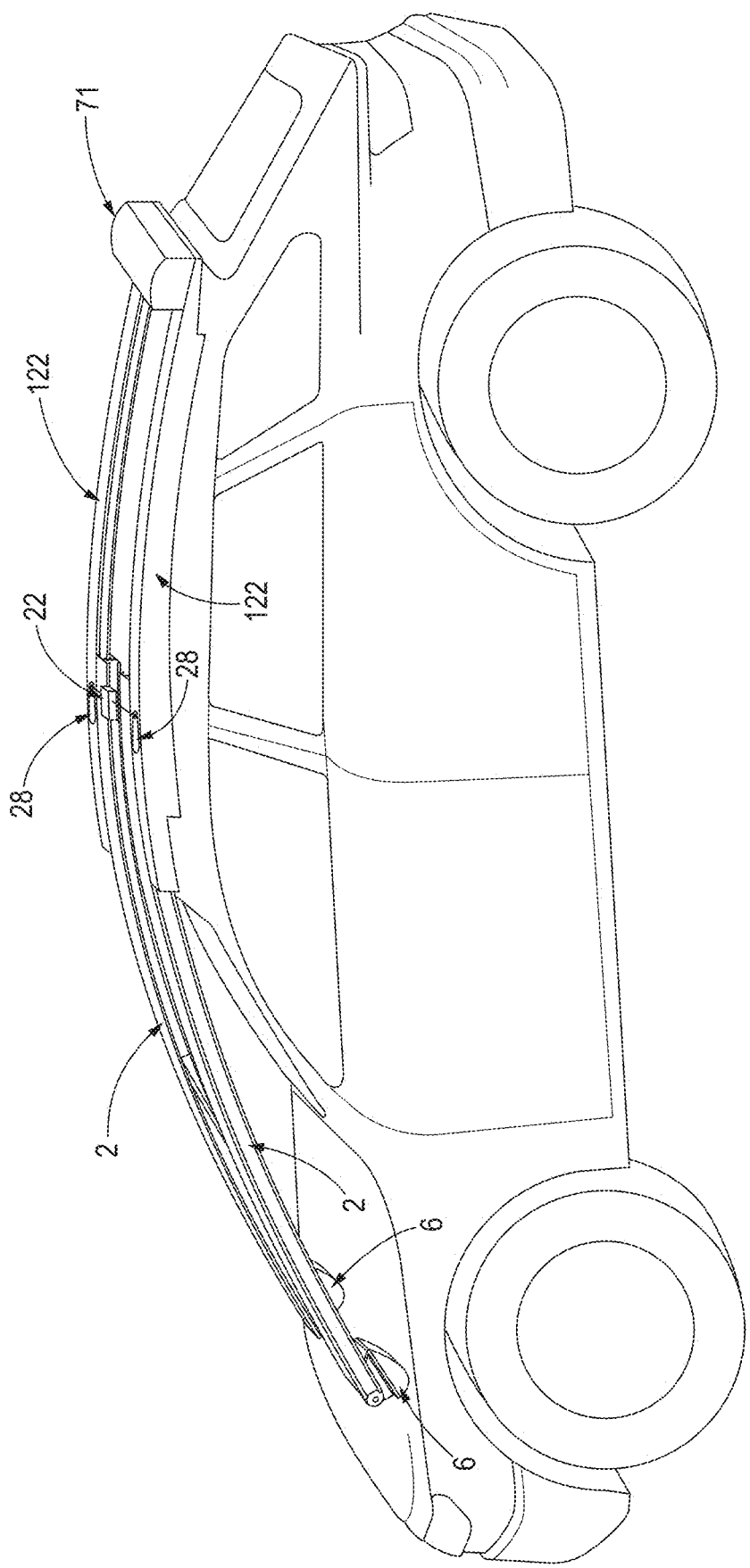
FIG. 24 illustrates an embodiment of the present invention permanently installed on an exemplary vehicle roof top.

FIG. 24 illustrates an alternative embodiment wherein the fixed arcs 1 of the apparatus is configured to be permanently installed on a vehicle roof top with a built-in track system to accept the mobile arcs 2 and all accessories. This provides multiple functions. A customer could purchase this for their vehicle to replace a rack from an OEM. An automobile manufacturer could redesign their current OEM parallel roof-rack rails and associated hardware using this design. This provides new options for the vehicle manufacturer and the customer. A manufacturer could integrate a set of customized fixed arcs 122 to the vehicle, and also include the control system with the mobile components 78. The mobile components 78 preferably includes the mobile arcs 2, the rolling landing pads 6, the deployment clutch 22 and handles 28, including additional required control components (not shown), and the protective cover 71. In this figure, a custom designed fixed arc 122 embodiment is shown. It has a captive rail system that is mounted directly to the vehicle and when the mobile arcs 2 and related components are fully retracted, the mobile components 78 are substantially hidden from external view behind the side rails. This allows multiple design options, which may include without limitation conformal shape and custom color.

Figure 25:
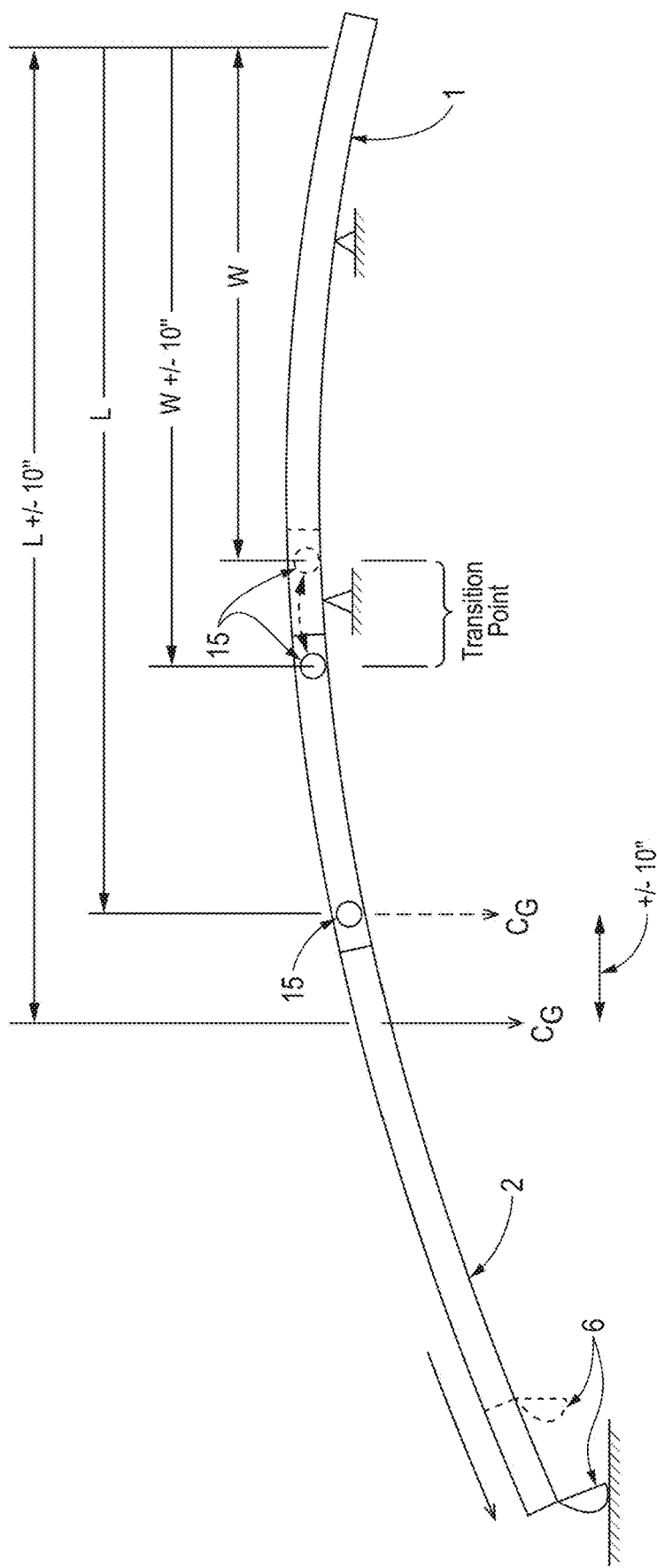
FIG. 25 shows a side view of the fixed arc as it transfers its load to the top of the track just before it returns back to the bottom of the track during deployment.

FIG. 25 shows the side view of the fixed arc 1, the partially deployed mobile arc 2, and the rear wheel 15, which is configured to transfer its load to the top of the track just before it returns back to the bottom of the track during deployment. A mobile, cantilevering rail system has a natural occurrence of load transfer creating a tipping or tilting effect when extending rails with no support before it makes contact with a stable surface using the rolling pad 6. With a captive track design incorporated into an arc, this cantilever effect provides the most efficient control of this effect. The exact location and duration of cantilevering is dependent on many factors, including: cargo carrier type, cargo type, loading, center of gravity, angle of vehicle slope, and others. This method automatically accepts and minimizes the cantilevering.

Figure 26:
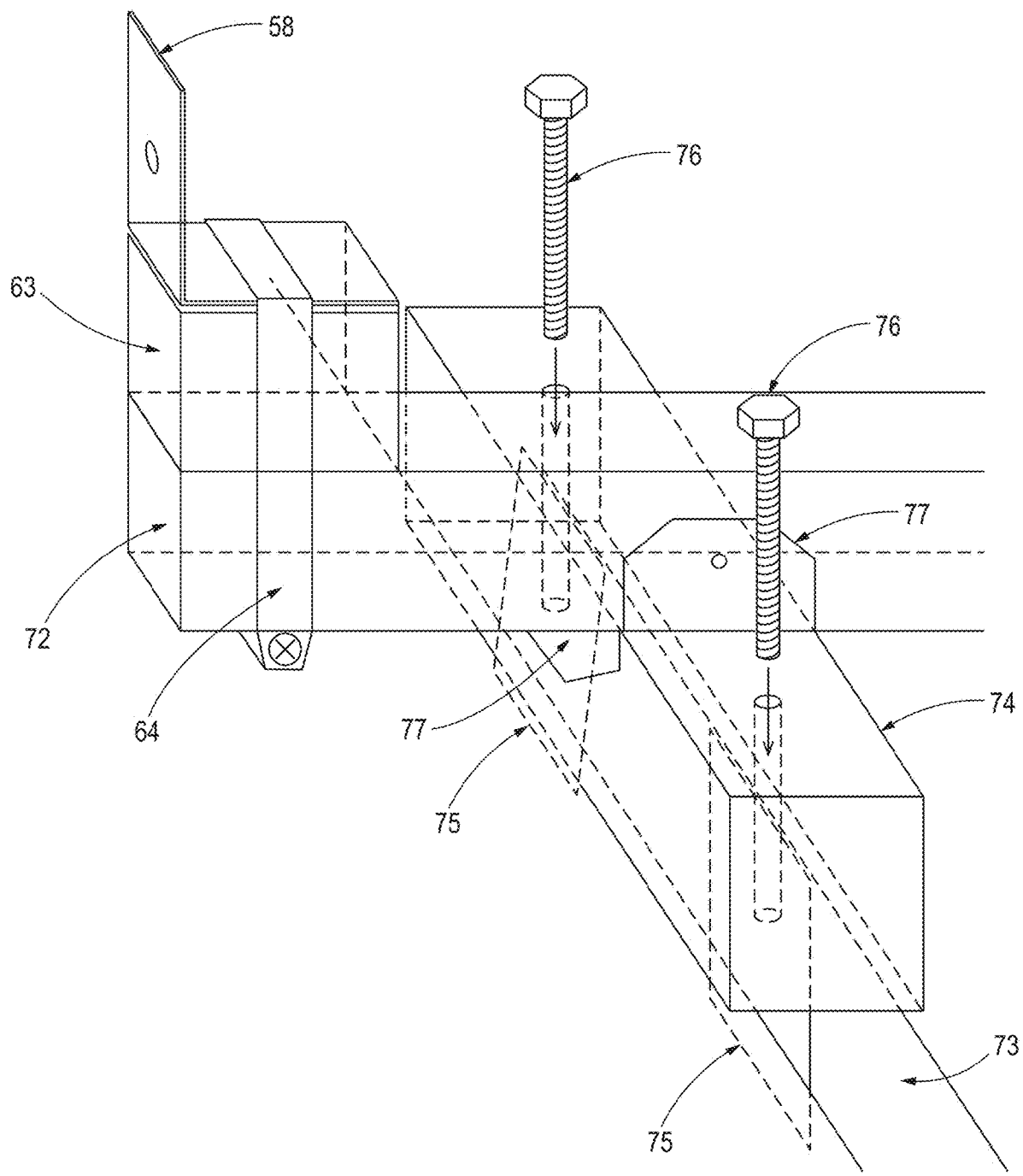
FIG. 26 shows a three-dimensional view of one method for mounting to the vehicle rooftop.

FIG. 26 shows a three-dimensional view of one method for mounting to the vehicle rooftop. This figure demonstrates both an installation on a vehicle mounting track 73 and installation to the existing vehicle roof-rack crossbars 72. The illustration demonstrates how a mounting block 74 attaches to the vehicle mounting tracks 73 by securing a set of bolts 76 through the mounting block 74 and into the vehicle wedge anchors 75, which hold firmly to the vehicle track 73. Shown is the pair of existing vehicle roof-rack crossbars 72 attached to the mounting block 74 by means of a multi-directional mounting bracket 77. In an alternative embodiment, this could be deleted and the fixed arcs 1 could be installed directly onto the mounting blocks 74. Thus, the apparatus can be directly mounted to the vehicle as well. (See FIG. 24) The existing vehicle roof-rack crossbars 72 provide a mounting surface for the adjustable height standoffs 63 as well as the fixed arc mounting bracket 58, secured by the adjustable hold-down clamp 64.

Figure 27:
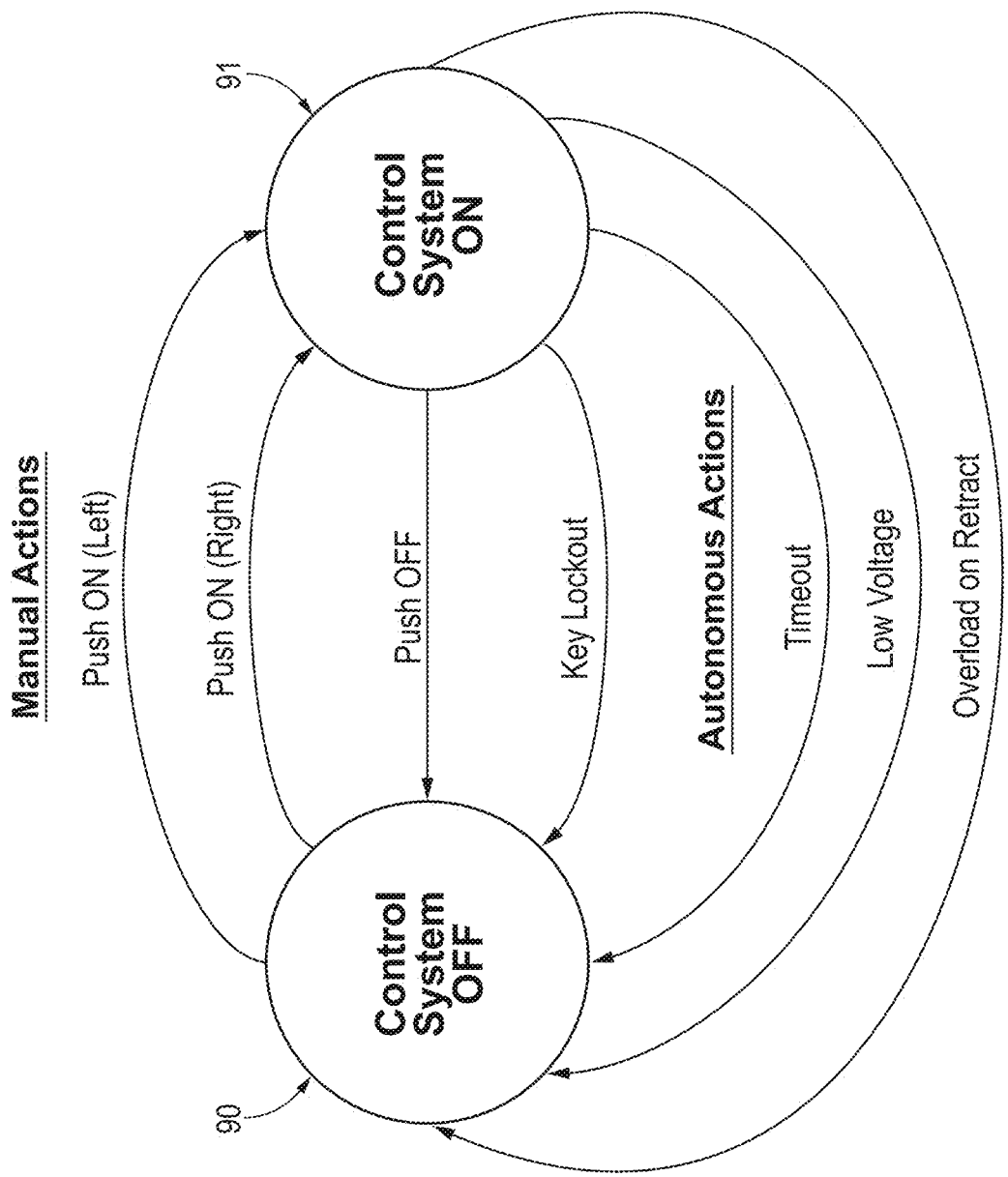
FIG. 27 illustrates an embodiment of a control system top-level state diagram.

FIG. 27 is the control system top-level state diagram for an ON state 91 and an OFF state 90. In one embodiment, two separate actions can transition the system to the ON state 91 and five actions can transition the system to the OFF state 90. Transitions to the ON state 91 are manual actions and transitions to the OFF state 90 consist of two manual actions and three autonomous actions.

Figure 28:
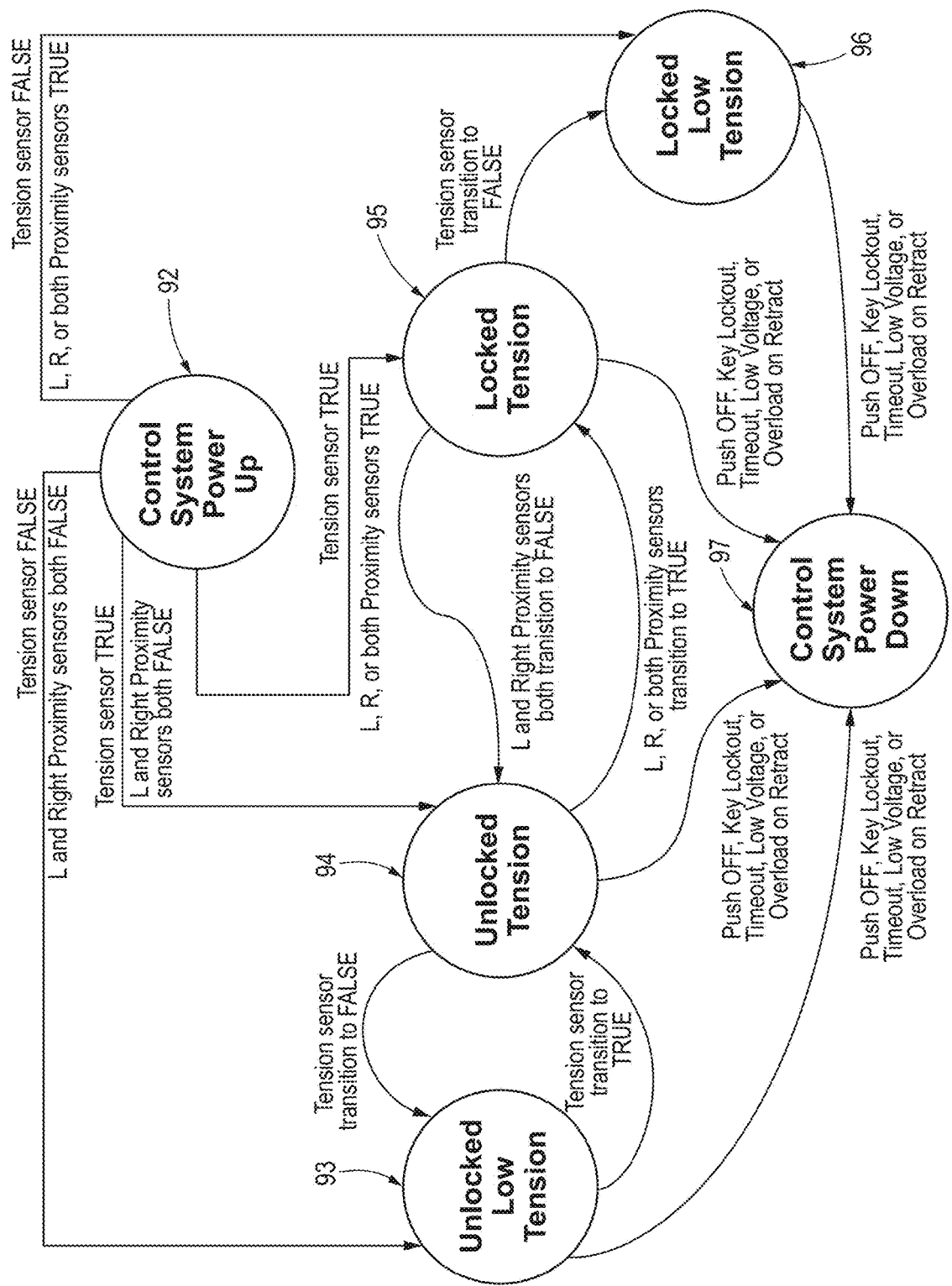
FIG. 28 illustrates an embodiment of a detailed state diagram.

FIG. 28 is the detailed state diagram when the system is in the ON state 91, and associated transitions to the OFF state 90. All states are obtainable and include an unlocked low tension state 93, an unlocked tension state 94, a locked tension state 95, and a locked low tension state 96. In one embodiment, the locked low-tension state 96 is a system fail-safe state and is typically never entered. In this diagram the system starts in a control system power up state 92, and can then transition to other internal states. Any of the subsequent internal states can transition directly to a control system power down state 97.

FIG. 29 lists the specific actions taken or available when in any of the six states including the control system power up state 92, the unlocked low tension state 93, the unlocked tension state 94, the locked tension state 95, the locked low tension state 96, and the control system power down state 97.

Figure 30:
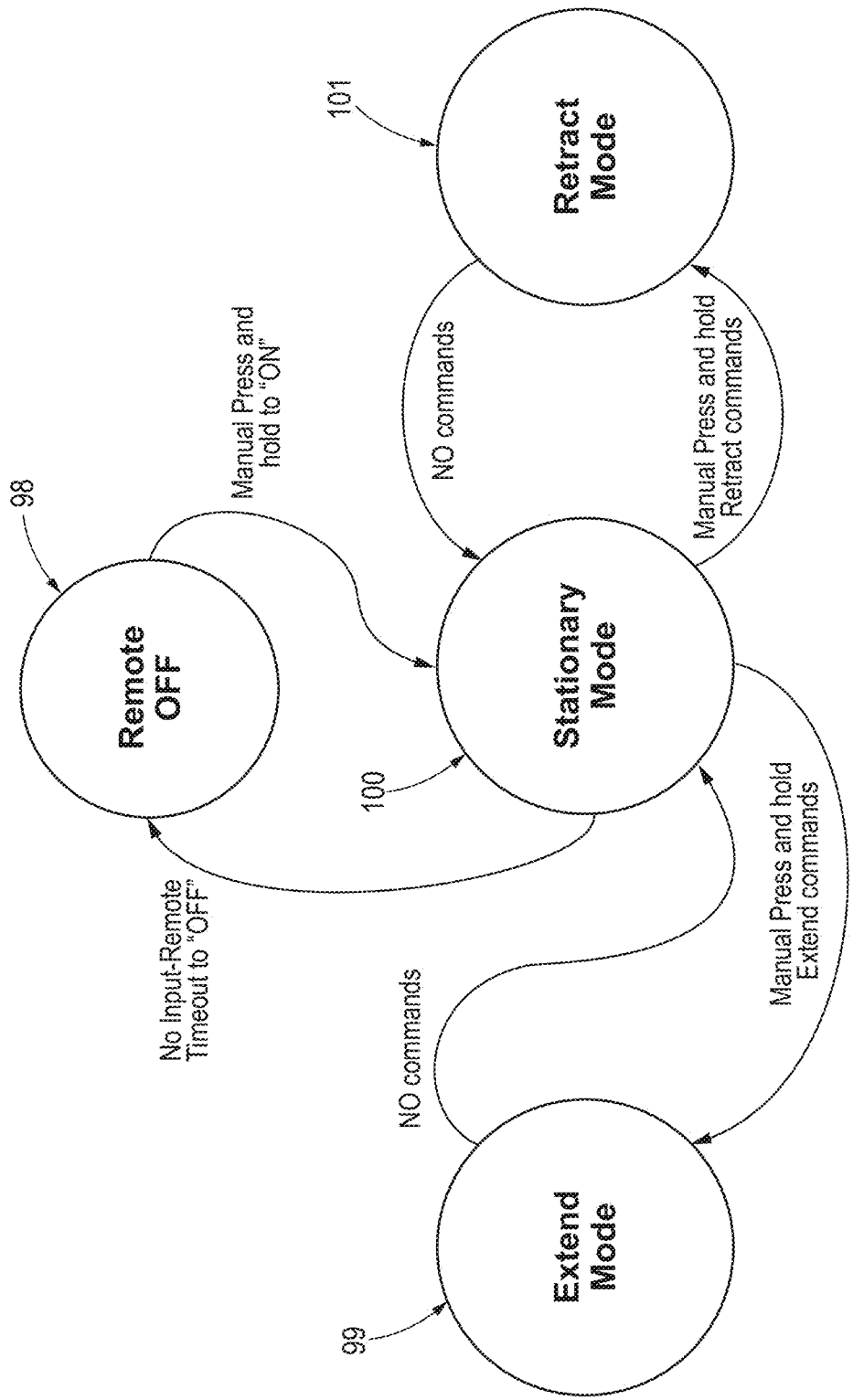
FIG. 30 shows exemplary states for a remote control unit in accordance with an embodiment of the present invention.

FIG. 30 shows the states for an embodiment of the remote control unit 84. This includes a remote OFF state 98, an extend mode state 99, a stationary mode state 100, and a retract mode state 101. The states are all manually controlled except for the transition of the remote control unit's timer to OFF state 98, and this transition is automatic based on accumulation of idle time.

FIG. 31 lists the specific actions taken by the remote interface in one embodiment, based on the state entered, which includes the stationary mode state 100, the extend mode state 99, the retract mode state 101, and the remote OFF state 98. This occurs when both the control system and the remote control unit 84 are in the ON state 91 and 100, respectively. The control system takes no actions if the remote control unit 84 is in the remote OFF state 98.

Figure 32:
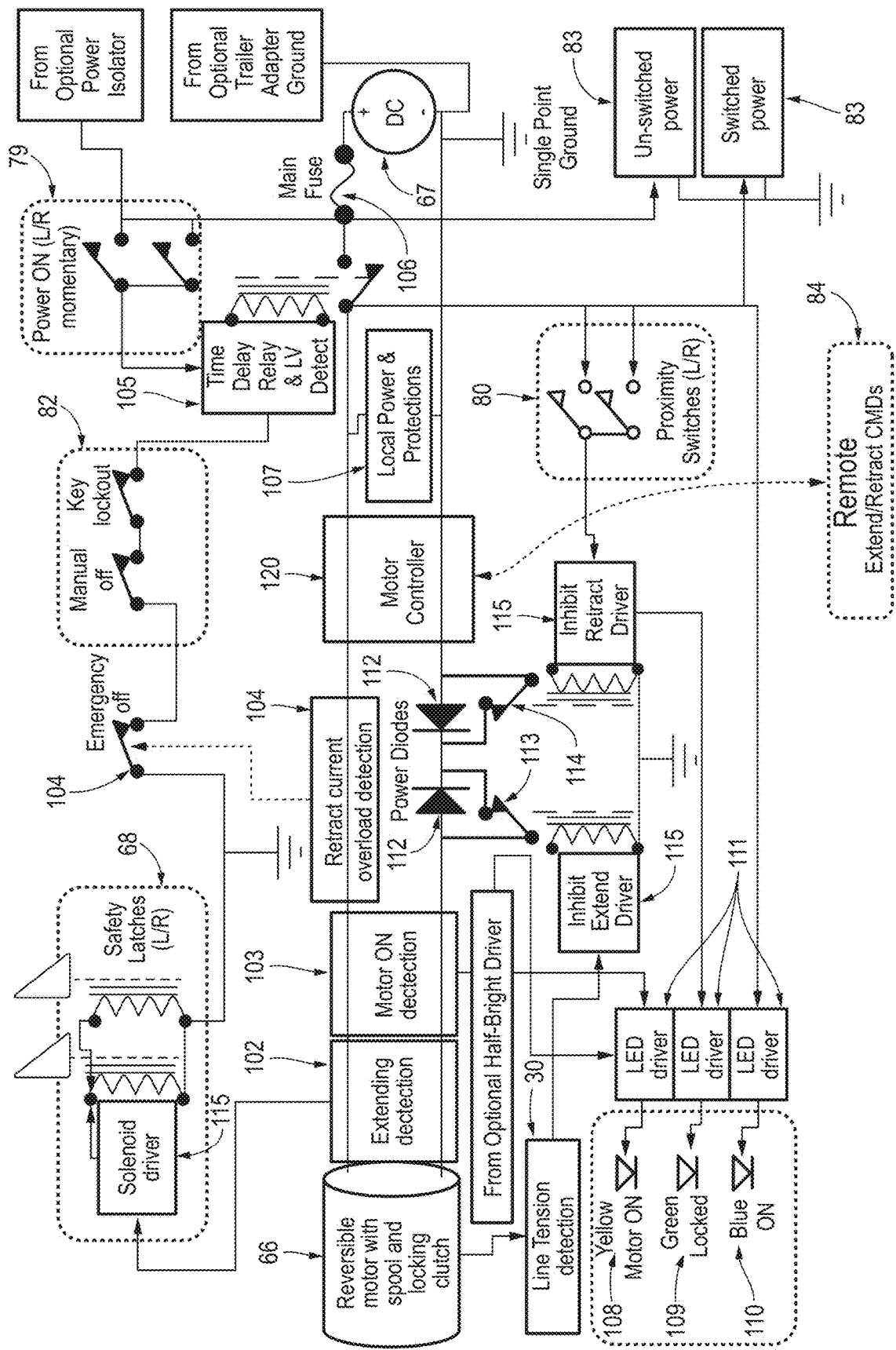
FIG. 32 illustrates a power and functional flow diagram of a control system of an embodiment of the present invention.

FIG. 32 shows a power flow and functional flow diagram of the control system. Internal control system functions in one embodiment include an extending detection 102, a motor ON detection 103, a retract current overload detection 104, a motor controller 120, a local power and protections 107, and a main fuse 106. Also included are a set of power diodes 112, a set of LED drivers 111 to drive a set of yellow motor ON LED 108, a green locked LED 109 and a blue power ON LED 110, respectively, and a set of drivers 115 for an extend bypass relay 113 and a retract bypass relay 114, respectively. The set of safety latches 68, and set of drivers 115, an internal emergency OFF/ON overload switch 104, the control system "OFF" or "LOCK-OUT" 82, can each interrupt power connected to a time delay relay and low voltage detection circuit 105, which also activates the switched accessory power 83. To power the entire system the battery 67 is preferably used, which may be rechargeable and utilize various charging sources, including solar. Power up is initiated by pressing any of the set of remotely located and hardwired momentary Power ON pushbuttons 79. The line tension detection circuit 30 and any of the proximity sensors 80 can inhibit apparatus extension or retraction respectively via the drivers 115. The motor controller 120 receives commands from the remote control unit 84 and regulates power to the electric motor with spool and locking clutch 66. The figure indicates control and power flow and the associated connectivity is indicated.

Figure 33:
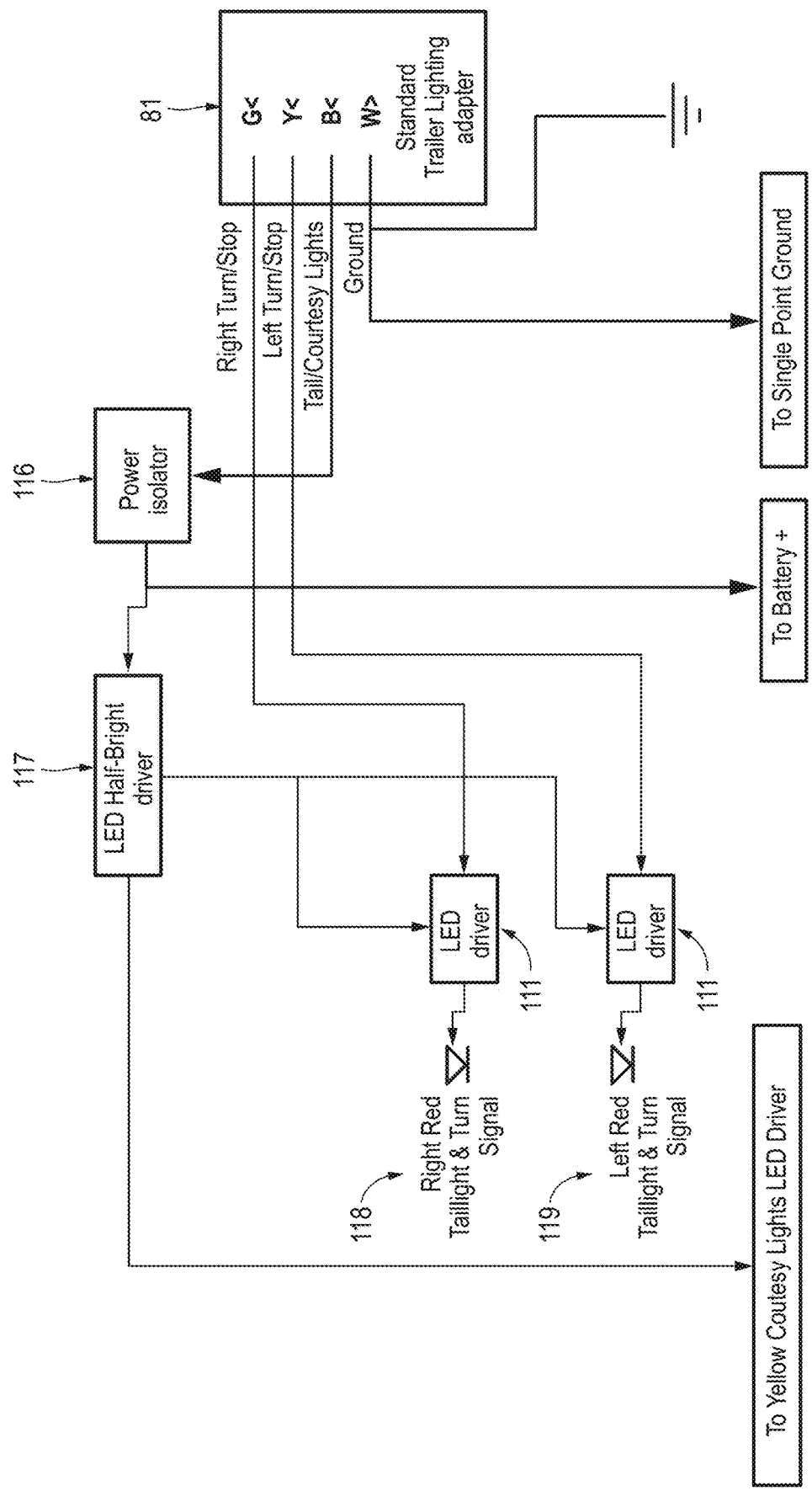
FIG. 33 illustrates a block diagram of an optional trailer lighting adapter of an embodiment of the present invention.

FIG. 33 is a block diagram of the (optional) trailer lighting adapter 81 that connects to the vehicle. The trailer lighting adapter 81 can provide apparatus lighting for courtesy lighting to the yellow motor ON LED 108 via half bright driver 117 parking lights, and stop and turn signal indication is provided via a right red taillight and turn signal 118, and a left red taillight and turn signal 119, and associated LED driver 111, respectively. The trailer lighting adapter 81 can also charge the battery 67 via an internal power isolator 116, and can also be used with a stationary battery charger for home and garage charging, including via solar or other power sources.

Figure 34:
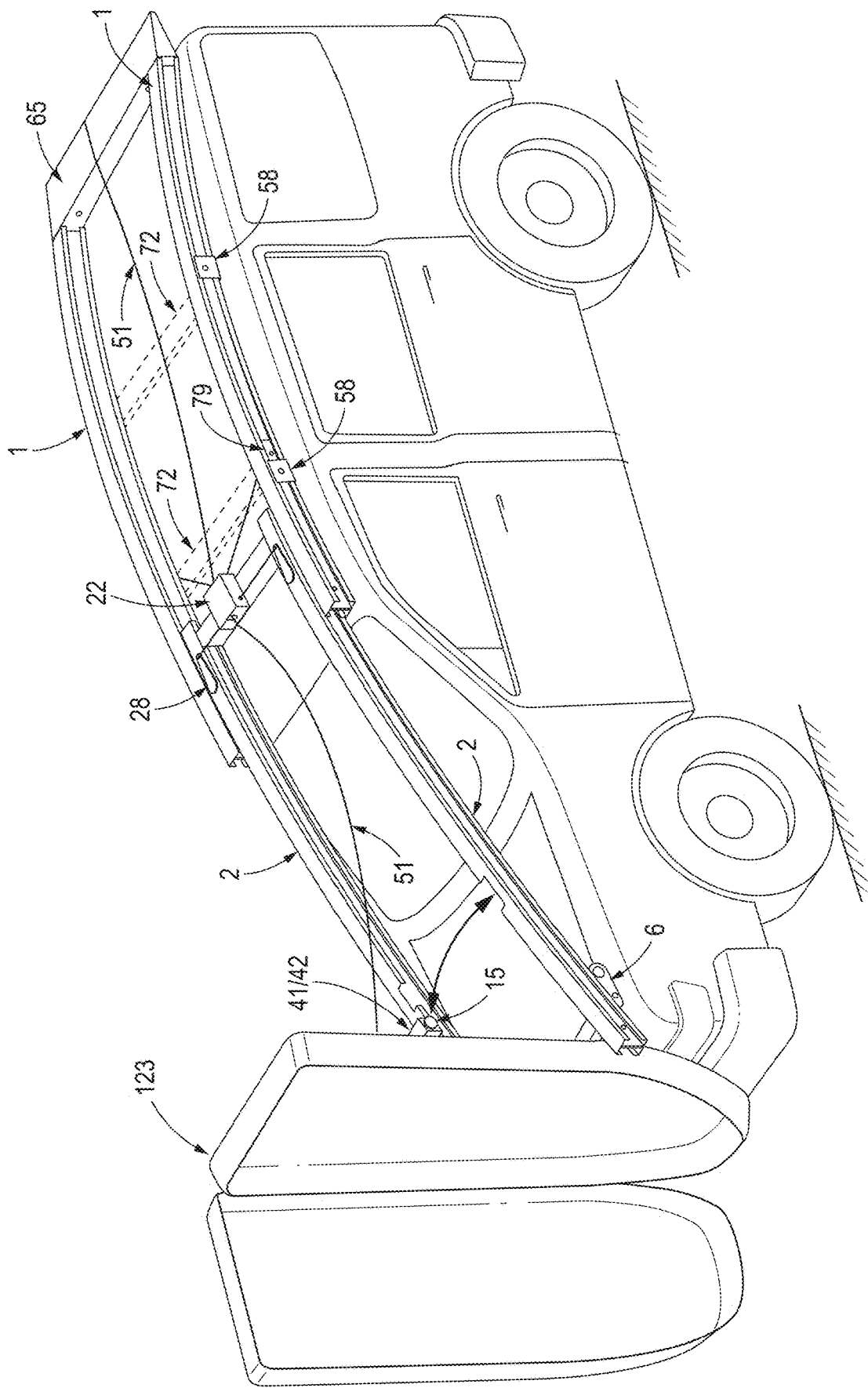
FIG. 34 illustrates an alternative embodiment of the present invention showing a front-oriented arrangement for offloading cargo.

FIG. 34 illustrates an embodiment showing the release of the rear wheels 15 of the mobile crossbar carriage 42 with the mobile crossbars 41 from the captive track 3 through open slots in the top of the captive track 3, allowing the cargo carrier 123 to rotate on the front wheels 15 that are still captive. The fixed arcs 1 are mounted to the vehicle rooftop with the fixed arc adjustable mounting brackets 58, onto the existing vehicle roof-rack crossbars 72. The mobile arcs 2, the mobile cargo carriage 42, and mobile crossbars 41, are shown fully deployed with the rolling pads 6 on the hood and locked. Here, the control line 51 is slack and the deployment clutch 22 has released as indicated by the horizontal position of the clutch handles 28. Also shown is the power ON pushbutton(s) 79 and the control panel 65.

Figure 35:
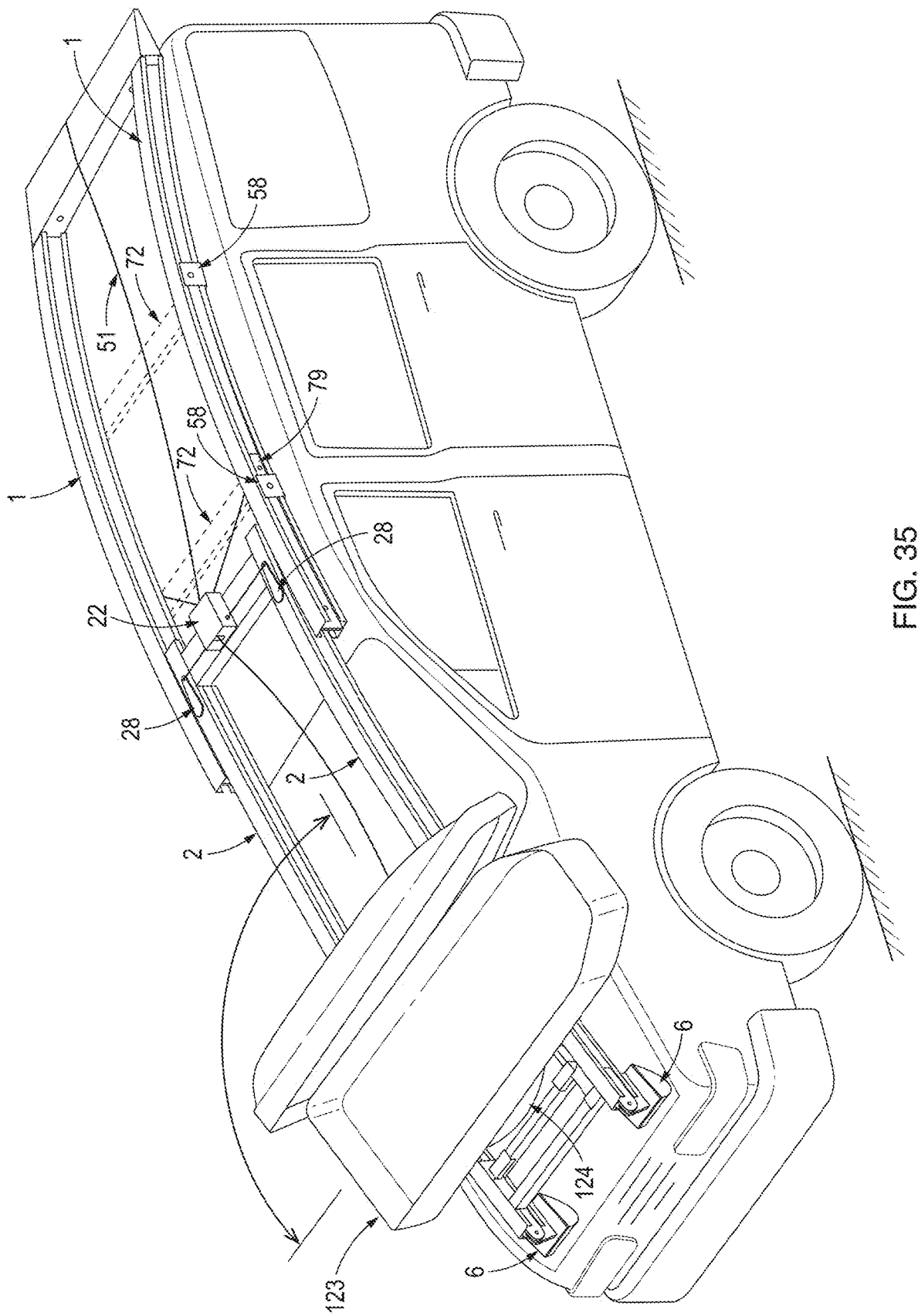
FIG. 35 illustrates an alternative embodiment of the present invention showing a lockable turntable arrangement for offloading cargo.

FIG. 35 demonstrates an embodiment showing a lockable turntable 124 that rotates the cargo carrier 123, preferably by 90 degrees to a perpendicular position, but alternatively within a range of between as little as 5 degrees to as much as 180 degrees, depending on the desired application. This is useful in multiple applications including, but not limited to, easier installation of bikes onto bike-racks as an example. The lockable turntable 124 preferably clamps onto the mobile crossbar carriage 42. The fixed arcs are mounted to the vehicle rooftop with the fixed arc mounting brackets 58, preferably onto the existing roof rack crossbars 72. The mobile arcs 2 and the mobile crossbars carriage 42 are fully deployed. In this embodiment, the rolling pads 6 are on the hood, the control line 51 is slack, and the deployment clutch 22 has released as indicated by the horizontal clutch handles 28. Also shown is the power ON pushbuttons 79 and the control panel 65.

Further details of the present invention, along with additional description of the advantages of such an invention, are described below with reference to one or more of FIGS. 1-35.

The apparatus and control system move the cargo by dynamically changing from an at least two-point vehicle connection on the vehicle roof crossbars to a one or more additional contact that can include the vehicle's hood as a load-sharing and stabilizing point of contact for the system when in use. This provides significant advantages for load sharing (e.g., pounds per-square-inch for total hood loads) and provides load distribution for both static loading and dynamic loading using classical techniques used in construction and moving structures. This includes application of I-beam theory, overlapping internal structural supports and the advantages of arched structures for distributing loads, use of wheels, pulleys, cantilevers, tensioners, gravity assist and more.

In this description the term the wheels 15, and the term the wheel axles 16, are used to describe the use of low sliding-friction devices that support load and maintain alignment and remain captive and provide durability. Other methods can be used and are included herein. The wheels 15 are presented as a preferred embodiment. Other methods include but are not limited to sliding low-friction devices such as plastics and fiberglass with or without a rolling motion.

This apparatus incorporates more efficient applications by eliminating the roof-rack rails and crossbars typically required for cargo carriers. In this application the apparatus connects directly to the vehicle's roof track or roof top. The vehicle's crossbars are absent and the crossbars for the cargo carrier are then provided by this apparatus. (See FIG. 24)

The control system used differs from existing options because it allows the control system to be self-powered and self-contained. It also enables the wireless remote control unit 84 (see FIG. 17) to be used not only for deployment and stowage, but allows for numerous built-in safety features and accessories. The remote control unit 84 is used to retract the cargo carrier and cargo to its locked and stowed position on top of the roof of the vehicle for transport. Manual operation is also contemplated, in which case the automatic operation is bypassed.

In a preferred embodiment, indicators provide the status of the unit as ON or OFF, stationary, locked, and mobile (deploy or retract) during all powered ON operations.

When deployed the apparatus utilizes an unused area of the vehicle to access the cargo carrier and cargo when the vehicle is stationary. This allows all vehicle doors and hatches or hatchbacks to the interior passenger and cargo compartments to remain completely accessible at all times. (See FIG. 23)

Because of the lower location when accessing the cargo or changing cargo carriers, this apparatus enables much easier access to the cargo carrier and cargo, typically at arms height of the vehicle hood as compared to overhead and centered above the vehicle's roof. (See FIG. 20) This embodiment lowers cargo from a high point on a vehicle to a lower point. Though the preferred method utilizes the roof and the hood of the vehicle, it can be oriented to use the roof and the trunk of the vehicle, including the bed and the tailgate of a pickup, or to the ground.

The apparatus and control system simplifies the use of external cargo carriers and cargo and enables users to more easily access the cargo, reduces chances for injury, vehicle damage, or cargo damage as compared to today's typical roof-rack stored and accessed cargo carriers 123 and cargo. (See FIGS. 20, 22, 34, 35)

The apparatus does not obscure the vehicle's rear taillights or backup lights. (See FIGS. 18, 24) The apparatus improves rear vehicle visibility because of the vehicle's lighting indicators (e.g., red parking lights, stop, turn, hazard indicators) and side clearance (yellow courtesy lights) when optionally using the standard vehicle trailer lighting adaptor 81, and also provides additional lighting to other drivers and pedestrians.

A preferred embodiment of the present invention consists of four identical arcs. The difference between them is defined by the way they are assembled. The fixed arcs 1 and the mobile arcs 2 consist of specialized curved I-beams as the preferred structure of choice. Other structures can be used including but not limited to tubes, ovals, extrusions that provide captive capture of the mobile components. The curvature follows an elliptical equation that describes the shape of the four arcs. These arcs create a unique design that is applicable to most any vehicle that can have the roof mounted existing vehicle roof-rack crossbars 72.

The I-beam structure (see FIG. 21) maximizes the ability to support vertical loads over a span. The I-beam structure minimizes the amount of material required to support a load for any given material used. This I-beam structure also reduces the amount of material required to support the cargo carrier and cargo. Because the apparatus's weight is minimized it allows more cargo and larger cargo carriers to be used without exceeding the vehicle's designed cargo carrier and cargo maximum load limits. It also minimizes loading on the vehicle's roof, roof rack, and the existing vehicle roof-rack crossbars 72.

The use of an I-beam provides many additional benefits to the design of the present invention. Because of the special shape of this I-beam and the nesting of parallel I-beams, the modified I-beam shape used in the present invention also provides a capability for easy mounting to the existing vehicle roof-rack crossbars 72. (See FIGS. 14A, 14B) Its mounting does not require the existing vehicle roof-rack crossbars 72 to be level (as observed from the vehicle's side) and does not require specific spacing between the existing vehicle roof-rack crossbars 72. (See FIGS. 1, 4, 5) The apparatus uses the arc wedge anchors 60 to provide the existing vehicle roof-rack crossbars 72, connected to existing roof-racks. Typically, the arc wedge anchors 60 are used to connect to the horizontal roof mounted tracks on the vehicle. However, in this application the arc wedge anchors 60 connect to the outermost captive track 3 of the fixed arc 1 created by the specialized I-beams. (See FIGS. 14A, 14B) This enables mounting anywhere without requiring pre-drilled holes. To connect to the existing vehicle roof-rack crossbars 72, the adjustable hold down clamp 64 is used. (See FIGS. 14A, 14B) Many methods may be used to attach the assembly to the vehicle and this is similar to those in use today. Benefits of this mounting method include ease of attachment to the vehicle's roof-rack crossbars. Spacers or fillers may be required based on the shape and curvature of the existing vehicle roof-rack crossbars 72. (See FIGS. 14A, 14B)

The specialized I-beam shape also provides the captive track 3 for the set of wheels 15, which are used for static support and dynamic deployment and retraction. (See FIGS. 11A, 11B)

The apparatus also conforms to the general shape of most vehicles. The shape of today's vehicle's hood and roof are angled and curved to maximize aerodynamic characteristics and maximize fuel efficiency by reducing drag. This design also supports reduced aerodynamic drag.

The nubbin 17 is a fixed component of the wheel axle 16. (See FIGS. 11A, 11B) Each of the nubbins 17 is preferably approximately one-half inch from the wheel 15. This fixes the minimum distance the wheel 15 can approach the axle sleeve 18. Each axle sleeve 18 depth is calibrated to allow self-adjustment of the wheel axle 16 and eliminate interference of moving parts. In this use, the spacing between the fixed arcs 1 and the mobile arcs 2 can be controlled and calibrated and maintained during stowage and use, based on the configuration of the rear wheel 15 of mobile arc 2, received by the captive track 3 of the fixed arc 1, and the front wheel 15 of the fixed arc 1, received by the captive track 3, of the mobile arc 2.

The roller operation used to allow the deployment of the cargo carrier 123 reduces friction by using the wheels 15 with simple load-bearing capabilities. (See FIGS. 11A, 11B) The inside of the I-beam captive track 3 includes the wheel guides 21 to keep the wheels 15 centered in the track. However, the wheels 15 are mounted to the wheel axles 16, which are not hard mounted to the structure. They preferably slide into the cylindrical axle sleeve 18 with a significantly larger diameter than the wheel axle 16. This is a common practice and is used in most panel garage door systems today. This implementation also reduces rolling friction and allows for a small amount of side play. Because the apparatus is nested, the wheel axles 16 cannot separate or pull out of the axle sleeve 18 once the apparatus is assembled. (See FIG. 2) Again this is similar to a panel garage door assembly. The apparatus is designed to be self-centering during each deployment and retraction cycle of the cargo carrier 123 and cargo. This minimizes compounding misalignment effects from repeated use. It also helps compensate for shifts in cargo weight distribution, uneven load distribution, or use when the vehicle is not on a completely level surface as is true in most applications.

The fixed arcs 1 and the mobile arcs 2 utilize the principals of an arch. The mobile arcs 2 also utilize the principals of the cantilever. (See FIGS. 5, 19, 25) It can be shown that arches have the capability to provide greater load support and load distribution. Arches are commonly used in support structures that span an opening. This provides maximum strength and minimizes deflection for a given material as compared to a flat or un-curved surface using the same material.

The principals of the cantilever (see FIG. 25) are used during deployment and retraction of the cargo carrier 123 and cargo. The mobile arcs 2 extend to a point where the load may require support by having the rear wheels 15 of the mobile arcs 2 provide support forces opposite to the direction of gravity forces. When deployed or stowed the mobile rear wheels 15 support load.

During cantilever, the load onto the vehicle's forward crossbars during deployment and retraction is increased. The loading of the rear crossbar may be reduced to zero or even negative (upward force) due to the cantilever effect. Under these circumstances (partially deployed, no hood support) the weight of the unit's control system is favorable for distributing and reducing forward loading on the vehicle. This can be demonstrated via the principles of the scale via Archimedes. A mobile, cantilevering rail system has a natural occurrence of load transfer creating a tipping or tilting effect when extending the rails before making contact with a stable support surface. (See FIG. 25) The captive track 3 design incorporated into the fixed arc 1 and the mobile arcs 2 provides the most efficient control of this effect. This exact location and duration of cantilevering is dependent on many factors, including: cargo carrier type, cargo type, loading, center of gravity, angle of vehicle slope, and others. This apparatus automatically accepts and minimizes loading due to the effects of cantilevering.

The mobile crossbars 41 are two parallel crossbars attached to the mobile crossbars carriage 42. Existing third party cargo carriers attach to these two crossbars rather than to the existing vehicle roof-rack crossbars 72. (See FIGS. 1-3, 15, 18-22, 34) The mobile crossbar carriage 42 contains the wheels 15 that insert into the captive tracks 3 of the mobile arc 2. These mobile arcs 2 are connected together using the set of squaring brackets 56 and the set of corner supports 57. A rear torque bar 87 includes the axle sleeves 18 to maintain parallel spacing between the mobile arcs 2, keep them square with the rear torque bar 87, and to prevent binding during deployment and retraction. Similar techniques are used to provide support between the mobile arcs 2 and the fixed arcs 1, which are also used to support the mobile crossbars 41, the mobile crossbar carriage 42, and the mobile arcs 2. The roller operation reduces friction by using the wheels 15, having simple load bearing capabilities. The inside of the I-beam captive tracks 3 include the wheel guides 21 to keep the wheels 15 centered in the middle of the track. (See FIGS. 11A, 11B) In one embodiment, the wheels 15 are mounted in the wheel axles 16 and attached to each side of the mobile crossbars 41 and the mobile crossbar carriage 42, and these are not hard mounted. Rather, they slide into the axle sleeves 18 with a significantly larger diameter than the wheel axle 16. This nested apparatus provides dual-deploying and retracting crossbars for the cargo carrier 123. All components always remain captive whether stowed, moving up or down, or deployed.

The rear stop bars 46 and the front torque stop bars 47 are preferably included in the apparatus assembly. (See FIGS. 1-3) The design utilizes the bars 46 and 47 to mitigate structural stresses and alignment issues. This includes the mounting brackets 59 and the squaring brackets 56 for the mobile arcs 2 to hold the apparatus square. The fixed arcs 1 and the mobile arcs 2 are preferably configured to remain parallel, or substantially parallel, which is understood to mean parallel within manufacturing and typical environmental tolerances. The rear stop bars 46 and the front torque stop bars 47 also provide physical stops for deployment and stowage and are used to attach other components.

The preferred method for the deployment and retraction uses the single high-strength control line 51, which connects to the electric motor with spool and locking clutch 66. This type of line is preferably lightweight, does not deteriorate, rust, or fray when exposed to the environment, and minimizes stretching by its composition. Other methods exist and include, but are not limited to, chains, cables, or belts.

The apparatus uses the shock cord system 54 as the preferred method to provide a force that pulls the mobile components forward or out, (see FIGS. 2-3, 16), which is tensioned during retractions. This allows the apparatus to deploy when the control line 51 is eased or released. Other methods can be used for the mechanical energy storage including but not limited to springs, bands, or struts. Further, gravity acts on the cargo carrier 123 and cargo, and the mobile components 78, and provides the force for the remaining deployment. This is done in a controlled manner by simply controlling the tension and rate of release of the control line 51. The shock cord system's 54 primary purpose is to maintain tension on the control line 51. The shock cord system 54 provides the required force to keep tension on the control line 51. Because of its design and location, the shock cord system 54 also helps center the mobile arcs 2, the mobile crossbars 41, and the mobile crossbar carriage 42. The forces are in-line with and in opposition to the control line 51. The shock cord system 54 is preset during assembly and is passive. It can be easily adjusted as needed, but generally is set once for most all the cargo carriers 123 and cargo.

The rolling pad 6 on each mobile arc 2 during deployment is used to cushion and spread the load on contact with the vehicle's front hood. These rolling pads 6 are described further with reference to FIGS. 10A, 10B, 10C. They provide a cam-gear effect. The rolling pads 6 are connected to the mobile arcs 2 at the designated pivot point 12. The fixed arcs 1 contain the permanent magnets 13 that hold the rolling pads 6 in place during vehicle transport. (See FIGS. 10A, 10B) Gravity is used to allow the rolling pads 6 to deploy (swing down) freely and ready to engage the hood.

Fine tuning the height of the connection to the existing vehicle roof-rack crossbars 72 can be accomplished using the adjustable height standoffs 63 during the apparatus installation, which allows adjustments to final location on the vehicle's hood. This location on the hood can be calibrated either forward or aft. A few millimeters on the roof-rack mounting can change the location of the arcs on the hood by several inches. The rolling pads 6 are configured to rotate on contact with the hood. The placement on the hood can be pre-determined within a range, and can be used to avoid having the rolling pads 6 contact the hood at uneven or undesired locations. (See FIG. 5)

The rolling pad 6 allows a rolling motion when contact is made rather than a sliding motion on the vehicle's hood. Once fully engaged each of the rolling pads 6 rotate on an elliptical path and lock. The rolling pads 6 distribute the load onto the vehicle's hood and they distribute the weight and reduce point loads. When the cargo is removed or added, the desired location of each pad can vary. However, because the pad can rotate, the apparatus movements prevent any sliding force that could damage (e.g., scratch) the hood's finish. It has been demonstrated that the hood can support the weight of the system as designed and the loading on the hood is minimized because of the arch techniques described previously. In this embodiment, the static load is supported at six points consisting of two on the front existing vehicle roof-rack crossbars 72, two on the aft existing vehicle roof-rack crossbars 72, and two points on the hood of the vehicle. (See FIG. 21) The arch, the I-beams, offsetting aft weight, and the overlapping of the fixed arcs 1 and mobile arcs 2, all combine to provide a rigid system that minimizes loading on the vehicle's hood. This is very important as the cargo carrier 123 and cargo could easily weigh over 150 pounds, but only a fraction of that weight is placed on the hood. Deployment with weight also makes arch strong, stable, and prevents the mobile arcs 2 from slipping or sliding.

To complete final deployment of the cargo carrier 123 and cargo, an alternate embodiment of the present invention provides the deployment clutch 22. (See FIGS. 8A, 8B) Until this point in the deployment, the mobile arcs 2, the mobile crossbars 41, and the mobile crossbar carriage 42 have been held together because of the tension in the control line 51 and the deployment clutch 22, which lock holds the control line 51, and the mobile crossbars 41, and the mobile crossbar carriage 42 together. This is also a point in the deployment where the user may visually verify that there are no conflicts or obstacles present that could restrict full deployment. The user can observe that the mobile arc 2 deployment is aligned properly on the hood, and that the cargo carrier 123 and cargo are now ready to fully deploy. A manual or automatic release of the deployment clutch 22 is preferably required to complete the cargo carrier 123 and cargo deployment. For ergonomics and ease of use, this can be accomplished manually from either side of the vehicle. When released, the deployment clutch 22 removes the connection between the deployed mobile arcs 2 that are on the hood and the mobile crossbars 41, and the mobile crossbar carriage 42, that are supporting the cargo carrier 123 and cargo. (See FIGS. 19-20) Gravity and loading keeps this embodiment intact and ridged. Next, the control system is used to extend the control line 51, and place the cargo carrier 123 and cargo in the fully deployed position.

By changing the tension and releasing the control line 51 in a controlled manner, bidirectional movement between the mobile arcs 2 on the hood, the mobile crossbars 41, and the mobile crossbar carriage 42, can occur when the deployment clutch 22 is activated. Full deployment of the mobile crossbars 41 and the mobile crossbar carriage 42 is achieved. By design, when the control line 51 is retracted, the deployment clutch 22 is automatically reset. (See FIGS. 8A, 8B) When the control line 51 is retracted, the mobile crossbars 41 and the mobile crossbar carriage 42 attached to the cargo carrier 123 move together until they reach the adjustable stop block 49 and the pad 50 of the mobile arcs 2. (See FIGS. 1, 2, 3) Next, as the control line 51 is being retracted, the mobile arcs 2, the mobile crossbars 42, and the carriage 41, which are connected to the cargo carrier 123 and cargo, are locked and move together. The rolling pads 6 rotate as the mobile arcs 2 retract back and upward until the rolling pads 6, no longer contact the hood. The apparatus continues to retract and the shock cord system 54 becomes loaded for the next deployment. Finally, the apparatus reaches the point where it is completely stowed and locked. (See FIG. 2)

When the apparatus is retracted, the rolling pads 6 reattach to the permanent magnets 13, on the fixed arcs 1. (See FIG. 10A) One method to reattach the rolling pads 6, which has been demonstrated and documented, is to simply let the force of the wind from moving air at less than 30 miles-per-hour in the forward direction when the vehicle is driven. This passively reattaches the rolling pads 6, into their stowed position. The design or shape of the elliptical rolling pads 6 considers the angle of the hood and the fact that the mobile arcs 2, deploy at an approximate rate near the hood of about one-inch forward and one-half inch down.

The control system description details everything required to deploy or stow the apparatus, the cargo carrier 123 and cargo. When stowed, the apparatus is again ready for transport and reuse, with the control system stationary and towards the transom. The control system can be located with the mobile components including the mobile arcs 2, the mobile crossbars 41, and the mobile crossbar carriage 42.

Because of the masses (weights) involved, predetermined timing requirements preferably exist for the control system. The control system is required to compensate for the momentum of the apparatus when preparing to stop. This includes considering the timing constraints of detecting stowed position and also monitoring line tension during motor start and stop. In addition, considerations for possible failures of various components require designed-in failsafe. A spring 52, or elastic cushion, can be used with the mobile crossbars 41, the mobile crossbar carriage 42, and the control line 51. The control line 51 provides a light, compact line size and has properties including no-kink, no-twist and no memory effect (curling) after being spooled. It also has a preferred low stretch capability. To accommodate the masses and timing constraints of the apparatus, calculations and measurements are used to indicate how much travel and what tension is required for the connecting spring 52. To incorporate a failsafe design ensuring that the control line 51 cannot detach from the mobile crossbars 41 and the mobile crossbar carriage 42, the "porch swing" spring 52 design is used. The spring 52 is connected to the mobile crossbars 41 and the carriage 42 using the pin 53. Should the spring 52 fail, it will not separate.

Deployment and retraction of the apparatus is designed to passively maintain tension of the control line 51 under typical deployment conditions. This is preferably accomplished by using the shock cord system 54 and gravity to maintain tension. If there is not enough tension in the control line 51, the control system safely responds and prevents deployment. Retraction is always available if the apparatus is free of obstacles. This is all detailed further in the control system description.

The cover 71 uses a weather resistant design and encloses the components that make up the control system including the battery 67. (See FIGS. 4-5, 24)

The weight of the control system is purposely placed towards the back of the vehicle and is a benefit to the apparatus mechanical loading and weight distribution on the vehicle. The weight helps offset dynamic loading, supports cantilevering, and can reduce static hood loads when deployed. This location does not obscure the driver's view and does not interfere with the cargo carrier 123 or cargo. (See FIGS. 23-24) It is accessible as needed including the battery 67, maintenance, removal, or installation.

The electric motor with spool and locking clutch 66 are reversible and used in the control system for a failsafe design. The spool preferably locks whenever the power is insufficient, interrupted, or in the OFF state 90. The spool contains the control line 51 to the apparatus and is not visible outside of the control system cover. (See FIGS. 6A, 6B, 6C)

The primary power source for the control system is the battery 67. (See FIGS. 6A, 6B, 6C) However, under appropriate situations the power can be supplied externally. The control system powers to ON using any one of the set of manually activated pushbuttons 79 to activate the time delay relay and low voltage detection circuit 105 with a self-latching timeout to the OFF state 90. Sufficient time is provided to allow full deployment or complete retraction and stowage of the cargo carrier 123 and cargo. (See FIG. 27) The manual pushbutton and the associated keyed lock-out for the control system "OFF" or "LOCK-OUT" 82, or the time delay relay and low voltage detection circuit 105, can deactivate the control system and return it to the control system OFF state 90. (See FIG. 27)

The control system (see FIGS. 1-6C) and the associated remote control unit 84, (see FIG. 17), provide continuous real-time feedback to the users and other observers when the system enters the ON state 91. (See FIGS. 28, 30, 32) Several indicators provide the necessary status of the control system. (See FIG. 32) These indicators provide information required for safe operations. To determine the control system status, dual-view indications are redundant. The status preferably appears on each side of the mounted apparatus. An illuminated BLUE ON LED 110, indicates that the system is in the ON state 91, and the time delay relay and low voltage detection circuit 105, is running.

When the system is in the ON state 91, additional indicators provide quad-redundant (two locations, both sides) using the GREEN Locked LED 109. This indicates apparatus is stowed and in the locked tension state 95 and it is safe and ready for transport or is ready to deploy. Similar quad-redundant (two locations, both sides) at full intensity the YELLOW Motor ON LED 108 indicates when the apparatus is in motion either extending or retracting. If the BLUE ON LEDs 110 are not illuminated, it indicates control system timeout due to inactivity has occurred or the system is in the OFF state 90.

Optional indicators are included with the control system. (See FIG. 33) The use of these optional indicators is not required for safe operation, but is available whenever an external battery charger is connected and powered ON. Also, whenever a vehicle trailer lighting adapter is connected and the vehicle's parking and taillights and are ON the lights illuminate. Specifically, both the left red taillight and turn signal 119 and the right red taillight and turn signal 118 use a half-bright driver 117 to provide dimmed rear taillights at two rear locations, and the YELLOW Motor ON LEDs 108 are activated as dimmed courtesy sidelights in four locations (two locations, both sides).

In addition to the aforementioned optional lighting conditions, left turn signal and right turn signal indication, active braking stop lights and emergency flashing taillights are also provided using the bright RED 118 left and 119 rear taillights. These lights mimic the vehicle's lighting whenever they are activated.

The remote control unit 84 preferably includes a BLUE LED that when in the ON state 100 indicates the remote is active and its battery is good. (See FIG. 17) The BLUE light OFF indicates that the remote control unit 84 is in timeout due to inactivity or also can indicate that the remote control unit 84 internal watch-type battery has failed. A flashing BLUE light on the remote when the extend button 99 is pressed indicates specific extend commands are being sent to the control system's motor controller. A flashing BLUE LED when the retract button 101 is pressed indicates that specific retract commands are being sent to the motor controller 120. (See FIGS. 30, 31)

The following data describes the critical sensors and protective functions contained in one embodiment of the control system of the present invention. The control system provides dual-redundant locked, safe, and stowed proximity detectors 80 for the apparatus. If the left, right, or both proximity detectors 80 are TRUE, the control system inhibits retract commands to the motor. The control system activates the GREEN Locked LED 109 indicating the apparatus is locked, stowed, and ready for transport, in the locked tension state 95. (See FIGS. 29, 32)

The tension detector 30 uses the lever arm 34, counterweight 35, gravity, and the infrared light emitter 37 with the infrared receiver 38 to prohibit extend motor commands by causing the control system to enter the unlocked low tension state 93. This device is called the tension detector 30, and activates when the tension in the control line 51 is insufficient. The function is failsafe, and reduces false triggering by using signal filtering. It activates whenever insufficient tension is detected. This prevents backlash on the line's spool and is a safety feature if there are obstructions during deployment. (See FIGS. 7A, 7B, 7C) This feature is also used in conjunction with the mobile arcs 2 during deployment and subsequent operations of the deployment clutch 22 for the final cargo carrier 123 and cargo deployment. (See FIGS. 8A, 8B)

The overload tension detector 104, (see FIGS. 27, 32), may also optionally be provided as a failsafe. It activates whenever the motor's current is over a preset limit during retraction. When activated, it causes the control system to immediately power to the OFF state 90. Examples of when this may occur include introduction of a foreign object or obstacle in the path of travel, such as a tree branch, a stick, or other debris, and provides added protection if the failed proximity detector 80, or circuit does not deactivate the motor. It can be shown that the motor's current is proportional to the motor torque and this torque is proportional to the tension in the control line 51. This trip tension setting level can be factory set, but it may be adjusted. The circuitry also employs low-pass signal filtering to prevent false triggers while still maintaining safety.

The low-voltage detection sensor may optionally be included in the time delay relay and low voltage detection circuit 105 to shut down the control system immediately to the OFF state 90. The low voltage detection circuit of the time delay relay and low voltage detection circuit 105 prevents any logic malfunctions or erroneous operations. Conditions such as the battery 67 low state-of-charge, too cold, or too hot are prevented from allowing the control system to operate below the required minimum voltage. Once the low-voltage condition(s) are removed via battery charging or return to more favorable external environmental temperatures, the control system and apparatus is immediately ready for use. (See FIG. 27)

The manual key (see FIG. 32) may be included to prevent unwanted usage or tampering of the entire control system. The associated manual OFF pushbutton, that can also be used as the Emergency OFF (see FIG. 32) allows the user to turn off the system without waiting for timeout after being activated. The key lockout and pushbutton OFF of the control system "OFF" or "LOCK-OUT" 82 are "either-or" functions to the control system.

The dual-redundant power ON pushbutton(s) 79 are "either-or" functions and exist as part of the control system that provide an ergonomic design and are convenient for use from either side of the vehicle at any time the vehicle is stationary, (see FIGS. 1-5, 18-21, 32, 34-35), whether the cargo carrier 123 and cargo has been stowed on the roof or deployed on the hood.

The dual-redundant spring-loaded manually locking safety latches 68 (see FIG. 32) exist and are held OPEN electrically during the EXTEND commands 99 to allow release of the cargo carrier 123 and cargo. Normally, they are unpowered and in the OFF state 90, and provide backup safety locks using spring loaded latches and function to allow safe locking of the apparatus even if all power is lost.

The pair of source outlets 83 include an un-switched (always available outlet) and a switched (only available when control system is powered ON 91) outlet at the back of the unit. (See FIG. 32) Accessories can be used such that the battery 67 can charge a phone using an adaptor. A solar array can charge the battery 67. A charging capability is provided via the vehicle trailer adapter 81, or the un-switched DC outlet 83. The switched DC outlet 83 prevents the control system battery 67 from draining and provides power only when the system is in the ON state 91. Examples of this use include powering utility lighting for connecting trailers or an electric bicycle air pump.

Reverse power cannot feed into the vehicle from the control system battery via the trailer lighting adapter 81 as brake-battery trailer technologies are preferably used and provide a power isolator 116. (See FIG. 33) If the vehicle parking lights are OFF, then two electrical systems are isolated and totally independent. This eliminates vehicle battery drain for the cargo carrier 123 and cargo usage, and the control system battery 67 can also be used to provide emergency power if the vehicle battery is depleted. If the trailer lighting adapter 81 is not used, then the control system is completely independent and can operate stand-alone for many cycles between battery 67 recharging.

In one embodiment, the remote control unit 84 controls the motor controller 120 as required for deployment and retraction. It sends commands used by the control system. The motor controller 120 receives the remote control commands using a uniquely identified matching remote control unit 84, (see FIGS. 17, 30, 31), and this is the preferred method for remote control. Other remote control communication methods exist and can be used, which include but are not limited to cellular, Bluetooth, and infrared methods.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

| Ref. No. | Description | FIGURES |
|---|---|---|
| 1 | FIXED ARCS are a securely mounted dual captive track rail system, arc inspired apparatus attached to top of a vehicle roof top (as demonstrated in this exhibit) providing the foundation to transfer mobile load (cargo) fore, aft, up and down in a uniform, controlled manner. | 1, 2, 3, 4, 5, 6A, 6B, 6C, 11A, 11B, 12A, 12B, 12C, 12D, 14A, 14B, 18, 19, 20, 21, 22, 23, 24, 25, 34, 35 |
| 2 | MOBILE ARCS contain dual captive c-channel tracks that form a rigid, square frame to interface with the FIXED ARCS and provide interface with the MOBILE CROSSBARS AND CARRIAGE by use of a WHEEL and AXLE system allowing multi-directional mobility to transfer load fore and aft, and up and down in a uniform, controlled manner. | 1, 2, 3, 4, 5, 6A, 6B, 6C, 9, 10A, 10B, 10C, 11A, 11B, 12A, 12B, 12C, 12D, 13A, 13B, 15, 18, 19, 20, 21, 22, 23, 24, 25, 34, 35 |
| 3 | CAPTIVE TRACKS provide captivity of the mobile components between the FIXES ARCS, the MOBILE ARCS and the MOBILE CROSSBARS AND CARRIAGE to allow the cargo carrier and cargo to be mobile. The C-Chanel CAPTIVE TRACKS keep the mobile components (wheels in this exhibit) centered within the track to minimize friction and provide smooth, easy motion. | 11A, 11B, 12A, 12B, 12C, 12D (ref. also 1, 2, 3, 4, 5, 13A, 13B, 14A, 14B, 15) |
| 4 | INNER-LOCKING WEBS of the I-Beam rails are a double layer vertical member between the top and bottom flange of the I-Beam centered in both the FIXED ARCS and MOBILE ARCS providing | 12A, 12B, 12C, 12D (ref. also 1, 2, 3, 4, 5, 11A, 11B, 13A, 13B, |

| Ref. No. | Description | FIGURES |
|---|---|---|
| | structural strength to the arc, a separation of dual directional tracks, and an Inner-Locking adaptation of the WEB members to provide "Custom Length arcs" as required. Note: Though full lengths rails can be manufactured, for example, 3-foot and 4-foot snap-together rail sections can provide rail lengths of 6 ft, 7 ft, and 8 ft. | 14A, 14B, 15 |
| 5 | The TRANSOM is the spreader attached to the rear of the FIXED ARCS and provides a fixed width, a stopping point for the MOBILE ARCS when retracting and includes the PROXIMITY SENSORS along with AUTOMATIC LOCK-DOWN LATCHES, and a mounting system for the CONTROL PANEL. | 6A, 6B, 6C (ref. also 1, 2, 3, 4, 5) |
| 6 | ROLLING PADS are a retractable rolling pad at the landing point of the MOBILE ARCS when they come in contact with the vehicle's hood. They provide a rolling motion to cover distance and minimize sliding when it comes in contact with vehicle hood and this minimizes wear on vehicle's finished surfaces. They are retracted when stored and automatically release during MOBILE ARC deployment to a ready position when the MOBILE ARCS contact the vehicle's hood. They provide structural support for the MOBILE ARC assembly, MOBILE CROSSBARS AND CARRIAGE, and the cargo system. | 10A, 10B, 10C (ref. also 1, 2, 3, 4, 5, 18, 19, 20, 21, 22, 23, 24, 34, 35) |
| 7 | The STABILIZER provides structural support. | 9, 10A, 10B, 10C (ref. also 1, 2, 3, 4, 5) |
| 8 | PLATFORM is a mounting surface for the cushioned pad of the ROLLING PAD. | 10A, 10B, 10C (ref. also 1, 2, 3, 4, 5) |
| 9 | STRUCTURAL MOUNTING PLATES are the components that attach to the front of the MOBILE ARC'S I-BEAM WEB system for attaching the ROLLING PADS. | 10A, 10B, 10C (ref. also 1, 2, 3, 4, 5) |
| 10 | The HOLDING BOLTS attach the MOUNTING PLATES to the MOBILE ARC's INNER I-BEAM WEB. | 10A, 10B, 10C |
| 11 | SLEEVES provide simple rotation and protection of wear between the HINGE PIN and the STABILIZER of the ROLLING PADS. | 10A, 10B, 10C |
| 12 | HINGE PINS provide the rotation point between the MOUNTING PLATES and the STABILIZER and allow the ROLLING PADS to rotate. | 10A, 10B, 10C |
| 13 | A PERMANENT MAGNET attachment method is used for retracting and storing the ROLLING PADS when the system is stowed. | 1, 2, 3, 4, 10A, 10B, 10C |
| 14 | A STEEL PLATE is the receiving surface for the MAGNET. | 1, 2, 3, 4, 10A, 10B, 10C |
| 15 | A WHEEL demonstrates a means of deployment of mobile components; the MOBILE ARCS in conjunction with the FIXED ARCS, and the MOBILE CROSSBARS AND CARRIAGE. | 11A, 11B (ref. also 1, 2, 3, 15, 34) |
| 16 | A WHEEL AXLE is a structural component of the WHEEL and provides support between mobile components and a rotational means for movement in this embodiment. | 11A, 11B |
| 17 | NUBBINS are a fixed protrusion of the WHEEL AXLE and allows AXLE SLEEVE to calibrate the spacing for the WHEELS, the MOBILE ARCS and the MOBILE CROSSBARS AND CARRIAGE for left and right adjustment providing a means of spacing between these mobile components, and the centering of wheels in the captive track system. | 11A, 11B |
| 18 | An AXLE SLEEVE is a structural interface inserted into the MOBILE CROSS BAR members and in the FIXED ARCS I-BEAM WEB and Mobile ARCS I-BEAM WEB providing vertical support for the WHEEL AXLE and WHEEL. | 11A, 11B |
| 19 | The LOCK WASHER locks securing NUTS in place. | 11A, 11B |
| 20 | NUT securing components in proper placement. | 11A, 11B |
| 21 | C-CHANNEL WHEEL GUIDE is a custom shape in the captive track system which keeps the WHEEL positioned in the track to prevent rubbing on sidewalls of CAPTIVE TRACK and allows smooth motion of WHEEL. | 11A, 11B, 12A, 12B, 12C, 12D |
| 22 | DEPLOYMENT CLUTCH is the mechanism controlling the deployment between the MOBILE ARCS and the MOBILE CROSSBARS AND CARRIAGE and the cargo carrier and cargo. | 8A, 8B (ref. also 1, 2, 3, 4, 5, 20, 22, 23, 24, 34, 35) |
| 23 | CONTAINMENT BOX is the enclosure in which the DEPLOYMENT CLUTCH mechanisms is incased. | 8A, 8B (ref. also 1, 2, 3, 4, 5) |
| 24 | CAM CLEAT is the component within the DEPLOYMENT CLUTCH that captivates the CONTROL HARD-LINE, providing a hard-dock with the MOBILE ARCS and MOBILE CROSSBARS AND CARRIAGE and cargo carrier and cargo. | 8A, 8B |
| 25 | BUTTERFLY LIFT is the component within the DEPLOYMENT CLUTCH that lifts the CONTROL LINE over the CAM CLEAT to allow controlled forward motion of the DYNIMA LINE, thus MOBILE CROSSBARS AND CARRIAGE and cargo system. | 8A, 8B |
| 26 | CLAMP is an attachment method for attaching the BUTTERFLY LIFT to the ROD. | 8A, 8B |
| 27 | ROD is the rotation arm for engaging the BUTTERFLY LIFT. | 8A, 8B (ref. also 1, 2, 3) |
| 28 | HANDLE connected to the ROD is the means for manual operation of rotation of the ROD that engages the BUTTERFLY LIFT. | 1, 2, 3, 4, 5, 18, 19, 20, 23, 24, 34, 35 |
| 29 | RUBBER WASHER. | 7A, 7B, 7C, 8A, 8B |
| 30 | TENSION DETECTOR is a device that detects line tension. It provides a signal to the CONTROL SYSTEM to inhibit EXTEND COMMANDS from the REMOTE-CONTROL UNIT. | 7A, 7B, 7C (ref. also 1, 2, 3, 4, 5, 6A, 6B, 6C, 32) |

-continued

| Ref. No. | Description | FIGURES |
|---|---|---|
| 31 | MODULAR MOUNTING PLATE is the mounting platform for the modular TENSION DETECTOR. | 7A, 7B, 7C |
| 32 | MOUNTING BLOCKS secured to the MOUNTING PLATE provide attachment for the TENSION DETECTOR and also include the INFRAFED TRANSMITTER, INFRARED RECIEVER, the LEVER ARM, AXLE, the DIRECTIONAL FILTER, RELAY, etc. to the CONTROL SYSTEM. | 7A, 7B, 7C |
| 33 | SCREWS mount the MOUNTING BLOCKS to the MODULAR MOUNTING PLATE. | 7A, 7B, 7C |
| 34 | LEVER ARM is the framework that rotates and includes side arms that block the INFRARED LIGHT beam. | 7A, 7B, 7C |
| 35 | ROLLING COUNTERWEIGHT is incorporated into the LEVER ARM to counter balance and detect slack in the CONTROL LINE through the rotation of the LEVER ARM. | 7A, 7B, 7C |
| 36 | LEVER ARM ROD is used for a rotation point of the LEVER ARM. | 7A, 7B, 7C |
| 37 | The INFRARED TRANSMITTER provides the source for the receiver. | 7A, 7B, 7C |
| 38 | The INFRARED RECIEVER provides status of the presence of the transmitted light. | 7A, 7B, 7C |
| 39 | DIRECTIONAL FILTER directs the infrared light to a specific point to minimize spread and increase sensitivity of motion with the LEVER ARM. | 7A, 7B, 7C |
| 40 | The RELAY provides control of the output circuit related to inhibiting deployment of the line on the spool of the motor. | 7A, 7B, 7C |
| 41 | MOBILE CROSSBARS are the mobile cross-members between the MOBILE ARCS that are part of the CARRIAGE SYSTEM that have WHEELS inserted for movement (deployment and retraction) of cargo system. | 11A, 11B (ref. also 1, 2, 3, 15, 18, 19, 20, 21, 22, 34) |
| 42 | MOBILE CROSSBAR CARRIAGE is the frame that the keep the MOBILE CROSSBARS equally spaced, even, and parallel. | 1, 2, 3 (ref. also 11A, 11B, 15, 18, 19, 20, 21, 22, 34) |
| 43 | SQUARING BRACKETS keep the CARRIAGE SYSTEM square and rigid. | 1, 2, 3 (ref. also 18, 19, 20, 21, 22) |
| 44 | CROSSBAR FRAME CLAMP is a modular component of the CARRIAGE SYSTEM and inner-locks the CROSSBARS and the CROSSBAR FRAME and allows system to be disassembled. | 1, 2, 3 (ref. also 18, 19, 20, 21, 22) |
| 45 | CLAMPS (2) attach the CROSSBAR FRAME ATTACHMENT to the MOBILE CROSSBAR. | 1, 2, 3 |
| 46 | REAR STOP BAR is an adjustable crossbar between the MOBILE ARCS and provides an adjustment for the final stopping point when the cargo system retracts. This can be adjusted fore and aft to create a desired stowed position of the cargo system. | 1, 2, 3, 20, 23 |
| 47 | FRONT TORQUE-RESISTANT STOP BAR is a fixed crossbar placed perpendicular and between the MOBILE ARCS to provide anti-torque resistance for the front of the MOBILE ARCS. They also provide a stopping point for CARGO CARRIAGE and CARGO. | 1, 2, 3, 15, 18, 19, 20, 21, 22 |
| 49 | SPACING and STOPING BLOCKS located at the FRONT TORQUE BAR/STOP BAR and the REAR STOP BAR, stop the CARGO "clampdowns" attached to the MOBILE CROSSBARS AND CARRIAGE from hitting these STOP BARS. | 1, 2, 3, 19, 20 |
| 50 | PAD provides a soft cushioned point of contact when cargo system and MOBILE CROSSBARS AND CARRIAGE come into contact with the STOP BLOCKS. | 1, 2, 3, 19, 20 |
| 51 | High Strength CONTROL LINE is a center point-of-control for retracting the cargo system, and allows control to extend the MOBILE ARCS and MOBILE CROSSBARS AND CARRIAGE and cargo system either together or independently. | 1, 2, 3, 19, 20, 22, 23, 34, 35 |
| 52 | SPRING provides shock resistance in the CONTROL LINE when cargo system comes to its fully retracted and locked position. | 1, 2, 3 |
| 53 | HOLDING PIN secures the SPRING and CONTROL LINE to the MOBILE CROSSBARS AND CARRIAGE thus, the cargo carrier and cargo. | 1, 2, 3 |
| 54 | SHOCK CORD SYSTEM is a center-pull force and when loaded, automatically pulls the MOBILE ARC SYSTEM forward for DEPLOYMENT until Gravity provides the force for deployment. | 16 (ref. also 2, 3) |
| 55 | PULLEYS of the Shock CORD SYSTEM use a 5-Point method for optimizing the SHOCK CORD System and provide maximum capacity and utilization of SHOCK CORD in a small area. It also helps keep cargo carrier and cargo CENTERED and minimizes stresses in the apparatus. | 16 |
| 56 | SQUARING BRACKETS provide a "Square & Rigid" Frame required for smooth operation and alignment of entire apparatus. | 1, 2, 3, 6A, 6B, 6C |
| 57 | CORNER SUPPORTS provide additional support to connected members as needed. | 1, 2, 3, 6A, 6B, 6C |
| 58 | FIXED ARC ADJUSTABLE MOUNTING BRACKET along with a CLAMP are used to permanently mount the apparatus' FIXED ARCS to a rigid structure. | 14A, 14B (ref. also 1, 2, 3, 4, 5, 18, 19, 20, 21, 34, 35) |
| 59 | ADJUSTABLE CROSSBAR MOUNTING BRACKET is a multi-purpose securing devise to attach and lock-in-place cross members between rails and includes but is not limited to SPACING BARS, STOP BARS, TORQUE BARS, and AXLE SYSTEMS. | 13A, 13B (ref. also 1, 2, 3) |

| Ref. No. | Description | FIGURES |
|---|---|---|
| 60 | ARC WEDGE ANCHORS fit within the I-BEAM track at any arbitrary location along the arced I-Beam and provide a holding force by means of compression for securing crossbars and other accessories. | 13A, 13B, 14A, 14B (ref. also 1, 2, 3, 4, 5) |
| 61 | BOLT secures BRACKET to the WEDGE ANCHOR compressing the BRACKET and WEDGE ANCHOR to the ARC'S I-BEAM lip (C-TRACK) and this secures the BRACKET to the ARC I-BEAM. | 13A, 13B, 14A, 14B |
| 62 | NUT secures BOLT to said BRACKET and WEDGE ANCHOR. | 13A, 13B, 14A, 14B |
| 63 | The ADJUSTABLE HEIGHT STAND-OFFS between the ADJUSTABLE FIXED ARC MOUNTING CLAMP and the bottom of the FIXED ARC I-BEAM provide needed clearance along with an adjustable angular direction to custom fit the MOBILE ARC SYSTEM to a desired landing location on the vehicle's hood. | 14A, 14B (ref. also 1, 4, 5) |
| 64 | ADJUSTABLE HOLD-DOWN CLAMPS are secured to the FIXED ARC MOUNTING BRACKETS so that the FIXED ARCS provide a solid means of attachment and security to the vehicle's crossbars. | 14A, 14B, 30 (ref. also 1, 4, 5) |
| 65 | CONTROL PANEL is the mounting platform and all associated components for the entire CONTROL SYSTEM of the apparatus. | 6A, 6B, 6C (ref. also 1, 2, 3, 4, 5, 6A, 6B, 6C, 9, 18, 19, 23, 24, 34, 35) |
| 66 | ELECTRIC MOTOR WITH SPOOL AND LOCKING CLUTCH. | 6A, 6B, 6C (ref. also 1, 2, 3, 4, 5, 32) |
| 67 | BATTERY is rechargeable and provides power for all electrified functions of the apparatus. | 6A, 6B, 6C (ref. also 1, 2, 3, 4, 5, 32) |
| 68 | SAFETY LATCHES provided added security via a lock-down method that automatically locks the fully retracted MOBILE SYSTEM Components to a stowed position on the FIXED ARCS. | 9 (ref. also 1, 2, 3, 4, 5, 6A, 6B, 6C, 32) |
| 69 | LATCH BAR is the backup mechanism to hold the apparatus using the SAFETY LATCHES. | 9 |
| 70 | MOUNTING PLATE is a block that the SAFETY LATCHES are attached to, and they are attached to the TRANSOM. | 9 |
| 71 | COVER is a protective and decorative cover for the CONTROL SYSTEM components. | 4, 5, 24 |
| 72 | EXISTING VEHICLE ROOF-RACK CROSSBARS are original equipment manufacturer (OEM) provided by automobile manufacturer, or are add-on third party after-market crossbars. | 1, 21, 23, 34, 35 |
| 73 | BUILT-IN TRACK is the original equipment manufacturer (OEM) built in rooftop tracks (roof rack) of the vehicle for attaching roof rack assemblies and can be what this apparatus attaches directly too, or the apparatus can attach to the crossbars for mounting the apparatus' FIXED ARCS. | 1, 21, 26 |
| 74 | MOUNTING BLOCKS are mounting devices for attaching FIXED ARCS and/or custom cross-bars to OEM tracks provided in vehicle rooftop. They provide not only a solid connection of FIXED ARCS to vehicle, but also provide proper clearance requirements. | 26 (ref. also 1) |
| 75 | VEHICLE WEDGE ANCHOR mounts provided by vehicle manufacturer (OEM) for attaching roof top rails and accessories to vehicle roof top tracks. | 26 (ref. also 1) |
| 76 | BOLT (2) bolts provided by vehicle manufacturer for attaching roof top accessories to vehicle roof top tracks. | 26 (ref. also 1) |
| 77 | SWIVIL BRACKETS, MULTI DIRECTIONAL are mounting brackets between our mounting CROSS-BAR and the MOUNTING BLOCKS and allow a custom angular attachment to fit to vehicles. | 26 |
| 78 | MOBILE COMPONENTS of the apparatus, includes the MOBILE ARCS, the MOBILE CROSSBAR FRAME AND CROSSBARS and all other attached accessories. | 6A, 6B, 6C |
| 79 | POWER ON pushbuttons are conveniently located on either side of the apparatus to activate the CONTROL SYSTEM. | 1, 2, 3, 4, 5, 18, 19, 20, 21, 32, 34, 35 |
| 80 | PROXIMITY SENSORS signal the power system to inhibit retraction when MOBILE ARCS and components are at a final lock-down position. | 6A, 6B, 6C (ref. also 1, 2, 3, 4, 5, 32) |
| 81 | TRAILER LIGHTING ADAPTOR CABLE (OPTIONAL) uses a standard trailer lighting adaptor to plug into a charging port or the vehicle trailer lighting and can charge the CONTROL SYSTEM'S internal BATTERY. | 6A, 6B, 6C |
| 82 | CONTROL SYSTEM "OFF or LOCK-OUT" allows manual keyed lockout of the CONTROL SYSTEM and prevents unwanted use. | 6A, 6B, 6C, 36 |
| 83 | ACCESSORY PANEL provides two accessory power outlets. They can be used for other accessories and can be used to charge the internal BATTERY. | 6A, 6B, 6C, 36 |
| 84 | REMOTE CONTROL UNIT used to control deployment and retraction. | 17, 36 |
| 85 | WHEEL TRANSFER LEVER is a drop-down top portion of the track system which allows the MOBILE CROSSBARS AND CARRIAGE wheels transfer to outside of the captive tracks. This allows for easy removal of the MOBILE CROSSBARS AND CARRIAGE. It also allows the MOBILE CROSSBARS AND CARRIAGE AND cargo system to further EXTEND using ADD-ON TRACKS for ground contact. | 15 (ref. also 1, 2, 3, 5, 22) |
| 86 | LEVER HINGE SPRING always positions drop-down lever arm up to a locked and secured location. | 15 (ref. also 1, 2, 3, 5, 22) |
| 87 | REAR TORQUE BAR WITH AXLE SLEEVES is a fixed crossbar placed perpendicular and between the MOBILE ARCS to provide anti-torque resistance for the rear | 1, 2, 3, 20 |

| Ref. No. | Description | FIGURES |
|---|---|---|
| | of the MOBILE ARCS. They also provide AXLE SLEEVES for the rear WHEEL AXLE of the MOBILE ARCS. | |
| 88 | ADD-ON EXTENSION RAILS for lower CARGO access. | 22 |
| 89 | EXTENSION RAIL LANDING PADS. | 22 |
| 90 | CONTROL SYSTEM TOP-LEVEL STATE DIAGRAM-OFF-STATE illustrates the ways to leave and return to the OFF STATE. | 27 |
| 91 | CONTROL SYSTEM TOP-LEVEL STATE DIAGRAM-ON-STATE illustrates the ways to leave and return to the ON STATE. | 27 |
| 92 | CONTROL SYSTEM DETAILED ON STATE-POWER UP STATE is the initial stated entered during ON. | 28, 29 |
| 93 | CONTROL SYSTEM DETAILED ON STATE-UNLOCKED, LOW-TENSION STATE typically occurs twice during deployment. | 28, 29 |
| 94 | CONTROL SYSTEM DETAILED ON STATE-UNLOCKED, TENSION STATE occurs during retract and extend. | 28, 29 |
| 95 | CONTROL SYSTEM DETAILED ON STATE-LOCKED, TENSION STATE is the state when the apparatus is stowed for transit. | 28, 29 |
| 96 | CONTROL SYSTEM DETAILED ON STATE-LOCKED, LOW-TENSION STATE is a state that is entered only after some type of system failure. | 28, 29 |
| 97 | CONTROL SYSTEM DETAILED ON STATE-POWER DOWN STATE is the last state before leaving the ON state. | 28, 29 |
| 98 | REMOTE CONTROL UNIT STATE DIAGRAM-OFF STATE is the typical non-use state of the remote-control unit. | 28, 29 |
| 99 | REMOTE CONTROL UNIT STATE DIAGRAM-EXTEND STATE is entered during the pressing of the extend button on the remote. | 28, 29 |
| 100 | REMOTE CONTROL UNIT STATE DIAGRAM-STATIONARY STATE is entered during when the remote is ON, but no buttons are being pressed on the remote. | 28, 29 |
| 101 | REMOTE CONTROL UNIT STATE DIAGRAM-RETRACT STATE is entered during the pressing of the extend button on the remote. | 28, 29 |
| 102 | MOTOR EXTENDING DETECTION FUNCTION is used to send a signal to drive the two SAFETY LATCHES to allow deployment. It is only active during any extend motions of the motor/spool via the MOTOR CONTROLLER AND RF RECEIVER. | 32 |
| 103 | MOTOR ON DETECTION FUNCTION is used to illuminate the YELLOW LED lights as a positive feedback indication to the user and as caution that the apparatus and cargo carrier and cargo are moving. It is independent of direction of motion. | 32 |
| 104 | MOTOR RETRACTING CURRENT OVERLOAD DETECTION FUNCTION prevents proximity circuit failures and prevents the electric motor from exceeding the design limits for proper use and safety during retraction and stowage. It also activates if there is a physical blockage in the path of the mobile components or cargo. During retraction the MOTOR current is continuously monitored and if it exceeds a pre-set threshold, it causes immediate shutdown of the CONTROL SYSTEM to OFF. | 32 |
| 105 | ON-TIMER DELAY FUNCTION WITH LOW VOLTAGE SHUTDOWN provides the necessary amount time to deploy or retract the apparatus, cargo carrier and cargo. The value is preset. After the time period, it turns the system off to minimize power use. It is reactivated by pressing either ON BUTTON. | 32 |
| 106 | MAIN POWER FUSE is used to isolate the battery from the system for any unprotected faults. Most faults occur at a lower level and are isolated, but some faults such as a ELECTRC MOTOR wire fault may not be protected unless the system can isolate the source (BATTERY). | 32 |
| 107 | LOCAL REGULATED POWER SUPPLY AND ELECTRICAL PROTECTIONS are used to provide clean steady power to the sensors and effectors. Distributed loads use local use protections at the local power supply outputs to protect the wire during any faults. | 32 |
| 108 | YELLOW LIGHT-EMITTING DIODE(S) indicate the apparatus is moving (either direction). | 32 |
| 109 | GREEN LIGHT-EMITTING DIODE(S) indicate the apparatus, cargo carrier and cargo are locked and latched. | 32 |
| 110 | BLUE LIGHT-EMITTING DIODE(S) indicate that the control system and timer are ON. | 32 |
| 111 | LIGHT EMITTING DIODE DRIVERS are used to optimize the light indications and are redundant for both sides of the vehicle. | 32 |
| 112 | POWER DIODES are used to block the current of the motor controller in one direction, and still allow the motor to run in the opposite direction. There are two diodes to allow blocking of either direction based on the control system logic. | 32 |
| 113 | DIODE BYPASS RELAY FOR EXTEND CIRCUIT is the circuit to allow the motor to move extend if commanded. Unless commanded open, it always allows REMOTE CONTROL UNIT EXTEND commands to activate the motor. | 32 |
| 114 | DIODE BYPASS RELAY FOR RETRACT CIRCUIT is the circuit to allow the motor to retract if commanded. Unless commanded open, it always allows REMOTE CONTROL UNIT RETRACT commands to active the motor. | 32 |

-continued

| Ref. No. | Description | FIGURES |
|---|---|---|
| 115 | RELAY/SOLENIOD DRIVER is used to provide proper excitation for the larger coils of the power relays and latch solenoids. | 32 |
| 116 | ELECTRICAL POWER ISOLATOR (OPTIONAL) is used to prevent the CONTROL SYSTEM BATTERY from back feeding into the vehicle's electrical power and lighting system. It receives power from the taillight wire on the TRAILER LIGHT ADAPTER (OPTIONAL). | 33 |
| 117 | LIGHT EMMITING DIODE DIMMER FUNCTION (OPTIONAL) is used to drive the rear taillights and apparatus yellow side lights. This is for the taillight function when active on the vehicle. The yellow lights become "courtesy lights" during stowage and transit when the vehicle taillights are ON. | 33 |
| 118 | RIGHT RED LIGHT-EMITTING DIODE(S) (OPTIONAL) is driven by the right turn signal stop emergency light wire on the TRAILER LIGHT ADAPTER (OPTIONAL). | 33 |
| 119 | LEFT RED LIGHT-EMITTING DIODE(S) (OPTIONAL) is driven by the left turn signal stop emergency light wire on the TRAILER LIGHT ADAPTER (OPTIONAL). | 33 |
| 120 | MOTOR CONTROLLER WITH RF RECIEVER is used to allow user control anywhere within in a radius of about 20 feet. | 32 |
| 122 | CUSTOM DESIGNS for direct mounting of FIXED ARC RAIL SYSTEM. | 24 |
| 123 | CARGO CARRIER demonstration. Other cargo carriage systems can be installed for BIKES, KAYAKS, CARGO CAGES, LADDERS. | 18, 19, 20, 23, 34, 35 |
| 124 | LOCKABLE TURNTABLE with MOUNTED CROSSBARS for attaching desired cargo carrier system (cargo box demonstrated. Also bike racks, kayak racks, ladder racks, etc.) | 35 |

The embodiments of the invention in which an exclusive property or privilege is claimed are defined as follows:

1. A mobile stowage and retrieval system for use with a vehicle, comprising:
a plurality of fixed arcs, each having
an elliptical shape based on the algebraic quadratic equation for an ellipse;
a track on at least one side of the fixed arc; and
a front end and a back end;
a plurality of mobile arcs, each having
an elliptical shape corresponding to the shape of the fixed arcs; and
a track on at least one side of the mobile arc corresponding to the track on at least one of the fixed arcs;
at least one fixed wheel near the front end of each fixed arc aligning with the track on the at least one side of the mobile arcs;
at least one wheel near the back end of each mobile arc aligning with the track on at least one side of the fixed arcs;
a carriage movably connected to the plurality of mobile arcs and configured to follow in-line with the tracks of the fixed arcs and the mobile arcs along their elliptical shape during deployment, wherein the carriage is configured to securely receive and maintain a cargo carrier;
a shock cord system connected between the plurality of fixed arcs and the plurality of mobile arcs, wherein the shock cord system is configured to store mechanical-energy used to initiate deployment of the mobile arcs and the carriage; and
a platform connected near the back ends of the plurality of fixed arcs, the platform supporting a control system having a power source; and
at least one control line connected between the control system and at least one passive spring connected to the carriage.

2. The system of claim 1, wherein the plurality of fixed arcs is connected to the vehicle roof via at least one of (a) preexisting vehicle crossbars, (b) preexisting vehicle roof tracks, or (c) directly mounting to the vehicle roof.

3. The system of claim 1, wherein the plurality of fixed arcs are connected to the vehicle roof using at least one adjustable height vehicle mounts, which mount is configurable to alter where the mobile arcs intersect a hood of the vehicle when deployed.

4. The system of claim 1, further comprising a plurality of movable cross supports extending between the plurality of mobile arcs.

5. The system of claim 1, wherein:
each mobile arc further comprises a second track on the side opposite the first track; and
the carriage further comprises a plurality of fixed wheels configured to movably connect to the second track of each mobile arc.

6. The system of claim 5, wherein the plurality of fixed arcs is connected to the vehicle roof using a minimum of two connections to the vehicle roof containing at least one pad connected to the front of the mobile arcs that deploys to a hood of the vehicle to establish a three-point connection to the vehicle.

7. The system of claim 4, wherein:
the carriage is configured to removably mount between the plurality of cross supports extending between the plurality of mobile arcs; and
the carriage is configured to rotate between 5 degrees and 90 degrees to facilitate access to the cargo carrier.

8. The system of claim 7, further comprising:
a cam cleat mounted to the plurality of movable cross supports that lock the cross supports and the carriage to prevent movement; and
a release for the cam cleat to allow movement of the carriage.

9. The system of claim 1, wherein
the control system power source consists of at least one of (a) manual power; (b) a self-contained energy source; and (c) an electrical system of the vehicle; and
the control system includes a winch configured to retract and extend the carriage using the control line.

10. The system of claim 1, further comprising a plurality of notification lights connected to at least one of the plurality of fixed arcs, plurality of mobile arcs, or carriage, the notification lights configured to display a state of the control system and provide additional vehicle courtesy lighting and powered by at least one of (a) a self-contained energy source; and (b) an electrical system of the vehicle.

11. The system of claim 9, wherein the winch is configured to be remotely operated within constraints imposed by the control system; and further comprising a remote control configured to control operation of the winch.

12. A method for mobile stowage and retrieval for use with a vehicle having a front and a back, comprising:
   connecting a plurality of fixed arcs to a roof of the vehicle, each having an elliptical shape based on the algebraic quadratic equation for an ellipse;
   connecting a plurality of mobile arcs to the plurality of fixed arcs via a plurality of fixed wheels located within tracks on the fixed arcs that are configured to slidably move within corresponding tracks on the mobile arcs, wherein each mobile arc has an elliptical shape based on the algebraic quadratic equation for an ellipse;
   connecting a shock cord system between the plurality of fixed arcs and the plurality of mobile arcs, wherein the shock cord system is configured to store energy used to initiate deployment of the mobile arcs;
   connecting a movable carriage to the plurality of mobile arcs, wherein the carriage is configured to follow in-line with the tracks of the fixed arcs and the mobile arcs along their elliptical shape during deployment and to securely receive and maintain a cargo carrier; and
   extending the plurality of mobile arcs away from the plurality of fixed arcs towards the front of the vehicle using a winch configured to retract and extend the carriage using a control line powered via at least one of (a) manual power; (b) a self-contained energy source; and (c) an electrical system of the vehicle.

13. The method of claim 12, wherein the plurality of fixed arcs is connected to the vehicle roof via at least one of (a) preexisting vehicle crossbars, (b) preexisting vehicle roof tracks, or (c) directly mounting to the vehicle roof.

14. The method of claim 12, wherein the plurality of fixed arcs is connected to the vehicle roof using adjustable height vehicle mounts.

15. The method of claim 12, further comprising removably connecting a cargo carrier to the carriage.

16. The method of claim 15, further comprising rotating the carriage and connected cargo carrier between 5 degrees and 90 degrees to facilitate access to the cargo carrier.

17. The method of claim 12, further comprising locking the control line to prevent movement of the carriage.

18. The method of claim 12, further comprising providing a plurality of notification lights connected to at least one of the plurality of fixed arcs, plurality of mobile arcs, or carriage, the notification lights configured to display a state of the control system and provide additional vehicle courtesy lighting and powered by at least one of (a) a self-contained energy source; and (b) an electrical system of the vehicle.

19. The method of claim 12, further comprising operating the winch via a remote control, wherein the remote control operation is constrained by a set of predetermined conditions.

20. A mobile stowage and retrieval system for use with a vehicle having a front and a back, comprising:
   a plurality of fixed arcs, each having
      an elliptical shape based on the algebraic quadratic equation for an ellipse;
      a track on at least one side of the fixed arc; and
      a front end aligned towards the front of the vehicle and a back end aligned towards the back of the vehicle;
   a plurality of mobile arcs, each having
      an elliptical shape corresponding to the shape of the fixed arcs; and
      a track on at least one side of the mobile arc corresponding to the track on at least one of the fixed arcs;
   at least one fixed wheel near the front end of each fixed arc aligning with the track on the at least one side of the mobile arcs;
   at least one wheel near the back end of each mobile arc aligning with the track on the at least one side of the fixed arcs;
   a carriage movably connected to the plurality of mobile arcs and configured to follow in-line with the tracks of the fixed arcs and the mobile arcs along their elliptical shape during deployment, wherein the carriage is configured to securely receive and maintain a cargo carrier;
   a shock cord system connected between the plurality of fixed arcs and the plurality of mobile arcs, wherein the shock cord system is configured to store mechanical energy used to initiate deployment of the mobile arcs and the carriage; and
   a platform connected near the rear of the vehicle between the back ends of the plurality of fixed arcs, the platform supporting a control system having a winch and a power source configured to retract and extend the carriage using a control line connected between the control system and at least one passive spring connected to the carriage,
   wherein the plurality of fixed arcs is connected to the vehicle roof via (a) at least one of preexisting vehicle crossbars, (b) preexisting vehicle roof tracks, or (c) directly mounting to the vehicle roof.

* * * * *